(12) United States Patent
Murakami et al.

(10) Patent No.: US 9,520,934 B2
(45) Date of Patent: Dec. 13, 2016

(54) TRANSMISSION METHOD, TRANSMISSION DEVICE, RECEPTION METHOD AND RECEPTION DEVICE

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/134,014

(22) Filed: Apr. 20, 2016

(65) Prior Publication Data

US 2016/0233941 A1 Aug. 11, 2016

Related U.S. Application Data

(63) Continuation of application No. PCT/JP2014/005436, filed on Oct. 28, 2014.

(30) Foreign Application Priority Data

Oct. 31, 2013 (JP) .................................. 2013-227398

(51) Int. Cl.
 H04B 7/06 (2006.01)
(52) U.S. Cl.
 CPC .......... *H04B 7/0697* (2013.01); *H04B 7/0682* (2013.01)
(58) Field of Classification Search
 CPC ............................. H04B 7/0697; H04B 7/0682
 (Continued)

(56) References Cited

U.S. PATENT DOCUMENTS 7,620,115 B2 * 11/2009 Kim ...................... H04B 1/707
 370/208
8,687,480 B2 * 4/2014 Jia ........................ H04B 7/0671
 370/208

(Continued)

FOREIGN PATENT DOCUMENTS

| WO | 2005/050885 | 6/2005 |
|----|-------------|--------|
| WO | 2007/074524 | 7/2007 |
| WO | 2012/111256 | 8/2012 |

OTHER PUBLICATIONS

International Search Report of PCT application No. PCT/JP2014/005436 dated Nov. 25, 2025.

(Continued)

*Primary Examiner* — Freshteh N Aghdam
(74) *Attorney, Agent, or Firm* — Wenderoth, Lind & Ponack, L.L.P.

(57) ABSTRACT

A transmission method includes mapping processing, phase change processing, and transmission processing. In the mapping processing, a plurality of first modulation signals and a plurality of second modulation signals are generated using a first mapping scheme, and a plurality of third modulation signals and a plurality of fourth modulation signals are generated using a second mapping scheme. In the phase change processing, a phase change is performed on the plurality of second modulation signals and the plurality of fourth modulation signals using all N kinds of phases. In the transmission processing, the first modulation signals and the second modulation signals are respectively transmitted at a same frequency and a same time from different antennas, and the third modulation signals and the fourth modulation signals are respectively transmitted at a same frequency and a same time from the different antennas.

4 Claims, 21 Drawing Sheets

(58) Field of Classification Search
USPC .......................................... 375/260, 298, 316
See application file for complete search history.

(56) References Cited

U.S. PATENT DOCUMENTS

| | | | | |
|---|---|---|---|---|
| 2004/0235433 | A1* | 11/2004 | Hugl | H04B 7/0608 455/101 |
| 2006/0193268 | A1* | 8/2006 | Walton | H04B 7/04 370/264 |
| 2007/0140377 | A1 | 6/2007 | Murakami et al. | |
| 2009/0161786 | A1 | 6/2009 | Nakagawa et al. | |
| 2012/0189080 | A1* | 7/2012 | Khan | H04B 7/0669 375/295 |
| 2012/0307936 | A1 | 12/2012 | Murakami et al. | |
| 2013/0089162 | A1* | 4/2013 | Alamouti | H04L 1/0054 375/295 |
| 2013/0121307 | A1 | 5/2013 | Murakami et al. | |
| 2013/0136208 | A1 | 5/2013 | Murakami et al. | |

OTHER PUBLICATIONS

Yutaka Murakami et al., "Investigation of 16QAM Mapping Employing Likelihood Detection Utilizing Decision of Partial Bits in MIMO Systems", technical report of ieice wbs2004-56, A P2004-237, rcs2004-324, MoMuC2004-107, nw2004-234(Mar. 2005) (Partial Translation).
Bertrand M. Hochwald et al., "Achieving near-capacity on a multiple-antenna channel", IEEE Transactions on communications, vol. 51, No. 3, pp. 389-399, Mar. 2003.
Ben Lu et al., "Performance analysis and design optimization of LDPC-coded MIMO OFDM systems", IEEE Transactions on signal processing, vol. 52, No. 2, pp. 348-361, Feb. 2004.
Yutaka Murakami et al., "BER performance evaluation in 2×2 MIMO spatial multiplexing systems under Rician fading Thannels", IEICE Trans. Fundamentals, vol. E91-A, No. 10, pp. 2798-2807,Oct. 2008.
Hangjun Chen et al., "Turbo space-time codes with time varying linear transformations", IEEE Transactions on wireless communications, vol. 6, No. 2, pp. 486-493, Feb. 2007.
Hiroyuki Kawai et al., "Likelihood function for QRM-MLD suitable for soft-decision turbo decoding and its performance for OFCDM MIMO multiplexing in multipath fading channel", IEICE Trans. Commun., vol. E88-B, No. 1, pp. 47-57, Jan. 2005.
Motohiko Isaka et al., "A tutorial on "parallel concatenated (Turbo) coding", "Turbo (iterative) decoding" and related topics", Technical Report of IEICE, IT98-51,1998 (English Abstract).
S. Galli et al., "Advanced signal processing for PLCs: Wavelet-OFDM", Proc. of IEEE International symposium on ISPLC 2008, pp. 187-192, 2008.
David J. Love et al., "Limited feedback unitary precoding for spatial multiplexing systems", IEEE Transactions on Information Theory, vol. 51, No. 8, pp. 2967-2976, Aug. 2005.
DVB Document A122, "Frame structure channel coding and modulation for a second generation digital terrestrial blevision broadcasting system (DVB-T2)", Jun. 2008.
Lorenzo Vangelista et al., "Key technologies for next-generation terrestrial digital television standard DVB-T2", IEEE Commun. Magazine, pp. 146-153, Oct. 2009.
Takeo Ohgane et al., "Applications of Space Division Multiplexing and Those Performance in a MIMO Channel", IEICE Trans. Commun., vol. E88-B, No. 5, pp. 1843-1851, May 2005.
R. G. Gallager, "Low-density parity-check codes", IRE Transactions on information theory, pp. 21-28,1962.
David J. C. MacKay, "Good error-correcting codes based on very sparse matrices", IEEE Transactions on information theory, vol. 45, No. 2, pp. 399-431, Mar. 1999.
ETSI EN 302 307 v1.1.2, "Digital video broadcasting(DVB); Second generation framing structure, channel coding and modulation systems for broadcasting, interactive services, news gathering and other broadband satellite applications", Jun. 2006.
Yeong-Luh Ueng et al., "A fast-convergence decoding method and memory-efficient VLSI decoder architecture for Irregular LDPC codes in the IEEE 802.16e standards", IEEE, pp. 1255-1259, 2007.
Siavash M. Alamouti, "A simple transmit diversity technique for wireless communications", IEEE J. Select Areas in communications, vol. 16,No. 8, pp. 1451-1458, Oct. 1998.
Vahid Tarokh et al., "Space-time block coding for wireless communications: Performance results", IEEE J. Selected Areas in Commun., vol. 17, No. 3, pp. 451-460, Mar. 1999.
Extended European Search Report issued Sep. 28, 2016 in related European Application No. 14857636.6.
Kenichi Kobayashi et al., "MIMO System with Relative Phase Difference Time-Shift Modulation for Rician Fading Environment", IEICE Transactions on Communications, Communications Society, Tokyo, JP, vol. E91B, No. 2, Feb. 1, 2008, pp. 459-465, XP001511247.

* cited by examiner

FIG. 17

| TIME NUMBER i | 0 | 1 | 2 | 3 | 4 | 5 | ... |
|---|---|---|---|---|---|---|---|
| MAPPING SET OF s1 AND s2 | MAPPING SET *0 | MAPPING SET *0 | MAPPING SET *1 | MAPPING SET *1 | MAPPING SET *2 | MAPPING SET *2 | ... |
| PHASE CHANGE VALUE θ(i) | Phase[0] | Phase[1] | Phase[0] | Phase[1] | Phase[0] | Phase[1] | ... |

TRANSMISSION METHOD, TRANSMISSION DEVICE, RECEPTION METHOD AND RECEPTION DEVICE

BACKGROUND

1. Technical Field

The present disclosure relates to a data transmission method, a data reception method, a data transmission device, and a data reception device. For example, the present disclosure relates to compatibility between improvement of a data transmission rate and data transmission with good reception quality in picture data distribution through broadcasting.

2. Description of the Related Art

Conventionally, for example, there is a communication method called MIMO (Multiple-Input Multiple-Output) as a communication method in which a multi-antenna is used. In the multi-antenna communication typified by the MIMO, the transmission device modulates pieces of transmission data of a plurality of sequences, and simultaneously transmits the modulated signals from different antennas, thereby enhancing a data communication rate.

CITATION LIST

Patent Literature

PTL 1: International Patent Publication No. 2005/050885

Non-Patent Literatures

NPL 1: "Achieving near-capacity on a multiple-antenna channel" IEEE Transaction on communications, vol. 51, no. 3, pp. 389-399, March 2003.

NPL 2: "Performance analysis and design optimization of LDPC-coded MIMO OFDM systems" IEEE Trans. Signal Processing, vol. 52, no. 2, pp. 348-361, February 2004.

NPL 3: "BER performance evaluation in 2×2 MIMO spatial multiplexing systems under Rician fading channels," IEICE Trans. Fundamentals, vol. E91-A, no. 10, pp. 2798-2807, October 2008.

NPL 4: "Turbo space-time codes with time varying linear transformations," IEEE Trans. Wireless communications, vol. 6, no. 2, pp. 486-493, February 2007.

NPL 5: "Likelihood function for QR-MLD suitable for soft-decision turbo decoding and its performance," IEICE Trans. Commun., vol. E88-B, no. 1, pp. 47-57, January 2004.

NPL 6: "Shannon Genkai e no Michishirube (Signpost to the Shannon limit): "Parallel concatenated (Turbo) coding", "Turbo (iterative) decoding", and it surroundings", Technical report of IEICE. IT98-51.

NPL 7: "Advanced signal processing for PLCs: Wavelet-OFDM," Proc. of IEEE International symposium on ISPLC 2008, pp. 187-192, 2008.

NPL 8: D. J. Love, and R. W. Heath, Jr., "Limited feedback unitary precoding for spatial multiplexing systems," IEEE Trans. Inf. Theory, vol. 51, no. 8, pp. 2967-1976, August 2005.

NPL 9: DVB Document A122, Framing structure, channel coding and modulation for a second generation digital terrestrial television broadcasting system (DVB-T2), June 2008.

NPL 10: L. Vangelista, N. Benvenuto, and S. Tomasin, "Key technologies for next-generation terrestrial digital television standard DVB-T2," IEEE Commun. Magazine, vo. 47, no. 10, pp. 146-153, October 2009.

NPL 11: T. Ohgane, T. Nishimura, and Y. Ogawa, "Application of space division multiplexing and those performance in a MIMO channel," IEICE Trans. Commun., vo. 88-B, no. 5, pp. 1843-1851, May 2005.

NPL 12: R. G. Gallager, "Low-density parity-check codes," IRE Trans. Inform. Theory, IT-8, pp-21-28, 1962.

NPL 13: D. J. C. Mackay, "Good error-correcting codes based on very sparse matrices," IEEE Trans. Inform. Theory, vol. 45, no. 2, pp 399-431, March 1999.

NPL 14: ETSI EN 302 307, "Second generation framing structure, channel coding and modulation systems for broadcasting, interactive services, news gathering and other broadband satellite applications," v.1.1.2, June 2006.

NPL 15: Y.-L. Ueng, and C.-C. Cheng, "a fast-convergence decoding method and memory-efficient VLSI decoder architecture for irregular LDPC codes in the IEEE 802.16e standards," IEEE VTC-2007 Fall, pp. 1255-1259.

NPL 16: S. M. Alamouti, "A simple transmit diversity technique for wireless communications," IEEE J. Select. Areas Commun., vol. 16, no. 8, pp. 1451-1458, October 1998.

NPL 17: V. Tarokh, H. Jafrkhani, and A. R. Calderbank, "Space-time block coding for wireless communications: Performance results," IEEE J. Select. Areas Commun., vol. 17, no. 3, pp. 451-460, March 1999.

SUMMARY

In one general aspect, the techniques disclosed here feature a transmission method including: mapping processing of generating a plurality of first modulated signals s1 and a plurality of second modulated signals s2 using a first mapping scheme, the plurality of second modulated signals s2 being equal to the plurality of first modulated signals s1, and generating a plurality of third modulated signals s3 and a plurality of fourth modulated signals s4 using a second mapping scheme, the plurality of fourth modulated signals s4 being equal to the plurality of third modulated signals s3, each of the first mapping scheme and the second mapping scheme involving 16 signal points, the first mapping scheme and the second mapping scheme being different from each other in a signal point arrangement; phase change processing of performing a phase change on the plurality of second modulated signals s2 using all N kinds of phases, and performing the phase change on the plurality of fourth modulated signals s4 using all the N kinds of phases, the N being an integer of 2 or more; and transmission processing of transmitting sequentially the plurality of first modulated signals s1 and the plurality of third modulated signals s3 using a first antenna, transmitting each of the plurality of second modulated signals s2 subjected to the phase change using a second antenna at a same frequency and a same time as a frequency and a time of a corresponding one of the plurality of first modulated signals s1, and transmitting each of the plurality of fourth modulated signals s4 subjected to the phase change using the second antenna at a same frequency and a same time as a frequency and a time of a corresponding modulated signal of the plurality of third modulated signals s3.

These comprehensive and specific modes may be implemented by any combination of the systems, devices, and methods.

Further advantage and effect according to one aspect of the present disclosure are disclosed from the specification and drawings. Although the advantage and/or the effect is provided by the feature described in the exemplary embodi-

BRIEF DESCRIPTION OF THE DRAWINGS

FIG. 17 is a view illustrating an example of a phase change;

DETAILED DESCRIPTION

Underlying Knowledge Forming Basis of the Present Disclosure

Figure 1:
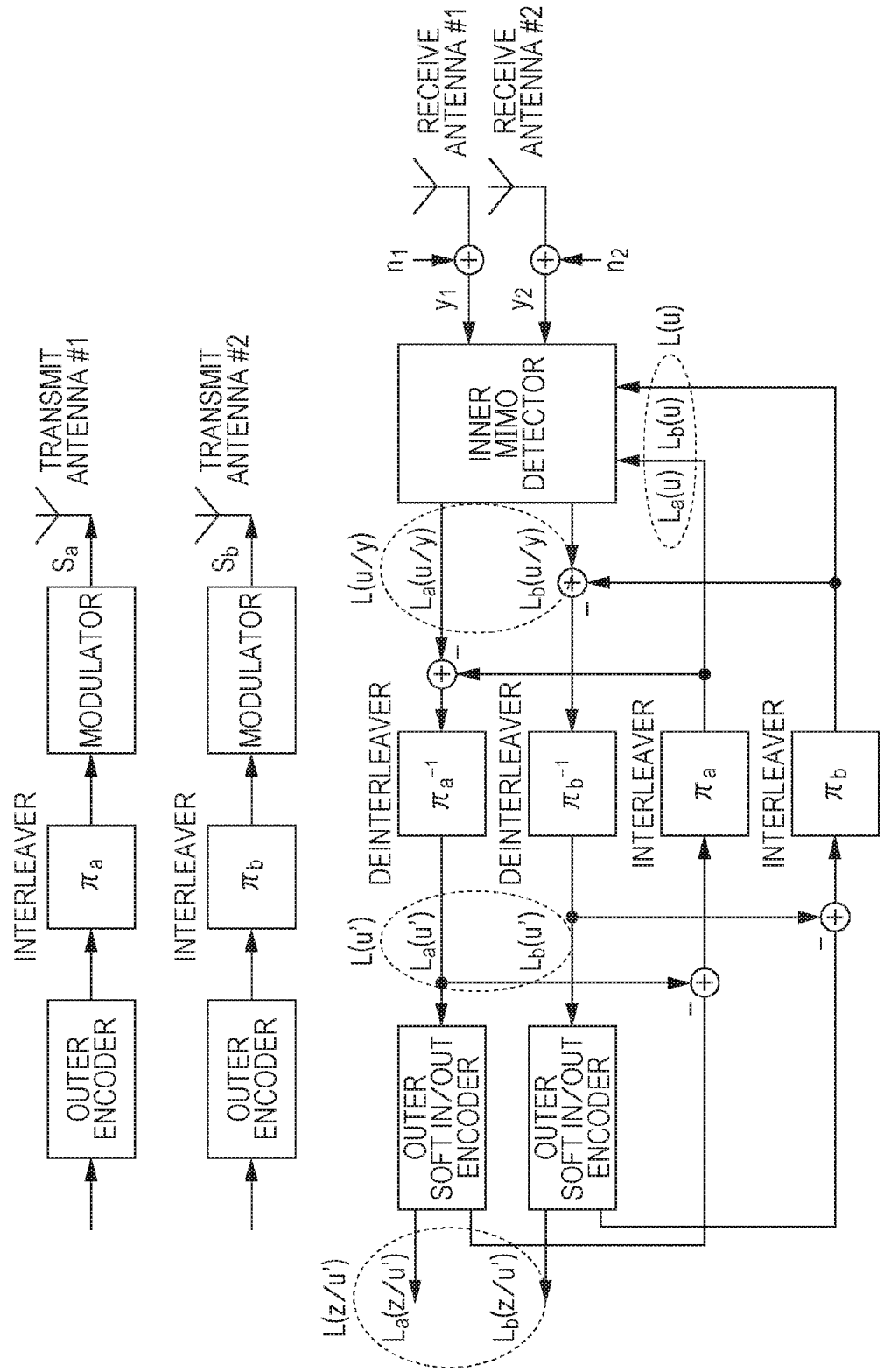
FIG. 1 is a view illustrating configuration examples of transmission and reception devices.

FIG. 1 illustrates configuration examples of transmission and reception devices for two transmit antennas, two receive antennas, and two transmission modulated signals (transmission streams). In the transmission device, coded data is interleaved, the interleaved data is modulated, frequency conversion is performed on the modulated data to generate a transmission signal, and the transmission signal is transmitted from the antenna. At this point, a scheme in which different modulated signals are transmitted from transmit antennas at the same clock time and the same frequency is a spatially multiplexed MIMO scheme.

PTL 1 discloses a transmission device including different interleaving patterns for different transmit antennas. That is, in the transmission device of FIG. 1, two interleavers ($\pi a$ and $\pi b$) have the interleaving patterns different from each other. In NPLs 1 and 2, in the reception device, the reception quality is improved by iteratively performing a detection method (the MIMO detector in FIG. 1) in which a soft value is used.

An NLOS (non-line of sight) environment typified by a Rayleigh fading environment and an LOS (line of sight) environment typified by a Rician fading environment exist as an actual propagation environment model in radio communication. The transmission device transmits a single modulated signal, and the reception device performs a maximum ratio combination on signals received by the plurality of antennas, and demodulates and decodes the signal after the maximum ratio combination. In such cases, the reception device can obtain good reception quality in the LOS environment, for example, the environment having a large Rician factor indicating magnitude of received power of a direct wave to received power of a scattered wave. However, depending on the transmission scheme (for example, spatially multiplexed MIMO transmission scheme), it is necessary for the reception device to address a problem in that the reception quality degrades with increasing Rician factor (see NPL 3).

Figure 2A:
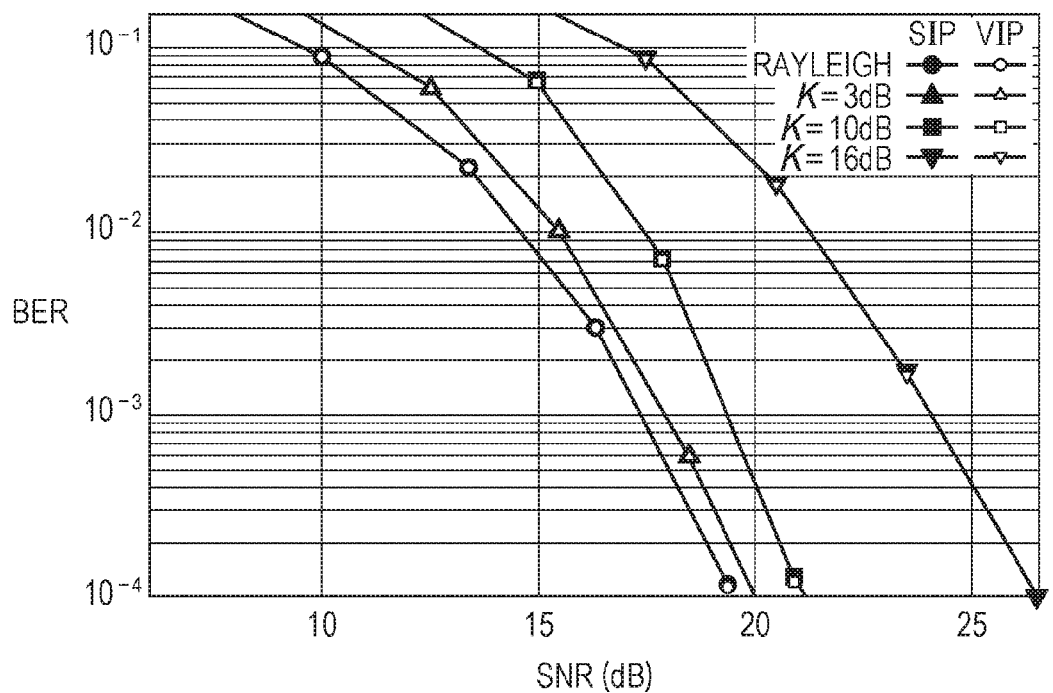
FIGS. 2A and 2B are views illustrating examples of simulation results of a BER (Bit Error Rate) characteristic (vertical axis: BER and horizontal axis: SNR (signal-to-noise power ratio)) when 2-by-2 (2-antenna transmission and 2-antenna reception) spatially multiplexed MIMO is performed on data subjected to LDPC (low-density parity-check) coding in a Rayleigh fading environment and a Rician fading environment with Rician factor K=3, 10, and 16 dB.
Figure 2B:
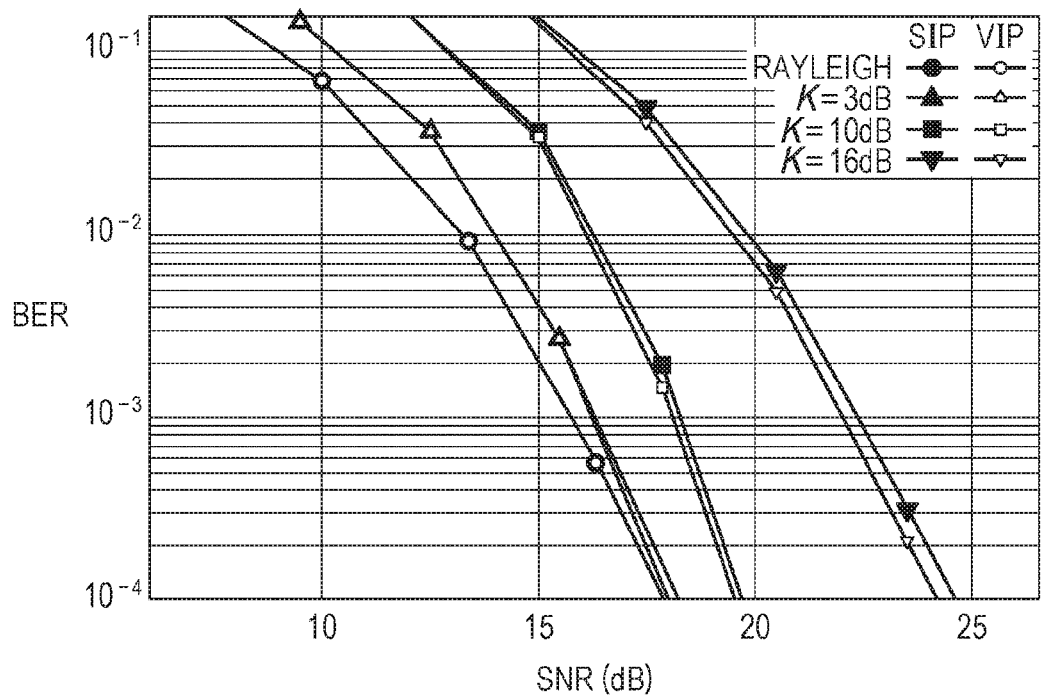

FIGS. 2A and 2B illustrates examples of simulation results of a BER (Bit Error Rate) characteristic (vertical axis: BER and horizontal axis: SNR (Signal-to-Noise power Ratio)) when 2-by-2 (2-antenna transmission and 2-antenna reception) spatially multiplexed MIMO is performed on data subjected to LDPC (Low-Density Parity-Check) coding in a Rayleigh fading environment and a Rician fading environment with Rician factor K=3, 10, and 16 dB.

FIG. 2A illustrates the BER characteristic of a Max-log-APP (APP: A Posterior Probability) in which iterative detection is not performed (see NPLs 1 and 2), and FIG. 2B illustrates the BER characteristic of the Max-log-APP in which the iterative detection is performed (a number of iterations is 5) (see NPLs 1 and 2).

As can be seen from FIGS. 2A and 2B, in the spatially multiplexed MIMO system, irrespective of the iterative detection, the reception quality degrades with increasing Rician factor in the reception device. This shows that the spatially multiplexed MIMO system has a unique characteristic that "in the spatially multiplexed MIMO system, the reception quality degrades in the reception device when the propagation environment is stabilized" unlike the conventional system that transmits the single modulated signal.

The broadcasting or the multi-cast communication is a service that needs to cope with various propagation environments, and the radio wave propagation environment between a receiver owned by a user and a broadcasting station can be the LOS environment. In the case that spatially multiplexed MIMO system having the characteristic is used in the broadcasting or the multi-cast communication, the service may be unavailable due to the degradation of the reception quality even if the radio wave has high reception field intensity in the receiver.

That is, in order to use the spatially multiplexed MIMO system in the broadcasting or the multi-cast communication, there is a demand for development of the MIMO transmission scheme in which a certain level of reception quality is obtained in both the NLOS environment and the LOS environment.

NPL 8 discloses a method for selecting a code book used in pre-coding (pre-coding matrix (also referred to as a pre-coding weight matrix)) from feedback information transmitted from a communication partner. However, as described above, NPL 8 does not disclose a method for performing the pre-coding in the situation in which the feedback information cannot be obtained from the communication partner in the broadcasting or multi-cast communication.

On the other hand, NPL 4 discloses a method for switching the pre-coding matrix with time, the method being applicable to the case that the feedback information does not exist. NPL 4 discloses that a unitary matrix is used as a matrix used in the pre-coding or that the unitary matrix is randomly switched.

NPL 4, which discloses the simply random switching, does not disclose a method applied to the degradation of the reception quality in the LOS environment. Neither description about the pre-coding method for improving the degradation of the reception quality in the LOS environment nor a method for constructing the pre-coding matrix is described in NPL 4.

NPL 4 does not disclose a signal point arrangement (mapping) in the in-phase I-orthogonal Q plane of the modulation scheme in applying the pre-coding, for example, a mapping method for improving the data reception quality in the LOS environment.

Hereinafter, an exemplary embodiment of the present disclosure will be described with reference to the drawings.

The present disclosure relates to a transmission method for improving the quality of the received data in the reception device when the MIMO (Multiple-Input Multiple-Output) scheme involving the plurality of transmit antennas and the plurality of receive antennas is used in the multi-cast transmission or the broadcasting.

A probability of increasing a minimum Euclid at the signal point in the in-phase I-orthogonal Q plane during the reception is increased in the radio wave propagation environment in which the direct wave is dominant, which allows the reception device to improve the quality of the received data.

An exemplary embodiment dealing with the characteristic will be described below.

First Exemplary Embodiment

First, a mapping method (a signal point arrangement in an in-phase I-orthogonal Q plane of a modulation scheme) according to the exemplary embodiment will be described with 16QAM, 64QAM, and 256QAM mapping methods as an example.

<16QAM Mapping>

The 16QAM mapping method will be described below.

Figure 3:
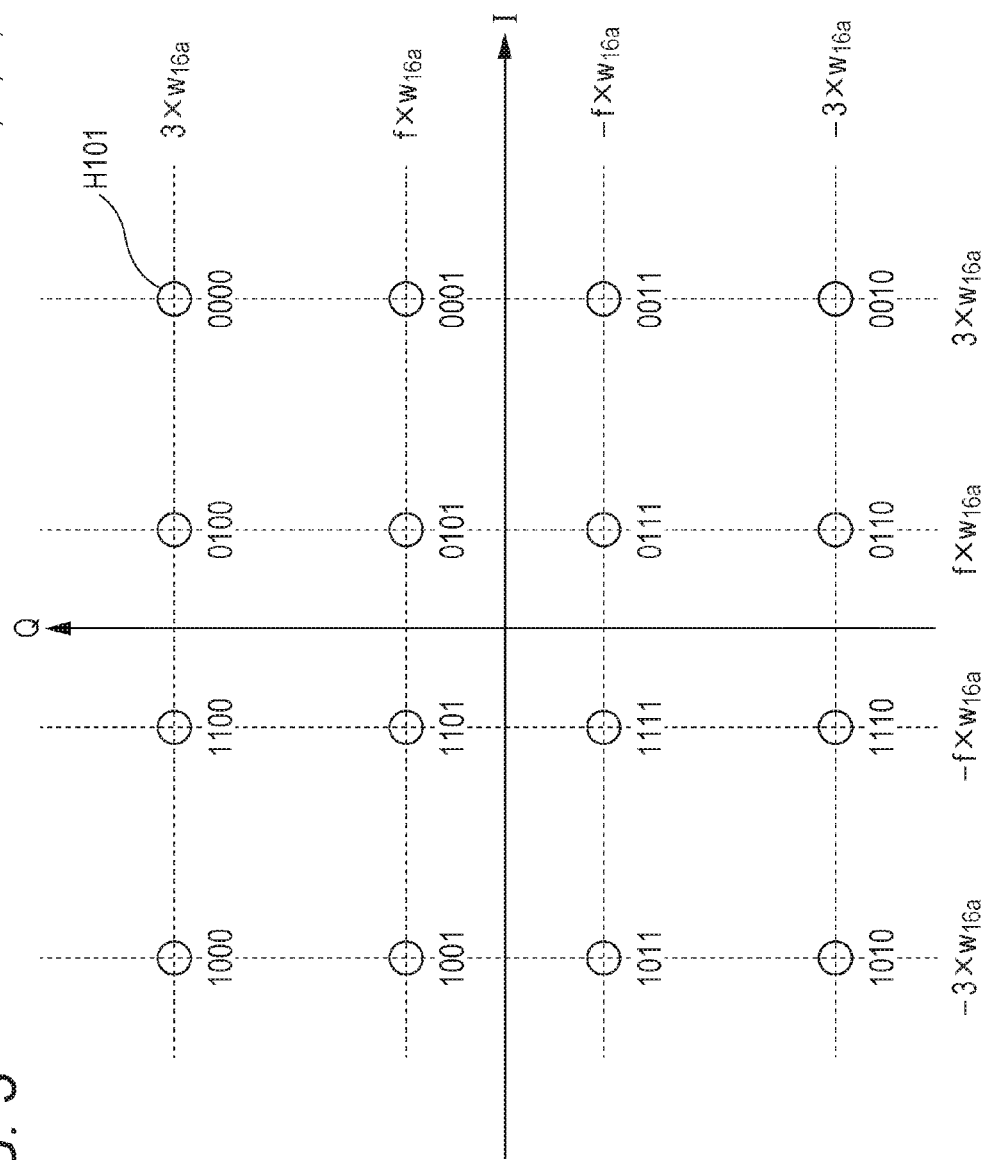
FIG. 3 is a view illustrating an example of a 16QAM signal point arrangement in an in-phase I-orthogonal Q plane.

FIG. 3 illustrates an example of a 16QAM signal point arrangement in the in-phase I-orthogonal Q plane. In FIG. 3, 16 marks "○" (white circle) indicate the 16QAM signal points, a horizontal axis indicates an in-phase component I, and a vertical axis indicates an orthogonal component Q.

In FIG. 3, f>0 (f is a real number greater than 0), f≠3, and f≠1 hold.

In the in-phase I-orthogonal Q plane, coordinates of the 16 signal points (in FIG. 3, the mark "○" indicates the signal point) for 16QAM are expressed as follows:
$(3 \times w_{16a}, 3 \times w_{16a}), (3 \times w_{16a}, f \times w_{16a}), (3 \times w_{16a}, -f \times w_{16a}), (3 \times w_{16a}, -3 \times w_{16a}), (f \times w_{16a}, 3 \times w_{16a}), (f \times w_{16a}, f \times w_{16a}), (f \times w_{16a}, -f \times w_{16a}), (f \times w_{16a}, -3 \times w_{16a}), (-f \times w_{16a}, 3 \times w_{16a}), (-f \times w_{16a}, f \times w_{16a}), (-f \times w_{16a}, -f \times w_{16a}), (-f \times w_{16a}, -3 \times w_{16a}), (-3 \times w_{16a}, 3 \times w_{16a}) (-3 \times w_{16a} \times, f \times w_{16a})\ (-3 \times w_{16a}, -f \times w_{16a}), (-3 \times w_{16a}, -3 \times w_{16a})$, where $w_{16a}$ is a real number greater than 0.

In FIG. 3, the bits to be transmitted (input bits) are set to b0, b1, b2, and b3. For example, the bits to be transmitted (b0,b1,b2,b3)=(0,0,0,0) are mapped in signal point H101 of FIG. 3 and $(I,Q)=(3 \times w_{16a}, 3 \times w_{16a})$ is obtained, where I and Q are the in-phase component and the orthogonal component of the post-mapping baseband signal, respectively.

That is, in-phase component I and orthogonal component Q of the post-mapping baseband signal (in 16QAM) are decided based on the bits to be transmitted (b0,b1,b2,b3). An example of the relationship between a set of b0, b1, b2, and b3 (0000 to 1111) and the coordinates of the signal point is indicated in FIG. 3. FIG. 3 illustrates the values of the sets of b0, b1, b2, and b3 (0000 to 1111) immediately below the 16 signal points (the marks "○" in FIG. 3) of 16QAM:
$(3 \times w_{16a}, 3 \times w_{16a}), (3 \times w_{16a}, f \times w_{16a}), (3 \times w_{16a}, -f \times w_{16a}), (3 \times w_{16a}, -3 \times w_{16a}), (f \times w_{16a}, 3 \times w_{16a}), (f \times w_{16a}, f \times w_{16a}), (f \times w_{16a}, -f \times w_{16a}), (f \times w_{16a}, -3 \times w_{16a}), (-f \times w_{16a}, 3 \times w_{16a}), (-f \times w_{16a}, f \times w_{16a}), (-f \times w_{16a}, -f \times w_{16a})(-f \times w_{16a}, -3 \times w_{16a}), (-3 \times w_{16a}, 3 \times w_{16a}), (-3 \times w_{16a}, f \times w_{16a}), (-3 \times w_{16a}, -f \times w_{16a}), (-3 \times w_{16a}, -3 \times w_{16a})$.

The coordinates in the in-phase I-orthogonal Q plane of the signal point ("○") immediately above the set of b0, b1, b2, and b3 (0000 to 1111) serve as in-phase component I and orthogonal component Q of the post-mapping baseband signal. The relationship between the set of b0, b1, b2, and b3 (0000 to 1111) in 16QAM and the coordinates of the signal point is not limited to that illustrated in FIG. 3.

The 16 signal points in FIG. 3 are referred to as "signal point 1", "signal point 2", . . . , "signal point 15", and "signal point 16" (because 16 signal points exist, "signal point 1" to "signal point 16" exist). Di is a distance between "signal point i" and an origin in the in-phase I-orthogonal Q plane. $w_{16a}$ is given as follows.

[Mathematical formula 1]

$$w_{16a} = \frac{z}{\sqrt{\frac{\sum_{i=1}^{16} D_i^2}{16}}} \quad \text{(Equation 1)}$$

$$= \frac{z}{\sqrt{\frac{((3^2+3^2) \times 4 + (f^2+f^2) \times 4 + (f^2+3^2) \times 8)}{16}}}$$

From (Equation 1), an average power of the post-mapping baseband signal is $z^2$.

The 16QAM mapping method is generally called non-uniform 16QAM. However, in this case, the 16QAM mapping method is referred to as "16QAM mapping method #1".

In above description, "$f\neq 3$ and $f\neq 1$" hold in FIG. 3. In the case that "$f=1$" is satisfied, the mapping method is referred to as uniform 16QAM, and is hereinafter referred to as "16QAM mapping method #0".

The 16QAM mapping method will be described below.

Figure 4:
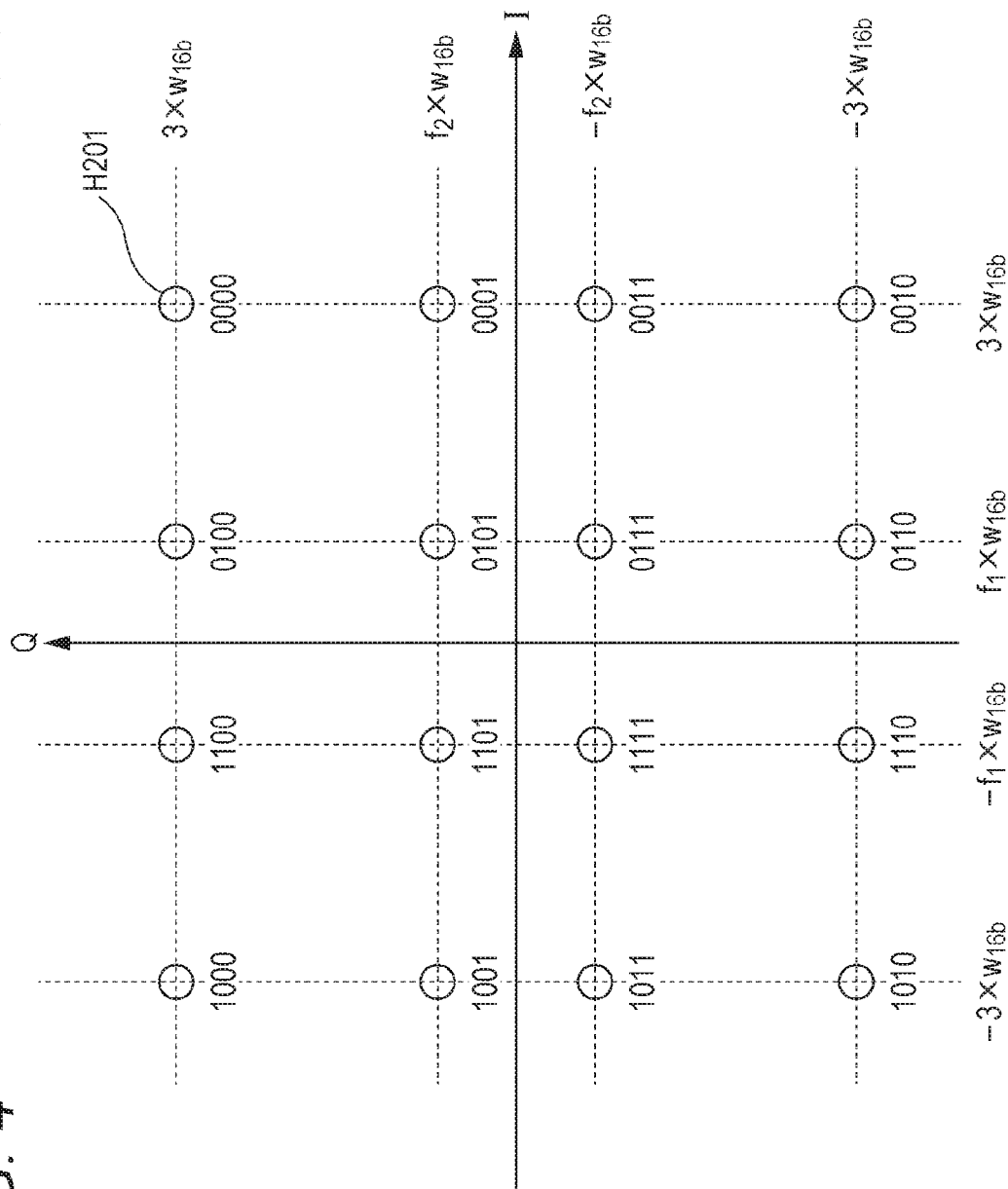
FIG. 4 is a view illustrating another example of the 16QAM signal point arrangement in the in-phase I-orthogonal Q plane.

FIG. 4 illustrates an example of the 16QAM signal point arrangement in the in-phase I-orthogonal Q plane. In FIG. 4, 16 marks "○" (white circle) indicate the 16QAM signal points, the horizontal axis indicates the in-phase component I, and the vertical axis indicates the orthogonal component Q.

In FIG. 4, $f_1 > 0$ ($f_1$ is a real number greater than 0), $f_2 > 0$ ($f_2$ is a real number greater than 0), $f_1 \neq 3$, $f_2 \neq 3$, and $f_1 \neq f_2$ hold.

In the in-phase I-orthogonal Q plane, coordinates of the 16 signal points (in FIG. 4, the mark "○" indicates the signal point) for 16QAM are expressed as follows:
$(3 \times w_{16b}, 3 \times w_{16b}), (3 \times w_{16b}, f_2 \times w_{16b}), (3 \times w_{16b}, -f_2 \times w_{16b}), (3 \times w_{16b}, -3 \times w_{16b}), (f_1 \times w_{16b}, 3 \times w_{16b}), (f_1 \times w_{16b}, f_2 \times w_{16b}), (f_1 \times w_{16b}, -f_2 \times w_{16b}), (f_1 \times w_{16b}, -3 \times w_{16b}), (-f_1 \times w_{16b}, 3 \times w_{16b}), (-f_1 \times w_{16b}, f_2 \times w_{16b}), (-f_1 \times w_{16b}, -f_2 \times w_{16b}), (-f_1 \times w_{16b}, -3 \times w_{16b}), (-3 \times w_{16b}, 3 \times w_{16b}), (-3 \times w_{16b}, f_2 \times w_{16b}), (-3 \times w_{16b}, -f_2 \times w_{16b}), (-3 \times w_{16b}, -3 \times w_{16b})$, where $w_{16b}$ is a real number greater than 0.

In FIG. 4, the bits (input bits) to be transmitted are set to b0, b1, b2, and b3. For example, the bits to be transmitted (b0,b1,b2,b3)=(0,0,0,0) are mapped in signal point H201 of FIG. 4 and (I,Q)=$(3 \times w_{16b}, 3 \times w_{16b})$ is obtained, where I and Q are the in-phase component and the orthogonal component of the post-mapping baseband signal, respectively.

That is, in-phase component I and orthogonal component Q of the post-mapping baseband signal (in 16QAM) are decided based on the bits to be transmitted (b0,b1,b2,b3). An example of the relationship between a set of b0, b1, b2, and b3 (0000 to 1111) and the coordinates of the signal point is indicated in FIG. 4. FIG. 4 illustrates the values of the sets of b0, b1, b2, and b3 (0000 to 1111) immediately below the 16 signal points (the marks "○" in FIG. 4) of 16QAM:
$(3 \times w_{16b}, 3 \times w_{16b}), (3 \times w_{16b}, f_2 \times w_{16b}), (3 \times w_{16b}, -f_2 \times w_{16b}), (3 \times w_{16b}, -3 \times w_{16b}), (f_1 \times w_{16b}, 3 \times w_{16b}), (f_1 \times w_{16b}, f_2 \times w_{16b}), (f_1 \times w_{16b}, -f_2 \times w_{16b}), (f_1 \times w_{16b}, -3 \times w_{16b}), (-f_1 \times w_{16b}, 3 \times w_{16b}), (-f_1 \times w_{16b}, f_2 \times w_{16b}), (-f_1 \times w_{16b}, -f_2 \times w_{16b}), (-f_1 \times w_{16b}, -3 \times w_{16b}), (-3 \times w_{16b}, 3 \times w_{16b}), (-3 \times w_{16b}, f_2 \times w_{16b}), (-3 \times w_{16b}, -f_2 \times w_{16b}), (-3 \times w_{16b}, -3 \times w_{16b})$.

The coordinates in the in-phase I-orthogonal Q plane of the signal point ("○") immediately above the set of b0, b1, b2, and b3 (0000 to 1111) serve as in-phase component I and orthogonal component Q of the post-mapping baseband signal. The relationship between the set of b0, b1, b2, and b3 (0000 to 1111) in 16QAM and the coordinates of the signal point is not limited to that illustrated in FIG. 4.

The 16 signal points in FIG. 4 are referred to as "signal point 1", "signal point 2", ..., "signal point 15", and "signal point 16" (because 16 signal points exist, "signal point 1" to "signal point 16" exist). Di is a distance between "signal point i" and an origin in the in-phase I-orthogonal Q plane. $w_{16b}$ is given as follows.

[Mathematical formula 2]

$$w_{16b} = \frac{z}{\sqrt{\frac{\sum_{i=1}^{16} D_i^2}{16}}} = \frac{z}{\sqrt{\frac{((3^2+3^2) \times 4 + (f_1^2+f_2^2) \times 4 + (f_1^2+3^2) \times 4 + (f_2^2+3^2) \times 4)}{16}}}$$

(Equation 2)

From (Equation 2), an average power of the post-mapping baseband signal is $z^2$.

Hereinafter, the 16QAM mapping method is referred to as "16QAM mapping method #2".

The 16QAM mapping method will be described below.

Figure 5:
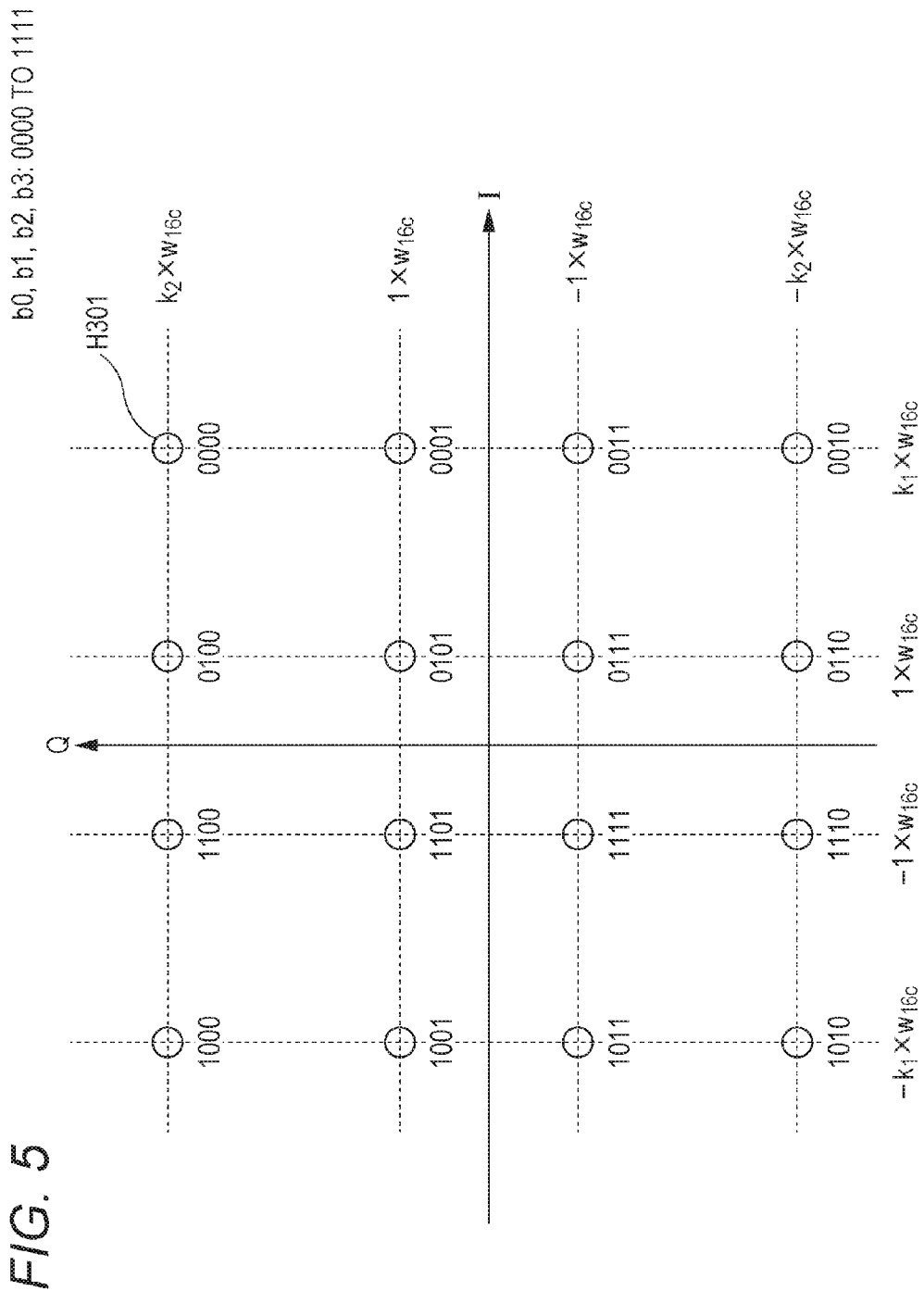
FIG. 5 is a view illustrating an example of the 16QAM signal point arrangement in the in-phase I-orthogonal Q plane.

FIG. 5 illustrates an example of the 16QAM signal point arrangement in the in-phase I-orthogonal Q plane. In FIG. 5, 16 marks "○" (white circle) indicate the 16QAM signal points, the horizontal axis indicates the in-phase component I, and the vertical axis indicates the orthogonal component Q.

In FIG. 5, $k_1 > 0$ ($k_1$ is a real number greater than 0), $k_2 > 0$ ($k_2$ is a real number greater than 0), $k_1 \neq 1$, $k_2 \neq 1$, and $k_1 \neq k_2$ hold.

In the in-phase I-orthogonal Q plane, coordinates of the 16 signal points (in FIG. 5, the mark "○" indicates the signal point) for 16QAM are expressed as follows:
$(k_1 \times w_{16c}, k_2 \times w_{16c}), (k_1 \times w_{16c}, 1 \times w_{16c}), (k_1 \times w_{16c}, -1 \times w_{16c}), (k_1 \times w_{16c}, -k_2 \times w_{16c}), (1 \times w_{16c}, k_2 \times w_{16c}), (1 \times w_{16c}, 1 \times w_{16c}), (1 \times w_{16c}, -1 \times w_{16c}), (1 \times w_{16c}, -k_2 \times w_{16c}), (-1 \times w_{16c}, k_2 \times w_{16c}), (-1 \times w_{16c}, 1 \times w_{16c}), (-1 \times w_{16c}, -1 \times w_{16c}), (-1 \times w_{16c}, -k_2 \times w_{16c}), (-k_1 \times w_{16c}, k_2 \times w_{16c}), (-k_1 \times w_{16c}, 1 \times w_{16c}), (-k_1 \times w_{16c}, -1 \times w_{16c}), (-k_1 \times w_{16c}, -k_2 \times w_{16c})$, where $w_{16c}$ is a real number greater than 0.

In FIG. 5, the bits (input bits) to be transmitted are set to b0, b1, b2, and b3. For example, the bits to be transmitted (b0,b1,b2,b3)=(0,0,0,0) are mapped in signal point H301 of FIG. 5 and (I,Q)=$(k_1 \times w_{16c}, k_2 \times w_{16c})$ is obtained, where I and Q are the in-phase component and the orthogonal component of the post-mapping baseband signal, respectively.

That is, in-phase component I and orthogonal component Q of the post-mapping baseband signal (in 16QAM) are decided based on the bits to be transmitted (b0,b1,b2,b3). An example of the relationship between a set of b0, b1, b2, and b3 (0000 to 1111) and the coordinates of the signal point is indicated in FIG. 5. FIG. 5 illustrates the values of the sets of b0, b1, b2, and b3 (0000 to 1111) immediately below the 16 signal points (the marks "○" in FIG. 5) of 16QAM:
$(k_1 \times w_{16c}, k_2 \times w_{16c}), (k_1 \times w_{16c}, 1 \times w_{16c}), (k_1 \times w_{16c}, -1 \times w_{16c}), (k_1 \times w_{16c}, -k_2 \times w_{16c}), (1 \times w_{16c}, k_2 \times w_{16c}), (1 \times w_{16c}, \times w_{16c}), (1 \times w_{16c}, -1 \times w_{16c}), (1 \times w_{16c}, -k_2 \times w_{16c}), (-1 \times w_{16c}, k_2 \times w_{16c}), (-1 \times w_{16c}, 1 \times w_{16c}), (-1 \times w_{16c}, -1 \times w_{16c}), (-1 \times w_{16c}, -k_2 \times w_{16c}), (-k_1 \times w_{16c}, k_2 \times w_{16c}), (-k_1 \times w_{16c}, 1 \times w_{16c}), (-k_1 \times w_{16c}, -1 \times w_{16c}), (-k_1 \times w_{16c}, -k_2 \times w_{16c})$.

The coordinates in the in-phase I-orthogonal Q plane of the signal point ("○") immediately above the set of b0, b1, b2, and b3 (0000 to 1111) serve as in-phase component I and orthogonal component Q of the post-mapping baseband signal. The relationship between the set of b0, b1, b2, and b3 (0000 to 1111) in 16QAM and the coordinates of the signal point is not limited to that illustrated in FIG. 5.

The 16 signal points in FIG. 5 are referred to as "signal point 1", "signal point 2", . . . , "signal point 15", and "signal point 16" (because 16 signal points exist, "signal point 1" to "signal point 16" exist). Di is a distance between "signal point i" and an origin in the in-phase I-orthogonal Q plane. $w_{16c}$ is given as follows.

[Mathematical formula 3]

$$w_{16c} = \frac{z}{\sqrt{\frac{\sum_{i=1}^{16} D_i^2}{16}}} = \frac{z}{\sqrt{\frac{((1^2 + 1^2) \times 4 + (k_1^2 + k_2^2) \times 4 + (k_1^2 + 1^2) \times 4 + (k_2^2 + 1^2) \times 4)}{16}}}$$

(Equation 3)

From (Equation 3), an average power of the post-mapping baseband signal is $z^2$.

Hereinafter, the 16QAM mapping method is referred to as "16QAM mapping method #3".

The 64QAM mapping method will be described below.

Figure 6:
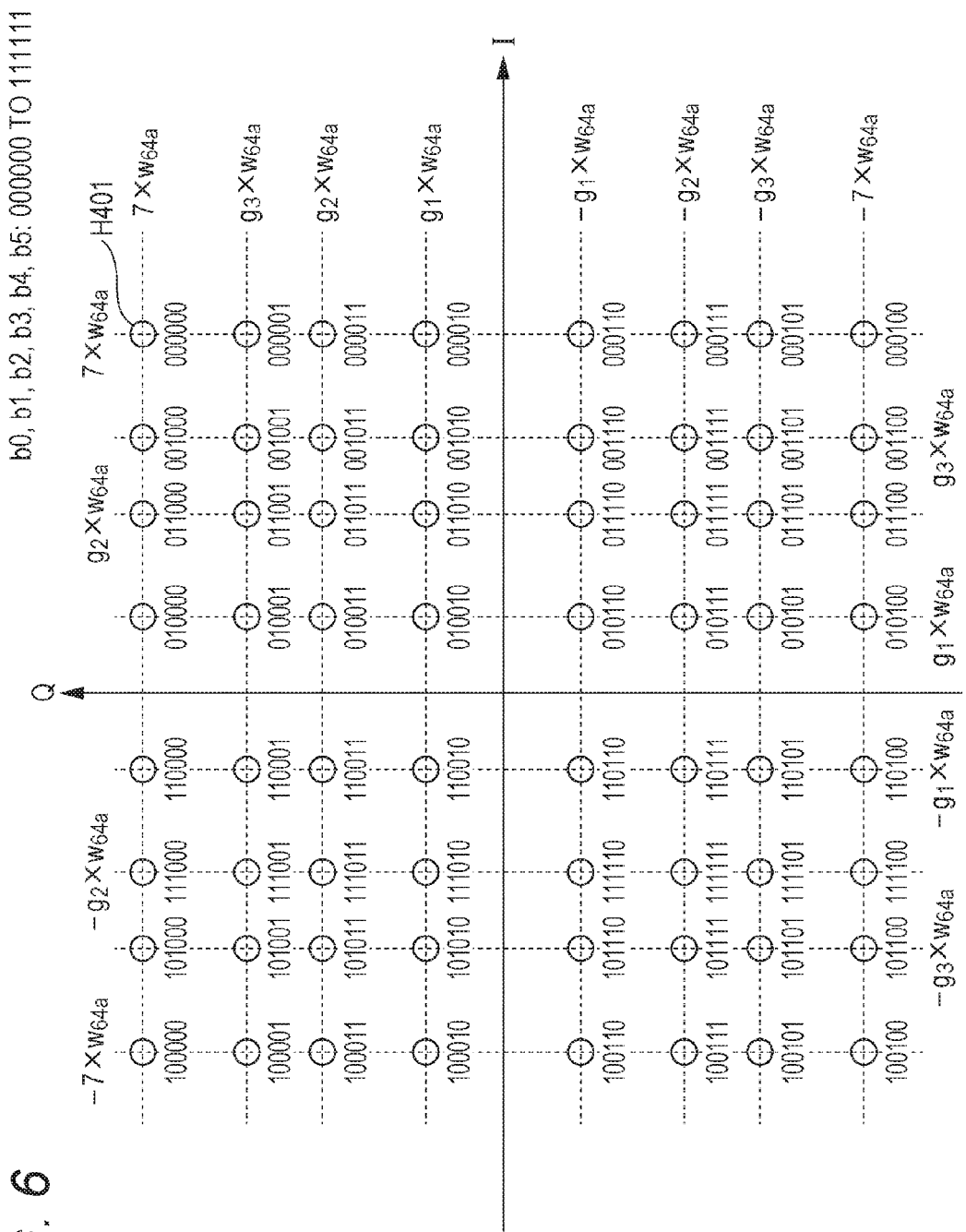
FIG. 6 is a view illustrating an example of a 64QAM signal point arrangement in the in-phase I-orthogonal Q plane.

FIG. 6 illustrates an example of a 64QAM signal point arrangement in the in-phase I-orthogonal Q plane. In FIG. 6, 64 marks "○" (white circle) indicate the 64QAM signal points, the horizontal axis indicates the in-phase component I, and the vertical axis indicates the orthogonal component Q.

In FIG. 6,
$g_1 > 0$ ($g_1$ is a real number greater than 0) and $g_2 > 0$ ($g_2$ is a real number greater than 0) and $g_3 > 0$ ($g_3$ is a real number greater than 0) hold,
$\{\{g_1 \neq 7 \text{ and } g_2 \neq 7 \text{ and } g_3 \neq 7\} \text{ holds}\}$, and
$\{\{(g_1,g_2,g_3) \neq (1,3,5) \text{ and } (g_1,g_2,g_3) \neq (1,5,3) \text{ and } (g_1,g_2,g_3) \neq (3,1,5) \text{ and } (g_1,g_2,g_3) \neq (3,5,1) \text{ and } (g_1,g_2,g_3) \neq (5,1,3) \text{ and } (g_1,g_2,g_3) \neq (5,3,1)\} \text{ holds}\}$, and
$\{\{g_1 \neq g_2 \text{ and } g_1 \neq g_3 \text{ and } g_2 \neq g_3\} \text{ holds}\}$.

In the in-phase I-orthogonal Q plane, coordinates of the 64 signal points (in FIG. 6, the mark "○" indicates the signal point) for 64QAM are expressed as follows:
$(7 \times w_{64a}, 7 \times w_{64a}), (7 \times w_{64a}, g_3 \times w_{64a}), (7 \times w_{64a}, g_2 \times w_{64a}), (7 \times w_{64a}, g_1 \times w_{64a}), (7 \times w_{64a}, -g_1 \times w_{64a}), (7 \times w_{64a}, -g_2 \times w_{64a}), (7 \times w_{64a}, -g_3 \times w_{64a}), (7 \times w_{64a}, -7 \times w_{64a})$, $(g_3 \times w_{64a}, 7 \times w_{64a}), (g_3 \times w_{64a}, g_3 \times w_{64a}), (g_3 \times w_{64a}, g_2 \times w_{64a}), (g_3 \times w_{64a}, g_1 \times w_{64a}), (g_3 \times w_{64a}, -g_1 \times w_{64a}), (g_3 \times w_{64a}, -g_2 \times w_{64a}), (g_3 \times w_{64a}, -g_3 \times w_{64a}), (g_3 \times w_{64a}, -7 \times w_{64a})$, $(g_2 \times w_{64a}, 7 \times w_{64a}), (g_2 \times w_{64a}, g_3 \times w_{64a}), (g_2 \times w_{64a}, g_2 \times w_{64a}), (g_2 \times w_{64a}, g_1 \times w_{64a}), (g_2 \times w_{64a}, -g_1 \times w_{64a}), (g_2 \times w_{64a}, -g_2 \times w_{64a}), (g_2 \times w_{64a}, -g_3 \times w_{64a}), (g_2 \times w_{64a}, -7 \times w_{64a})$, $(g_1 \times w_{64a}, 7 \times w_{64a}), (g_1 \times w_{64a}, g_3 \times w_{64a}), (g_1 \times w_{64a}, g_2 \times w_{64a}), (g_1 \times w_{64a}, g_1 \times w_{64a}), (g_1 \times w_{64a}, -g_1 \times w_{64a}), (g_1 \times w_{64a}, -g_2 \times w_{64a}), (g_1 \times w_{64a}, -g_3 \times w_{64a}), (g_1 \times w_{64a}, -7 \times w_{64a})$, $(-g_1 \times w_{64a}, 7 \times w_{64a}), (-g_1 \times w_{64a}, g_3 \times w_{64a}), (-g_1 \times w_{64a}, g_2 \times w_{64a}), (-g_1 \times w_{64a}, g_1 \times w_{64a}), (-g_1 \times w_{64a}, -g_1 \times w_{64a}), (-g_1 \times w_{64a}, -g_2 \times w_{64a}), (-g_1 \times w_{64a}, -g_3 \times w_{64a}), (-g_1 \times w_{64a}, -7 \times w_{64a})$, $(-g_2 \times w_{64a}, 7 \times w_{64a}), (-g_2 \times w_{64a}, g_3 \times w_{64a}), (-g_2 \times w_{64a}, g_2 \times w_{64a}), (-g_2 \times w_{64a}, g_1 \times w_{64a}), (-g_2 \times w_{64a}, -g_1 \times w_{64a}), (-g_2 \times w_{64a}, -g_2 \times w_{64a}), (-g_2 \times w_{64a}, -g_3 \times w_{64a}), (-g_2 \times w_{64a}, -7 \times w_{64a})$, $(-g_3 \times w_{64a}, 7 \times w_{64a}), (-g_3 \times w_{64a}, g_3 \times w_{64a}), (-g_3 \times w_{64a}, g_2 \times w_{64a}), (-g_3 \times w_{64a}, g_1 \times w_{64a}), (-g_3 \times w_{64a}, -g_1 \times w_{64a}), (-g_3 \times w_{64a}, -g_2 \times w_{64a}), (-g_3 \times w_{64a}, -g_3 \times w_{64a}), (-g_3 \times w_{64a}, -7 \times w_{64a})$, $(-7 \times w_{64a}, 7 \times w_{64a}), (-7 \times w_{64a}, g_3 \times w_{64a}), (-7 \times w_{64a}, g_2 \times w_{64a}), (-7 \times w_{64a}, g_1 \times w_{64a}), (-7 \times w_{64a}, -g_1 \times w_{64a}), (-7 \times w_{64a}, -g_2 \times w_{64a}), (-7 \times w_{64a}, -g_3 \times w_{64a}), (-7 \times w_{64a}, -7 \times w_{64a})$, where $w_{64a}$ is a real number greater than 0.

In FIG. 6, the bits (input bits) to be transmitted are set to b0, b1, b2, b3, b4, and b5. For example, the bits to be transmitted (b0,b1,b2,b3,b4,b5)=(0,0,0,0,0,0) are mapped in signal point H401 of FIG. 6 and $(I,Q)=(7 \times w_{64a}, 7 \times w_{64a})$ is obtained, where I and Q are the in-phase component and the orthogonal component of the post-mapping baseband signal, respectively.

That is, in-phase component I and orthogonal component Q of the post-mapping baseband signal (in 64QAM) are decided based on the bits to be transmitted (b0,b1,b2,b3,b4,b5). An example of the relationship between a set of b0, b1, b2, b3, b4, and b5 (000000 to 111111) and the coordinates of the signal point is indicated in FIG. 6. FIG. 6 illustrates the values of the sets of b0, b1, b2, b3, b4, and b5 (000000 to 111111) immediately below the 64 signal points (the marks "○" in FIG. 6) of 64QAM:
$(7 \times w_{64a}, 7 \times w_{64a}), (7 \times w_{64a}, g_3 \times w_{64a}), (7 \times w_{64a}, g_2 \times w_{64a}), (7 \times w_{64a}, g_1 \times w_{64a}), (7 \times w_{64a}, -g_1 \times w_{64a}), (7 \times w_{64a}, -g_2 \times w_{64a}), (7 \times w_{64a}, -g_3 \times w_{64a}), (7 \times w_{64a}, -7 \times w_{64a}), (g_3 \times w_{64a}, 7 \times w_{64a}), (g_3 \times w_{64a}, g_3 \times w_{64a}), (g_1 \times w_{64a}, g_2 \times w_{64a}), (g_3 \times w_{64a}, g_1 \times w_{64a}), (g_3 \times w_{64a}, -g_1 \times w_{64a}), (g_3 \times w_{64a}, -g_2 \times w_{64a}), (g_3 \times w_{64a}, -g_3 \times w_{64a}), (g_3 \times w_{64a}, -7 \times w_{64a}), (g_2 \times w_{64a}, 7 \times w_{64a}), (g_2 \times w_{64a}, g_3 \times w_{64a}), (g_2 \times w_{64a}, g_2 \times w_{64a}), (g_2 \times w_{64a}, g_1 \times w_{64a}), (g_2 \times w_{64a}, -g_1 \times w_{64a}), (g_2 \times w_{64a}, -g_2 \times w_{64a}), (g_2 \times w_{64a}, -g_3 \times w_{64a}), (g_2 \times w_{64a}, -7 \times w_{64a}), (g_1 \times w_{64a}, 7 \times w_{64a}), (g_1 \times w_{64a}, g_3 \times w_{64a}), (g_1 \times w_{64a}, g_2 \times w_{64a}), (g_1 \times w_{64a}, g_1 \times w_{64a}), (g_1 \times w_{64a}, -g_1 \times w_{64a}), (g_1 \times w_{64a}, -g_2 \times w_{64a}), (g_1 \times w_{64a}, -g_3 \times w_{64a}), (g_1 \times w_{64a}, -7 \times w_{64a})$, $(-g_1 \times w_{64a}, 7 \times w_{64a}), (-g_1 \times w_{64a}, g_3 \times w_{64a}), (-g_1 \times w_{64a}, g_2 \times w_{64a}), (-g_1 \times w_{64a}, g_1 \times w_{64a}), (-g_1 \times w_{64a}, -_1 \times w_{64a}), (-_1 \times w_{64a}, -g_2 \times w_{64a}), (-g_1 \times w_{64a}, -g_3 \times w_{64a}), (-g_1 \times w_{64a}, -7 \times w_{64a})$, $(-g_2 \times w_{64a}, 7 \times w_{64a}), (-g_2 \times w_{64a}, g_3 \times w_{64a}), (-g_2 \times w_{64a}, g_2 \times w_{64a}), (-g_2 \times w_{64a}, g_1 \times w_{64a}), (-g_2 \times w_{64a}, -g_1 \times w_{64a}), (-g_2 \times w_{64a}, -g_2 \times w_{64a}), (-g_2 \times w_{64a}, -3 \, w_{64a}), (-g_2 \times w_{64a}, -7 \times w_{64a})$, $(-g_3 \times w_{64a}, 7 \times w_{64a}), (-g_3 \times w_{64a}, g_3 \times w_{64a}), (-g_3 \times w_{64a}, g_2 \times w_{64a}), (-g_3 \times w_{64a}, g_1 \times w_{64a}), (-g_3 \times w_{64a}, -1 \times w_{64a}), (-g_3 \times w_{64a}, -g_2 \times w_{64a}), (-g_3 \times w_{64a}, -g_3 \times w_{64a}), (-g_3 \times w_{64a}, -7 \times w_{64a})$, $(-7 \times w_{64a}, 7 \times w_{64a}), (-7 \times w_{64a}, g_3 \times w_{64a}), (-7 \times w_{64a}, g_2 \times w_{64a}), (-7 \times w_{64a}, g_1 \times w_{64a}), (-7 \times w_{64a}, -g_1 \times w_{64a}), (-7 \times w_{64a}, -g_2 \times w_{64a}), (-7 \times w_{64a}, -g_3 \times w_{64a}), (-7 \times w_{64a}, -7 \times w_{64a})$.

The coordinates in the in-phase I-orthogonal Q plane of the signal point ("○") immediately above the set of b0, b1, b2, b3, b4, and b5 (000000 to 111111) serve as in-phase component I and orthogonal component Q of the post-mapping baseband signal. The relationship between the set of b0, b1, b2, b3, b4, and b5 (000000 to 111111) in 64QAM and the coordinates of the signal point is not limited to that illustrated in FIG. 6.

The 64 signal points in FIG. 6 are referred to as "signal point 1", "signal point 2", . . . , "signal point 63", and "signal point 64" (because 64 signal points exist, "signal point 1" to "signal point 64" exist). Di is a distance between "signal point i" and an origin in the in-phase I-orthogonal Q plane. $w_{64a}$ is given as follows.

[Mathematical formula 4]

$$w_{64a} = \frac{z}{\sqrt{\frac{\sum_{i=1}^{64} D_i^2}{64}}} \quad \text{(Equation 4)}$$

From (Equation 4), an average power of the post-mapping baseband signal is $z^2$.

The 64QAM mapping method is generally called non-uniform 64QAM. However, in this case, the 64QAM mapping method is referred to as "64QAM mapping method #1".

The mapping method in the case that "$(g_1,g_2,g_3) \neq (1,3,5)$" is satisfied in the above description is generally referred to as uniform 64QAM, and is hereinafter referred to as "64QAM mapping method #0".

Figure 7:
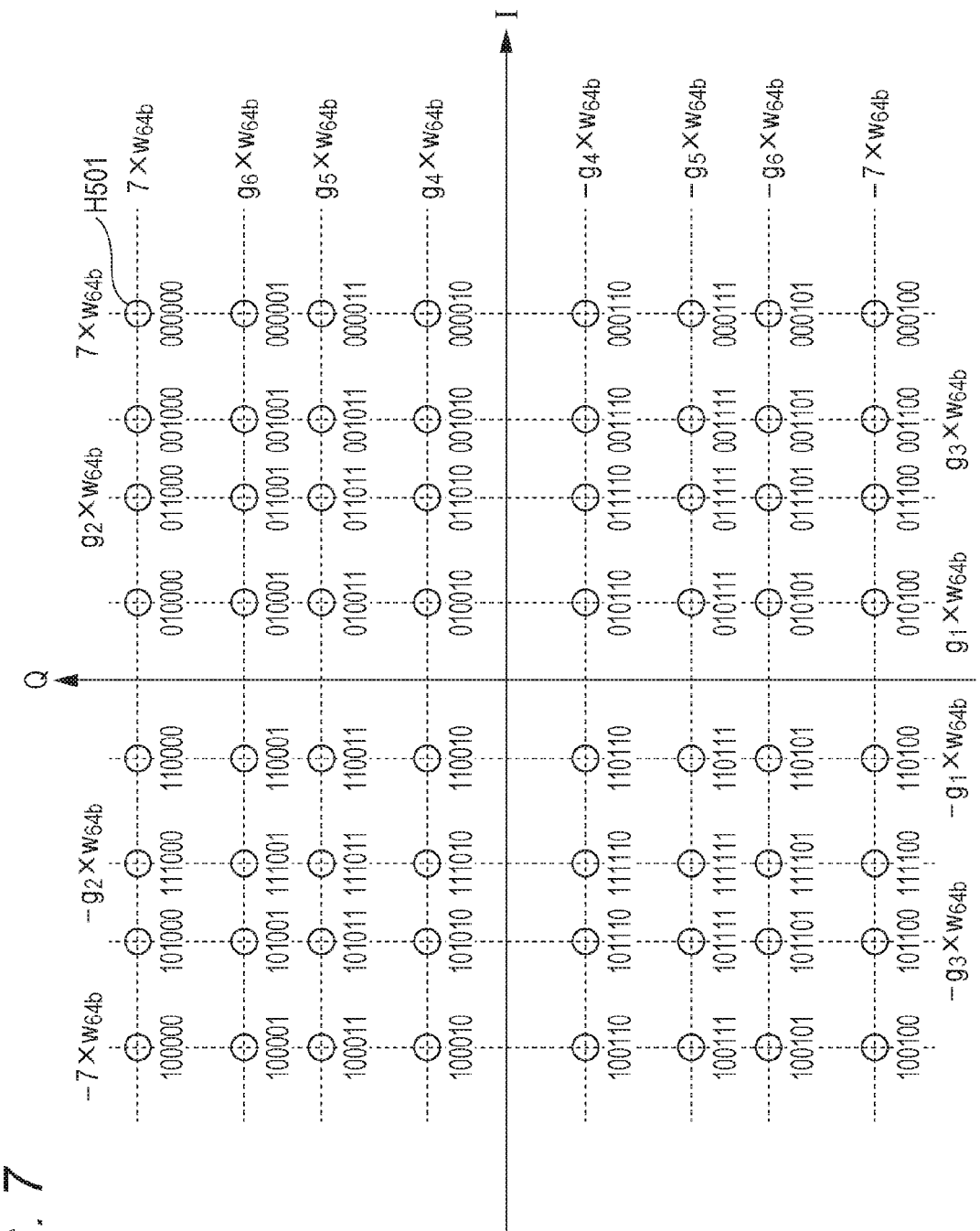
FIG. 7 is a view illustrating another example of the 64QAM signal point arrangement in the in-phase I-orthogonal Q plane.

FIG. 7 illustrates an example of the 64QAM signal point arrangement in the in-phase I-orthogonal Q plane. In FIG. 7, 64 marks "○" (white circle) indicate the 64QAM signal points, the horizontal axis indicates the in-phase component I, and the vertical axis indicates the orthogonal component Q.

In FIG. 7,
$g_1 > 0$ ($g_1$ is a real number greater than 0) and $g_2 > 0$ ($g_2$ is a real number greater than 0) and $g_3 > 0$ ($g_3$ is a real number greater than 0) and $g_4 > 0$ ($g_4$ is a real number greater than 0) and $g_5 > 0$ ($g_5$ is a real number greater than 0) and $g_6 > 0$ ($g_6$ is a real number greater than 0) hold, and
$\{g_1 \neq 7$ and $g_2 \neq 7$ and $g_3 \neq 7$ and $g_1 \neq g_2$ and $g_1 \neq g_3$ and $g_2 \neq g_3\}$ and
$\{g_4 \neq 7$ and $g_5 \neq 7$ and $g_5 \neq 7$ and $g_4 \neq g_5$ and $g_4 \neq g_6$ and $g_5 \neq g_6\}$ and
$\{\{g_1 \neq g_4$ or $g_2 \neq g_5$ or $g_3 \neq g_6\}$ holds$\}$ hold.

In the in-phase I-orthogonal Q plane, coordinates of the 64 signal points (in FIG. 7, the mark "○" indicates the signal point) for 64QAM are expressed as follows:
$(7 \times w_{64b}, 7 \times w_{64b}), (7 \times w_{64b}, g_6 \times w_{64b}), (7 \times w_{64b}, g_5 \times w_{64b}), (7 \times w_{64b}, g_4 \times w_{64b}), (7 \times w_{64b}, -g_4 \times w_{64b}), (7 \times w_{64b}, -g_5 \times w_{64b}), (7 \times w_{64b}, -g_6 \times w_{64b}), (7 \times w_{64b}, -7 \times w_{64b}), \quad (g_3 \times w_{64b}, 7 \times w_{64b}), (g_3 \times w_{64b}, g_6 \times w_{64b}), (g_3 \times w_{64b}, g_5 \times w_{64b}), (g_3 \times w_{64b}, g_4 \times w_{64b}), (g_3 \times w_{64b}, -g_4 \times w_{64b}), (g_3 \times w_{64b}, -g_5 \times w_{64b}), (g_3 \times w_{64b}, -g_6 \times w_{64b}), (g_3 \times w_{64b}, -7 \times w_{64b}), \quad (g_2 \times w_{64b}, 7 \times w_{64b}), (g_2 \times w_{64b}, g_6 \times w_{64b}), (g_2 \times w_{64b}, g_5 \times w_{64b}), (g_2 \times w_{64b}, g_4 \times w_{64b}), (g_2 \times w_{64b}, -g_4 \times w_{64b}), (g_2 \times w_{64b}, -g_5 \times w_{64b}), (g_2 \times w_{64b}, -g_6 \times w_{64b}), (g_2 \times w_{64b}, -7 \times w_{64b}), \quad (g_1 \times w_{64b}, 7 \times w_{64b}), (7 \times w_{64b}, g_6 \times w_{64b}), (g_1 \times w_{64b}, g_5 \times w_{64b}), (g_1 \times w_{64b}, g_4 \times w_{64b}), (g_1 \times w_{64b}, -g_4 \times w_{64b}), (g_1 \times w_{64b}, -g_5 \times w_{64b}), (g_1 \times w_{64b}, -g_6 \times w_{64b}), (g_1 \times w_{64b}, -7 \times w_{64b}), \quad (-g_1 \times w_{64b}, 7 \times w_{64b}), (-g_1 \times w_{64b}, g_6 \times w_{64b}), (-g_1 \times w_{64b}, g_5 \times w_{64b}), (-g_1 \times w_{64b}, g_4 \times w_{64b}), (-g_1 \times w_{64b}, -g_3 \times w_{64b}), (-g_2 \times w_{64b}, -g_5 \times w_{64b}), (-g_1 \times w_{64b}, -g_6 \times w_{64b}), (-g_1 \times w_{64b}, -7 \times w_{64b}), \quad (-g_2 \times w_{64b}, 7 \times w_{64b}), (-g_2 \times w_{64b}, g_6 \times w_{64b}), (-g_2 \times w_{64b}, g_5 \times w_{64b}), (-g_2 \times w_{64b}, g_4 \times w_{64b}), (-g_2 \times w_{64b}, -g_4 \times w_{64b}), (-g_2 \times w_{64b}, -g_5 \times w_{64b}), (-g_2 \times w_{64b}, -g_6 \times w_{64b}), (-g_2 \times w_{64b}, -7 \times w_{64b}), \quad (-g_3 \times w_{64b}, g_7 \times w_{64b}), (-g_3 \times w_{64b}, g_6 \times w_{64b}), (-g_3 \times w_{64b}, g_5 \times w_{64b}), (-3 \times w_{64b}, g_4 \times w_{64b}), (-g_3 \times w_{64b}, -g_4 \times w_{64b}), (-g_3 \times w_{64b}, -g_5 \times w_{64b}), (-g_3 \times w_{64b}, -g_6 \times w_{64b}), (-g_3 \times w_{64b}, -7 \times w_{64b}), \quad (-7 \times w_{64b}, 7 \times w_{64b}), (-7 \times w_{64b}, g_6 \times w_{64b}), (-7 \times w_{64b}, g_5 \times w_{64b}), (-7 \times w_{64b}, g_4 \times w_{64b}), (-7 \times w_{64b}, -g_4 \times w_{64b}), (-7 \times w_{64b}, -g_5 \times w_{64b}), (-7 \times w_{64b}, -g_6 \times w_{64b}), (-7 \times w_{64b}, -7 \times w_{64b})$, where $w_{64b}$ is a real number greater than 0.

In FIG. 7, the bits (input bits) to be transmitted are set to b0, b1, b2, b3, b4, and b5. For example, the bits to be transmitted (b0,b1,b2,b3,b4,b5)=(0,0,0,0,0,0) are mapped in signal point H501 of FIG. 7 and $(I,Q)=(7 \times w_{64b}, 7 \times w_{64b})$ is obtained, where I and Q are the in-phase component and the orthogonal component of the post-mapping baseband signal, respectively.

That is, in-phase component I and orthogonal component Q of the post-mapping baseband signal (in 64QAM) are decided based on the bits to be transmitted (b0,b1,b2,b3,b4,b5). An example of the relationship between a set of b0, b1, b2, b3, b4, and b5 (000000 to 111111) and the coordinates of the signal point is indicated in FIG. 7. FIG. 7 illustrates the values of the sets of b0, b1, b2, b3, b4, and b5 (000000 to 111111) immediately below the 64 signal points (the marks "○" in FIG. 7) of 64QAM:
$(7 \times w_{64b}, 7 \times w_{64b}), (7 \times w_{64b}, g_6 \times w_{64b}), (7 \times w_{64b}, g_5 \times w_{64b}), (7 \times w_{64b}, g_4 \times w_{64b}), (7 \times w_{64b}, -g_4 \times w_{64b}), (7 \times w_{64b}, -g_5 \times w_{64b}), (7 \times w_{64b}, -g_6 \times w_{64b}), (7 \times w_{64b}, -7 \times w_{64b}), \quad (g_3 \times w_{64b}, 7 \times w_{64b}), (g_3 \times w_{64b}, g_6 \times w_{64b}), (g_3 \times w_{64b}, g_5 \times w_{64b}), (g_3 \times w_{64b}, g_4 \times w_{64b}), (g_3 \times w_{64b}, -g_4 \times w_{64b}), (g_3 \times w_{64b}, -g_5 \times w_{64b}), (g_3 \times w_{64b}, -g_6 \times w_{64b}), (g_3 \times w_{64b}, -7 \times w_{64b}), \quad (g_2 \times w_{64b}, 7 \times w_{64b}), (g_2 \times w_{64b}, g_6 \times w_{64b}), (g_2 \times w_{64b}, g_5 \times w_{64b}), (g_2 \times w_{64b}, g_4 \times w_{64b}), (g_2 \times w_{64b}, -g_4 \times w_{64b}), (g_2 \times w_{64b}, -g_5 \times w_{64b}), (g_2 \times w_{64b}, -g_6 \times w_{64b}), (g_2 \times w_{64b}, -7 \times w_{64b}), \quad (g_1 \times w_{64b}, 7 \times w_{64b}), (g_1 \times w_{64b}, g_6 \times w_{64b}), (g_1 \times w_{64b}, g_5 \times w_{64b}), (g_1 \times w_{64b}, g_4 \times w_{64b}), (g_1 \times w_{64b}, -g_4 \times w_{64b}), (g_1 \times w_{64b}, -g_5 \times w_{64b}), (g_1 \times w_{64b}, -g_6 \times w_{64b}), (g_1 \times w_{64b}, -7 \times w_{64b}), \quad (-g_1 \times w_{64b}, 7 \times w_{64b}), (-g_2 \times w_{64b}, g_6 \times w_{64b}), (g_2 \times w_{64b}, g_5 \times w_{64b}), (g_2 \times w_{64b}, g_2 \times w_{64b}), (-g_2 \times w_{64b}, g_4 \times w_{64b}), (-g_2 \times w_{64b}, -g_4 \times w_{64b}), (-g_2 \times w_{64b}, -g_5 \times w_{64b}), (-g_2 \times w_{64b}, -g_2 \times w_{64b}), (-g_2 \times w_{64b}, -g_6 \times w_{64b}), (-g_2 \times w_{64b}, -7 \times w_{64b}), \quad (-g_3 \times w_{64b}, 7 \times w_{64b}), (-g_3 \times w_{64b}, g_6 \times w_{64b}), (-g_3 \times w_{64b}, g_5 \times w_{64b}), (-g_3 \times w_{64b}, g_4 \times w_{64b}), (-g_3 \times w_{64b}, -g_4 \times w_{64b}), (-g_3 \times w_{64b}, -g_5 \times w_{64b}), (-g_3 \times w_{64b}, -g_6 \times w_{64b}), (-g_3 \times w_{64b}, -7 \times w_{64b}), \quad (-7 \times w_{64b}, 7 \times w_{64b}), (-7 \times w_{64b}, g_6 \times w_{64b}), (-7 \times w_{64b}, g_5 \times w_{64b}), (-7 \times w_{64b}, g_4 \times w_{64b}), (-7 \times w_{64b}, -g_4 \times w_{64b}), (-7 \times w_{64b}, g_5 \times w_{64b}), (-7 \times w_{64b}, -g_6 \times w_{64b}), (-7 \times w_{64b}, -7 \times w_{64b})$.

The coordinates in the in-phase I-orthogonal Q plane of the signal point ("○") immediately above the set of b0, b1, b2, b3, b4, and b5 (000000 to 111111) serve as in-phase component I and orthogonal component Q of the post-mapping baseband signal. The relationship between the set of b0, b1, b2, b3, b4, and b5 (000000 to 111111) in 64QAM and the coordinates of the signal point is not limited to that illustrated in FIG. 7.

The 64 signal points in FIG. 7 are referred to as "signal point 1", "signal point 2", . . . , "signal point 63", and "signal point 64" (because 64 signal points exist, "signal point 1" to "signal point 64" exist). Di is a distance between "signal point i" and an origin in the in-phase I-orthogonal Q plane. $w_{64b}$ is given as follows.

[Mathematical formula 5]

$$w_{64b} = \frac{z}{\sqrt{\frac{\sum_{i=1}^{64} D_i^2}{64}}} \quad \text{(Equation 5)}$$

From (Equation 5), an average power of the post-mapping baseband signal is $z^2$.

Hereinafter, the 64QAM mapping method is referred to as "64QAM mapping method #2".

Figure 8:
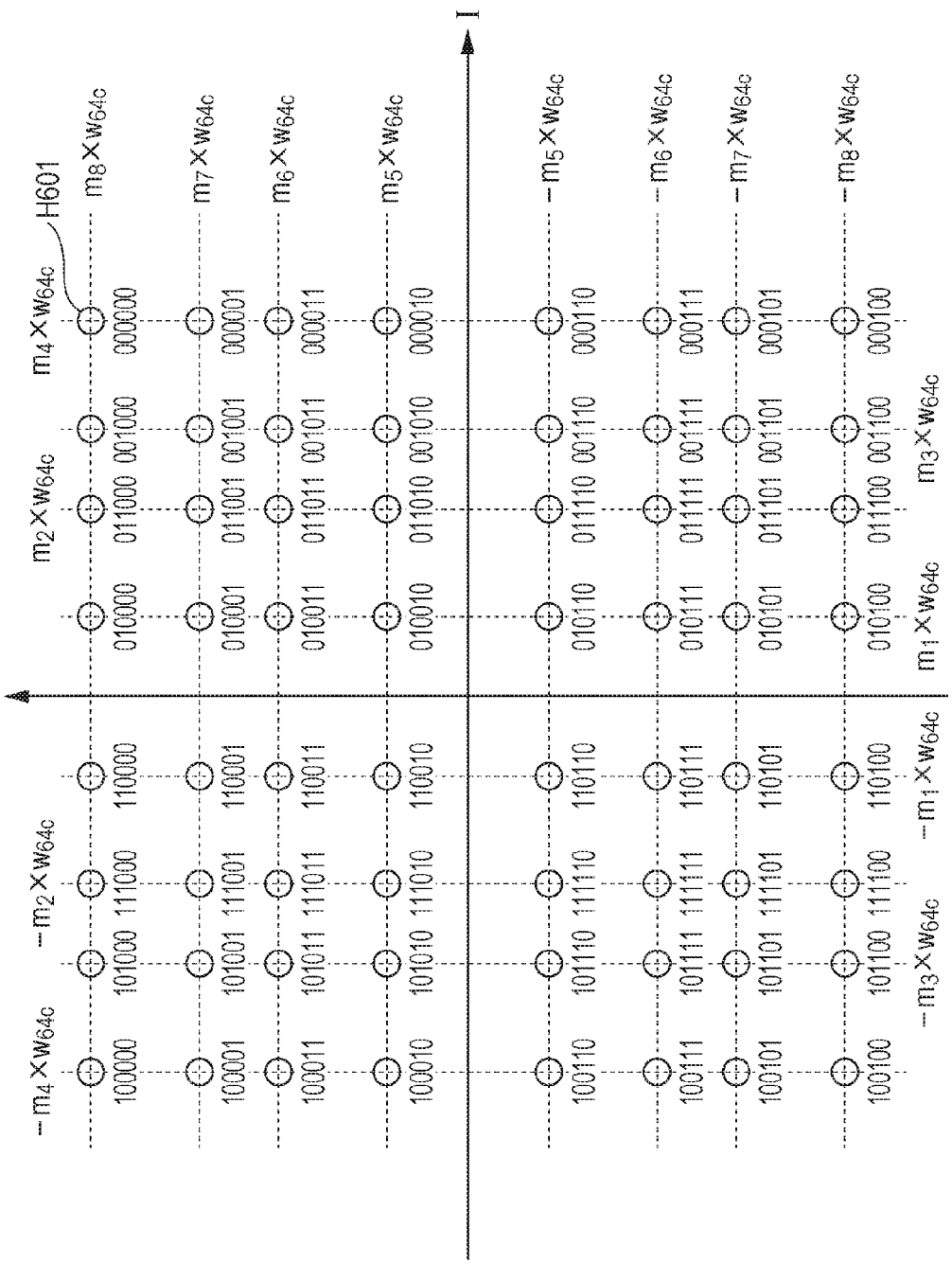
FIG. 8 is a view illustrating still another example of the 64QAM signal point arrangement in the in-phase I-orthogonal Q plane.

FIG. 8 illustrates an example of the 64QAM signal point arrangement in the in-phase I-orthogonal Q plane. In FIG. 8, 64 marks "○" (white circle) indicate the 64QAM signal points, the horizontal axis indicates the in-phase component I, and the vertical axis indicates the orthogonal component Q.

In FIG. 8,

"$m_1 > 0$ ($m_1$ is a real number greater than 0) and $m_2 > 0$ ($m_2$ is a real number greater than 0) and $m_3 > 0$ ($m_3$ is a real number greater than 0) and $m_4 > 0$ ($m_4$ is a real number greater than 0) and $m_5 > 0$ ($m_5$ is a real number greater than 0) and $m_6 > 0$ (me is a real number greater than 0) and $m_7 > 0$ ($m_7$ is a real number greater than 0) and $m_8 > 0$ ($m_8$ is a real number greater than 0) hold, and $\{m_1 \neq m_2$ and $m_1 \neq m_3$ and $m_1 \neq m_4$ and $m_2 \neq m_3$ and $m_2 \neq m_4$ and $m_3 \neq m_4\}$ and $\{m_5 \neq m_6$ and $m_5 \neq m_7$ and $m_5 \neq m_8$ and $m_6 \neq m_7$ and $m_6 \neq m_8$ and $m_7 \neq m_8\}$ and $\{m_1 \neq m_5$ or $m_2 \neq m_6$ or $m_3 \neq m_7$ or $m_4 \neq m_8$ holds$\}$ hold."

or

"$m_1 > 0$ ($m_1$ is a real number greater than 0) and $m_2 > 0$ ($m_2$ is a real number greater than 0) and $m_3 > 0$ ($m_3$ is a real number greater than 0) and $m_4 > 0$ ($m_4$ is a real number greater than 0) and $m_5 > 0$ ($m_5$ is a real number greater than 0) and $m_6 > 0$ ($m_6$ is a real number greater than 0) and $m_7 > 0$ ($m_7$ is a real number greater than 0) and $m_8 > 0$ ($m_8$ is a real number greater than 0) hold, and $\{m_1 \neq m_2$ and $m_1 \neq m_3$ and $m_1 \neq m_4$ and $m_2 \neq m_3$ and $m_2 \neq m_4$ and $m_3 \neq m_4\}$ and $\{m_5 \neq m_6$ and $m_5 \neq m_7$ and $m_5 \neq m_8$ and $m_6 \neq m_7$ and $m_6 \neq m_8$ and $m_7 \neq m_8\}$ and $\{m_1 \neq m_5$ or $m_2 \neq m_6$ or $m_3 \neq m_7$ or $m_4 \neq m_8$ holds$\}$ and $\{m_1; m_5$ or $m_2 \neq m_6$ or $m_3 \neq m_7$ or $m_4 \neq m_8$ holds$\}$ hold."

In the in-phase I-orthogonal Q plane, coordinates of the 64 signal points (in FIG. 8, the mark "○" indicates the signal point) for 64QAM are expressed as follows:

$(m_4 \times w_{64c}, m_8 \times w_{64c}), (m_4 \times w_{64c}, m_7 \times 7 \times w_{64c}), (m_4 \times w_{64c}, m_6 \times w_{64c}), (m_4 \times w_{64c}, m_5 \times w_{64c}), (m_4 \times w_{64c}, -m_5 \times w_{64c}), (m_4 \times w_{64c}, -m_6 \times w_{64c}), (m_4 \times w_{64c}, -m_7 \times w_{64c}), (m_4 \times w_{64c}, -m_8 \times w_{64c}), (m_3 \times w_{64c}, m_8 \times w_{64c}), (m_3 \times w_{64c}, m_7 \times w_{64c}), (m_3 \times w_{64c}, m_6 \times w_{64c}) (m_3 \times w_{64c}, m_5 \times w_{64c}), (m_3 \times w_{64c}, -m_5 \times w_{64c}), (m_3 \times w_{64c}, -m_6 \times w_{64c}), (m_3 \times w_{64c}, -m_7 \times w_{64c}), (m_3 \times w_{64c}, -m_8 \times w_{64c}), (m_2 \times w_{64c}, m_8 \times w_{64c}), (m_2 \times w_{64c}, m_7 \times w_{64c}), (m_2 \times w_{64c}, m_5 \times w_{64c}), (m_2 \times w_{64c}, -m_5 \times w_{64c}), (m_2 \times w_{64c}, -m_6 \times w_{64c}), (m_2 \times w_{64c}, -m_7 \times w_{64c}), (m_2 \times w_{64c}, -m_8 \times w_{64c}), (m_1 \times w_{64c}, m_8 \times w_{64c}), (m_1 \times w_{64c}, m_7 \times w_{64c}), (m_1 \times w_{64c}, m_6 \times w_{64c}), (m_1 \times w_{64c}, m_5 \times w_{64c}), (m_1 \times w_{64c}, -m_5 \times w_{64c}), (m_1 \times w_{64c}, -m_6 \times w_{64c}), (m_1 \times w_{64c}, -m_7 \times w_{64c}), (m_1 \times w_{64c}, -m_8 \times w_{64c}), (-m_1 \times w_{64c}, m_8 \times w_{64c}), (-m_1 \times w_{64c}, m_7 \times w_{64c}), (-m_1 \times w_{64c}, m_6 \times w_{64c}), (-m_1 \times w_{64c}, m_5 \times w_{64c}), (-m_1 \times w_{64c}, -m_5 \times w_{64c}), (-m_1 \times w_{64c}, -m_6 \times w_{64c}), (-m_1 \times w_{64c}, -m_7 \times w_{64c}), (-m_1 \times w_{64c}, -m_8 \times w_{64c}), (-m_2 \times w_{64c}, m_8 \times w_{64c}), (-m_2 \times w_{64c}, m_7 \times w_{64c}), (-m_2 \times w_{64c}, m_6 \times w_{64c}), (-m_2 \times w_{64c}, m_5 \times w_{64c}), (-m_2 \times w_{64c}, -m_5 \times w_{64c}), (-m_2 \times w_{64c}, -m_6 \times w_{64c}), (-m_2 \times w_{64c}, -m_7 \times w_{64c}), (-m_2 \times w_{64c}, -m_8 \times w_{64c}), (-m_3 \times w_{64c}, m_8 \times w_{64c}), (-m_3 \times w_{64c}, m_7 \times w_{64c}), (-m_3 \times w_{64c}, m_6 \times w_{64c}), (-m_3 \times w_{64c}, m_5 \times w_{64c}), (-m_3 \times w_{64c}, -m_5 \times w_{64c}), (-m_3 \times w_{64c}, -m_6 \times w_{64c}), (-m_3 \times w_{64c}, -m_7 \times w_{64c}), (-m_3 \times w_{64c}, -m_8 \times w_{64c}), (-m_4 \times w_{64c}, m_8 \times w_{64c}), (-m_4 \times w_{64c}, m_7 \times w_{64c}), (-m_4 \times w_{64c}, m_6 \times w_{64c}), (-m_4 \times w_{64c}, m_5 \times w_{64c}), (-m_4 \times w_{64c}, -m_5 \times w_{64c}), (-m_4 \times w_{64c}, -m_6 \times w_{64c}), (-m_4 \times w_{64c}, -m_7 \times w_{64c}), (-m_4 \times w_{64c}, -m_8 \times w_{64c})$, where $w_{64c}$ is a real number greater than 0.

In FIG. 8, the bits (input bits) to be transmitted are set to b0, b1, b2, b3, b4, and b5. For example, the bits to be transmitted (b0,b1,b2,b3,b4,b5)=(0,0,0,0,0,0) are mapped in signal point H601 of FIG. 8 and $(I,Q) = (m_4 \times w_{64c}, m_8 \times w_{64c})$ is obtained, where I and Q are the in-phase component and the orthogonal component of the post-mapping baseband signal, respectively.

That is, in-phase component I and orthogonal component Q of the post-mapping baseband signal (in 64QAM) are decided based on the bits to be transmitted (b0,b1,b2,b3,b4, b5). An example of the relationship between a set of b0, b1, b2, b3, b4, and b5 (000000 to 111111) and the coordinates of the signal point is indicated in FIG. 8. The values of the sets of b0, b1, b2, b3, b4, and b5 (000000 to 111111) are indicated immediately below the 64 signal points (the marks "○" in FIG. 8) of 64QAM:

$(m_4 \times w_{64c}, m_8 \times w_{64c}), (m_4 \times w_{64c}, m_7 \times w_{64c}), (m_4 \times w_{64c}, m_6 \times w_{64c}), (m_4 \times w_{64c}, m_5 \times w_{64c}), (m_4 \times w_{64c}, -m_5 \times w_{64c}), (m_4 \times w_{64c}, -m_6 \times w_{64c}), (m_4 \times w_{64c}, -m_7 \times w_{64c}), (m_4 \times w_{64c}, -m_8 \times w_{64c}), (m_3 \times w_{64c}, m_8 \times w_{64c}), (m_3 \times w_{64c}, m_7 \times w_{64c}), (m_3 \times w_{64c}, m_6 \times w_{64c}), (m_3 \times w_{64c}, m_5 \times w_{64c}), (m_3 \times w_{64c}, -m_5 \times w_{64c}), (m_3 \times w_{64c}, -m_6 \times w_{64c}), (m_3 \times w_{64c}, -m_7 \times w_{64c}), (m_3 \times w_{64c}, -m_8 \times w_{64c}), (m_2 \times w_{64c}, m_8 \times w_{64c}), (m_2 \times w_{64c}, m_7 \times w_{64c}), (m_2 \times w_{64c}, m_6 \times w_{64c}), (m_2 \times w_{64c}, m_5 \times w_{64c}), (m_2 \times w_{64c}, -m_5 \times w_{64c}), (m_2 \times w_{64c}, -m_6 \times w_{64c}), (m_2 \times w_{64c}, -m_7 \times w_{64c}), (m_2 \times w_{64c}, -m_8 \times w_{64c}), (m_1 \times w_{64c}, m_8 \times w_{64c}), (m_1 \times w_{64c}, m_7 \times w_{64c}), (m_1 \times w_{64c}, m_6 \times w_{64c}), (m_1 \times w_{64c}, m_5 \times w_{64c}), (m_1 \times w_{64c}, -m_5 \times w_{64c}), (m_1 \times w_{64c}, -m_6 \times w_{64c}), (m_1 \times w_{64c}, -m_7 \times w_{64c}), (m_1 \times w_{64c}, -m_8 \times w_{64c}), (-m_1 \times w_{64c}, m_8 \times w_{64c}), (-m_1 \times w_{64c}, m_7 \times w_{64c}), (-m_1 \times w_{64c}, m_6 \times w_{64c}), (-m_1 \times w_{64c}, m_5 \times w_{64c}), (-m_1 \times w_{64c}, -m_5 \times w_{64c}), (-m_1 \times w_{64c}, -m_6 \times w_{64c}), (-m_1 \times w_{64c}, -m_7 \times w_{64c}), (-m_1 \times w_{64c}, -m_8 \times w_{64c}), (-m_2 \times w_{64c}, m_8 \times w_{64c}), (-m_2 \times w_{64c}, m_7 \times w_{64c}), (-m_2 \times w_{64c}, m_6 \times w_{64c}), (-m_2 \times w_{64c}, m_5 \times w_{64c}), (-m_2 \times w_{64c}, -m_5 \times w_{64c}), (-m_2 \times w_{64c}, -m_6 \times w_{64c}), (-m_2 \times w_{64c}, -m_7 \times w_{64c}), (-m_2 \times w_{64c}, -m_8 \times w_{64c}), (-m_3 \times w_{64c}, m_8 \times w_{64c}), (-m_3 \times w_{64c}, m_7 \times w_{64c}), (-m_3 \times w_{64c}, m_6 \times w_{64c}), (-m_3 \times w_{64c}, m_5 \times w_{64c}), (-m_3 \times w_{64c}, -m_5 \times w_{64c}), (-m_3 \times w_{64c}, -m_6 \times w_{64c}), (-m_3 \times w_{64c}, -m_7 \times w_{64c}), (-m_3 \times w_{64c}, -m_8 \times w_{64c}), (-m_4 \times w_{64c}, m_8 \times w_{64c}), (-m_4 \times w_{64c}, m_7 \times w_{64c}), (-m_4 \times w_{64c}, m_6 \times w_{64c}), (-m_4 \times w_{64c}, m_5 \times w_{64c}), (-m_4 \times w_{64c}, -m_5 \times w_{64c}), (-m_4 \times w_{64c}, -m_6 \times w_{64c}), (-m_4 \times w_{64c}, -m_7 \times w_{64c}), (-m_4 \times w_{64c}, -m_8 \times w_{64c})$.

The coordinates in the in-phase I-orthogonal Q plane of the signal point ("○") immediately above the set of b0, b1, b2, b3, b4, and b5 (000000 to 111111) serve as in-phase component I and orthogonal component Q of the post-mapping baseband signal. The relationship between the set of b0, b1, b2, b3, b4, and b5 (000000 to 111111) in 64QAM and the coordinates of the signal point is not limited to that illustrated in FIG. 8.

The 64 signal points in FIG. 8 are referred to as "signal point 1", "signal point 2", . . . , "signal point 63", and "signal point 64" (because 64 signal points exist, "signal point 1" to "signal point 64" exist). Di is a distance between "signal point i" and an origin in the in-phase I-orthogonal Q plane. $w_{64c}$ is given as follows.

[Mathematical formula 6]

$$w_{64c} = \frac{z}{\sqrt{\frac{\sum_{i=1}^{64} D_i^2}{64}}} \quad \text{(Equation 6)}$$

From (Equation 6), an average power of the post-mapping baseband signal is $z^2$.

Hereinafter, the 64QAM mapping method is referred to as "64QAM mapping method #3".

The 256QAM mapping method will be described below.

Figure 9:
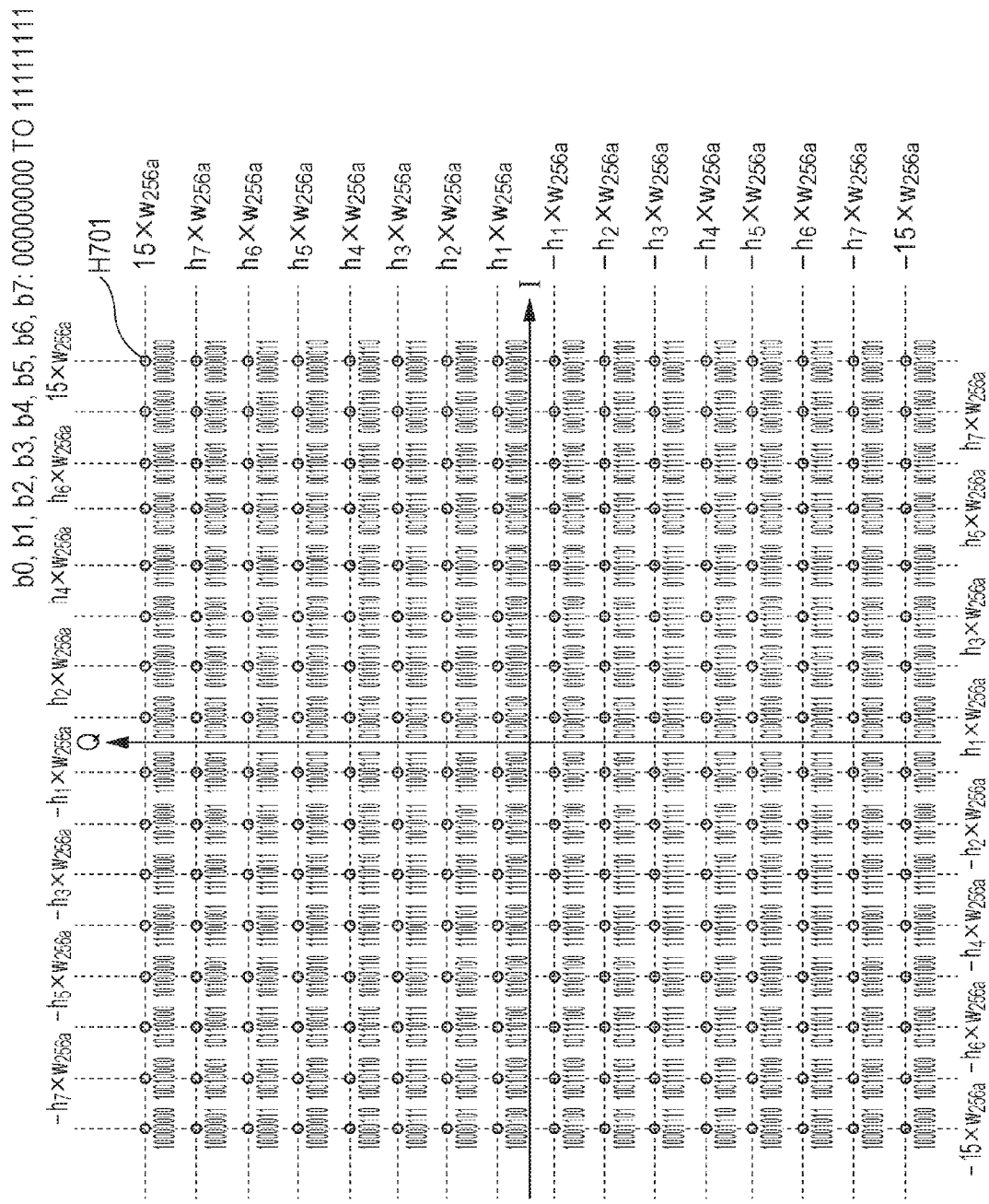
FIG. 9 is a view illustrating an example of a 256QAM signal point arrangement in the in-phase I-orthogonal Q plane.

FIG. 9 illustrates an example of a 256QAM signal point arrangement in the in-phase I-orthogonal Q plane. In FIG. 9, 256 marks "○" (white circle) indicate the 256QAM signal points, the horizontal axis indicates the in-phase component I, and the vertical axis indicates the orthogonal component Q.

In FIG. 9, $h_1>0$ ($h_1$ is a real number greater than 0) and $h_2>0$ ($h_2$ is a real number greater than 0) and $h_3>0$ ($h_3$ is a real number greater than 0) and $h_4>0$ ($h_4$ is a real number greater than 0) and $h_5>0$ ($h_5$ is a real number greater than 0) and $h_6>0$ ($h_6$ is a real number greater than 0) and $h_7>0$ ($h_7$ is a real number greater than 0) hold, {{$h_1 \neq 15$ and $h_2 \neq 15$ and $h_3 \neq 15$ and $h_4 \neq 15$ and $h_5 \neq 15$ and $h_6 \neq 15$ and $h_7 \neq 15$} holds}, and {{a1 is an integer of 1 to 7 and a2 is an integer of 1 to 7 and a3 is an integer of 1 to 7 and a4 is an integer of 1 to 7 and a5 is an integer of 1 to 7 and a6 is an integer of 1 to 7 and a7 is an integer of 1 to 7) holds, and $(h_{a1}, h_{a2}, h_{a3}, h_{a4}, h_{a5}, h_{a6}, h_{a7}) \neq (1,3,5,7,9,11,13)$ holds when {ax≠ay holds in all integers x and integers y} when {x is an integer of 1 to 7 and y is an integer of 1 to 7 and x*y} holds}, and {{$h_1 \neq h_2$ and $h_1 \neq h_3$ and $h_1 \neq h_4$ and $h_1 \neq h_5$ and $h_1 \neq h_6$ and $h_1 \neq h_7$ and $h_2 \neq h_3$ and $h_2 \neq h_4$ and $h_2 \neq h_5$ and $h_2 \neq h_6$ and $h_2 \neq h_7$ and $h_3 \neq h_4$ and $h_3 \neq h_5$ and $h_3 \neq h_6$ and $h_3 \neq h_7$
and $h_4 \neq h_5$ and $h_4 \neq h_6$ and $h_4 \neq h_7$
and $h_5 \neq h_6$ and $h_5 \neq h_7$
and $h_6 \neq h_7$} holds}.

In the in-phase I-orthogonal Q plane, coordinates of the 256 signal points (in FIG. 9, the mark "○" indicates the signal point) for 256QAM are expressed as follows:

$(15 \times w_{256a}, 15 \times w_{256a})$, $(15 \times w_{256a}, h_7 \times w_{256a})$, $(15 \times w_{256a}, h_6 \times w_{256a})$, $(15 \times w_{256a}, h_5 \times w_{256a})$, $(15 \times w_{256a}, h_4 \times w_{256a})$, $(15 \times w_{256a}, h_3 \times w_{256a})$, $(15 \times w_{256a}, h_2 \times w_{256a})$, $(15 \times w_{256a}, h_1 \times w_{256a})$, $(15 \times w_{256a}, -15 \times w_{256a})$, $(15 \times w_{256a}, -h_7 \times w_{256a})$, $(15 \times w_{256a}, -h_6 \times w_{256a})$, $(15 \times w_{256a}, -h_5 \times w_{256a})$, $(15 \times w_{256a}, -h_4 \times w_{256a})$, $(15 \times w_{256a}, -h_3 \times w_{256a})$, $(15 \times w_{256a}, -h_2 \times w_{256a})$, $(15 \times w_{256a}, -h_1 \times w_{256a})$, $(h_7 \times w_{256a}, 15 \times w_{256a})$, $(h_7 \times w_{256a}, h_7 \times w_{256a})$, $(h_7 \times w_{256a}, h_6 \times w_{256a})$, $(h_7 \times w_{256a}, h_5 \times w_{256a})$, $(h_7 \times w_{256a}, h_4 \times w_{256a})$, $(h_7 \times w_{256a}, h_3 \times w_{256a})$, $(h_7 \times w_{256a}, h_2 \times w_{256a})$, $(h_7 \times w_{256a}, h_1 \times w_{256a})$, $(h_7 \times w_{256a}, -15 \times w_{256a})$, $(h_7 \times w_{256a}, -h_7 \times w_{256a})$, $(h_7 \times w_{256a}, -h_6 \times w_{256a})$, $(h_7 \times w_{256a}, -h_5 \times w_{256a})$, $(h_7 \times w_{256a}, -h_4 \times w_{256a})$, $(h_7 \times w_{256a}, -h_3 \times w_{256a})$, $(h_7 \times w_{256a}, -h_2 \times w_{256a})$, $(h_7 \times w_{256a}, -h_1 \times w_{256a})$, $(h_6 \times w_{256a}, 15 \times w_{256a})$, $(h_6 \times w_{256a}, h_7 \times w_{256a})$, $(h_6 \times w_{256a}, h_6 \times w_{256a})$, $(h_6 \times w_{256a}, h_5 \times w_{256a})$, $(h_6 \times w_{256a}, h_4 \times w_{256a})$, $(h_6 \times w_{256a}, h_3 \times w_{256a})$, $(h_6 \times w_{256a}, h_2 \times w_{256a})$, $(h_6 \times w_{256a}, h_1 \times w_{256a})$, $(h_6 \times w_{256a}, -15 \times w_{256a})$, $(h_6 \times w_{256a}, -h_7 \times w_{256a})$, $(h_6 \times w_{256a}, -h_6 \times w_{256a})$, $(h_6 \times w_{256a}, -h_5 \times w_{256a})$, $(h_6 \times w_{256a}, -h_4 \times w_{256a})$, $(h_6 \times w_{256a}, -h_3 \times w_{256a})$, $(h_6 \times w_{256a}, -h_2 \times w_{256a})$, $(h_6 \times w_{256a}, -h_1 \times w_{256a})$, $(h_5 \times w_{256a}, 15 \times w_{256a})$, $(h_5 \times w_{256a}, h_7 \times w_{256a})$, $(h_5 \times w_{256a}, h_6 \times w_{256a})$, $(h_5 \times w_{256a}, h_5 \times w_{256a})$, $(h_5 \times w_{256a}, h_4 \times w_{256a})$, $(h_5 \times w_{256a}, h_3 \times w_{256a})$, $(h_5 \times w_{256a}, h_2 \times w_{256a})$, $(h_5 \times w_{256a}, h_1 \times w_{256a})$, $(h_5 \times w_{256a}, -15 \times w_{256a})$, $(h_5 \times w_{256a}, -h_7 \times w_{256a})$, $(h_5 \times w_{256a}, -h_6 \times w_{256a})$, $(h_5 \times w_{256a}, -h_5 \times w_{256a})$, $(h_{256a}, h_4 \times w_{256a})$, $(h_5 \times w_{256a}, h_3 \times w_{256a})$, $(h_5 \times w_{256a}, h_2 \times w_{256a})$, $(h_1 \times w_{256a})$, $(h_4 \times w_{256a}, 15 \times w_{256a})$, $(h_4 \times w_{256a}, h_7 \times w_{256a})$, $(h_4 \times w_{256a}, h_6 \times w_{256a})$, $(h_4 \times w_{256a}, h_5 \times w_{256a})$, $(h_4 \times w_{256a}, h_4 \times w_{256a})$, $(h_4 \times w_{256a}, h_3 \times w_{256a})$, $(h_4 \times w_{256a}, h_2 \times w_{256a})$, $(h_4 \times w_{256a}, h_1 \times w_{256a})$, $(h_4 \times w_{256a}, -15 \times w_{256a})$, $(h_4 \times w_{256a}, h_7 \times w_{256a})$, $(h_4 \times w_{256a}, h_6 \times w_{256a})$, $(h_4 \times w_{256a}, h_5 \times w_{256a})$, $(h_4 \times w_{256a}, h_4 \times w_{256a}, -h_4 \times w_{256a})$, $(h_4 \times w_{256a}, -h_3 \times w_{256a}), (h_4 \times w_{256a}, -h_2 \times w_{256a})$, $(h_4 \times w_{256a}, -h_1 \times w_{256a})$, $(h_3 \times w_{256a}, 15 \times w_{256a})$, $(h_3 \times w_{256a}, h_7 \times w_{256a})$, $(h_3 \times w_{256a}, h_6 \times w_{256a})$, $(h_3 \times w_{256a}, h_5 \times w_{256a})$, $(h_3 \times w_{256a}, h_4 \times w_{256a})$, $(h_3 \times w_{256a}, h_3 \times w_{256a})$, $(h_3 \times w_{256a}, h_2 \times w_{256a})$, $(h_3 \times w_{256a}, h_1 \times w_{256a})$, $(h_3 \times w_{256a}, -15 \times w_{256a})$, $(h_3 \times w_{256a}, -h_7 \times w_{256a})$, $(h_3 \times w_{256a}, -h_6 \times w_{256a})$, $(h_3 \times w_{256a}, -h_5 \times w_{256a})$, $(h_3 \times w_{256a}, -h_4 \times w_{256a})$, $(h_3 \times w_{256a}, -h_3 \times w_{256a})$, $(h_3 \times w_{256a}, -h_2 \times w_{256a})$, $(h_3 \times w_{256a}, -h_1 \times w_{256a})$, $(h_2 \times w_{256a}, 15 \times w_{256a})$, $(h_2 \times w_{256a}, h_7 \times w_{256a})$, $(h_2 \times w_{256a}, h_6 \times w_{256a})$, $(h_2 \times w_{256a}, h_5 \times w_{256a})$, $(h_2 \times w_{256a}, h_4 \times w_{256a})$, $(h_2 \times w_{256a}, h_3 \times w_{256a})$, $(h_2 \times w_{256a}, h_2 \times w_{256a})$, $(h_2 \times w_{286a}, h_1 \times w_{256a})$, $(h_2 \times w_{256a}, 15 \times w_{256a})$, $(h_2 \times w_{256a}, h_7 \times w_{256a})$, $(h_2 \times w_{256a}, -h_6 \times w_{256a})$, $(h_2 \times w_{256a}, -h_5 \times w_{256a})$, $(h_2 \times w_{256a}, 15 \times w_{256a})$, $(h_1 \times w_{256a}, h_7 \times w_{256a})$, $(h_1 \times w_{256a}, h_6 \times w_{256a})$, $(h_2 \times w_{256a}, h_5 \times w_{256a})$, $(h_2 \times w_{256a}, h_4 \times w_{256a})$, $(h_2 \times w_{256a}, h_3 \times w_{256a})$, $(h_2 \times w_{256a}, h_2 \times w_{256a})$, $(h_1 \times w_{256a}, h_1 \times w_{256a})$, $(h_1 \times w_{256a}, 15 \times w_{256a})$, $(h_1 \times w_{256a}, h_7 \times w_{256a})$, $(h_1 \times w_{256a}, h_6 \times w_{256a})$, $(h_1 \times w_{256a}, h_5 \times w_{256a})$, $(h_1 \times w_{256a}, h_4 \times w_{256a})$, $(h_1 \times w_{256a}, h_3 \times w_{256a})$, $(h_1 \times w_{256a}, h_2 \times w_{256a})$, $(h_1 \times w_{256a}, h_1 \times w_{256a})$, $(h_1 \times w_{256a}, -15 \times w_{256a})$, $(h_1 \times w_{256a}, -h_7 \times w_{256a})$, $(h_1 \times w_{256a}, -h_6 \times w_{256a})$, $(h_1 \times w_{256a}, -h_5 \times w_{256a})$, $(h_1 \times w_{256a}, -h_4 \times w_{256a})$, $(h_1 \times w_{256a}, -h_3 \times w_{256a})$, $(h_1 \times w_{256a}, -h_2 \times w_{256a})$, $(h_1 \times w_{256a}, -h_1 \times w_{256a})$, $(-15 \times w_{256a}, 15 \times w_{256a})$, $(15 \times w_{256a}, h_7 \times w_{256a})$, $(-15 \times w_{256a}, h_6 \times w_{256a})$, $(15 \times w_{256a}, h_5 \times w_{256a})$, $(-15 \times w_{256a}, h_4 \times w_{256a})$, $(-15 \times w_{256a}, h_3 \times w_{256a})$, $(-15 \times w_{256a}, h_2 \times w_{256a})$, $(-15 \times w_{256a}, h_1 \times w_{256a})$, $(-15 \times w_{256a}, -15 \times w_{256a})$, $(-15 \times w_{256a}, -h_7 \times w_{256a})$, $(-15 \times w_{256a}, -h_6 \times w_{256a})$, $(-15 \times w_{256a}, -h_5 \times w_{256a})$, $(15 \times w_{256a}, -h_4 \times w_{256a})$, $(15 \times w_{256a}, -h_3 \times w_{256a})$, $(-15 \times w_{256a}, -h_2 \times w_{256a})$, $(-15 \times w_{256a}, -h_1 \times w_{256a})$, $(-h_7 \times w_{256a}, 15 \times w_{256a})$, $(-h_7 \times w_{256a}, h_7 \times w_{256a})$, $(-h_7 \times w_{256a}, h_6 \times w_{256a})$, $(-h_7 \times w_{256a}, h_5 \times w_{256a})$, $(-h_7 \times w_{256a}, h_4 \times w_{256a})$, $(-h_7 \times w_{256a}, h_3 \times w_{256a})$, $(-h_7 \times w_{256a}, h_2 \times w_{256a})$, $(-h_7 \times w_{256a}, h_1 \times w_{256a})$, $(-h_7 \times w_{256a}, -15 \times w_{256a})$, $(-h_7 \times w_{256a}, -h_7 \times w_{256a})$, $(-h_7 \times w_{256a}, -h_6 \times w_{256a})$, $(-h_7 \times w_{256a}, -h_5 \times w_{256a})$, $(-h_7 \times w_{256a}, -h_4 \times w_{256a})$, $(-h_7 \times w_{256a}, -h_3 \times w_{256a})$, $(-h_7 \times w_{256a}, -h_2 \times w_{256a})$, $(-h_7 \times w_{256a}, -h_1 \times w_{256a})$, $(-h_6 \times w_{256a}, 15 \times w_{256a})$, $(-h_6 \times w_{256a}, h_7 \times w_{256a})$, $(h_6 \times w_{256a}, h_6 \times w_{256a})$, $(h_6 \times w_{256a}, h_5 \times w_{256a})$, $-h_6 \times w_{256a}, h_4 \times w_{256a})$, $(-h_6 \times w_{256a}, h_3 \times w_{256a})$, $(-h_6 \times w_{256a}, h_2 \times w_{256a})$, $(-h_6 \times w_{256a}, h_1 \times w_{256a})$, $(-h_6 \times w_{256a}, 15 \times w_{256a})$, $(-h_6 \times w_{256a}, -h_7 \times w_{256a})$, $(-h_6 \times w_{256a}, -h_6 \times w_{256a})$, $(h_6 \times w_{256a}, h_5 \times w_{256a})$, $(-h_6 \times w_{256a}, -h_4 \times w_{256a})$, $(-h_6 \times w_{256a}, -h_3 \times w_{256a})$, $(-h_6 \times w_{256a}, -h_2 \times w_{256a})$, $(-h_6 \times w_{256a}, -h_1 \times w_{256a})$, $(-h_5 \times w_{256a}, 15 \times w_{256a})$, $(h_5 \times w_{256a}, h_7 \times w_{256a})$, $(h_5 \times w_{256a}, h_6 \times w_{256a})$, $(h_5 \times w_{256a}, h_5 \times w_{256a})$, $-h_5 \times w_{256a}, h_4 \times w_{256a})$, $(h_5 \times w_{256a}, h_3 \times w_{256a})$, $(h_5 \times w_{256a}, h_2 \times w_{256a})$, $(-h_5 \times w_{256a}, h_1 \times w_{256a})$, $(-h_5 \times w_{256a}, -15 \times w_{256a})$, $(-h_5 \times w_{256a}, -h_7 \times w_{256a})$, $(-h_5 \times w_{256a}, -h_6 \times w_{256a})$, $(-h_5 \times w_{256a}, -h_5 \times w_{256a})$, $(-h_5 \times w_{256a}, -h_4 \times w_{256a})$, $(-h_5 \times w_{256a}, -h_3 \times w_{256a})$, $(-h_5 \times w_{256a}, -h_2 \times w_{256a})$, $(-h_5 \times w_{256a}, -h_1 \times w_{256a})$, $(-h_4 \times w_{256a}, 15 \times w_{256a})$, $(-h_4 \times w_{256a}, h_7 \times w_{256a})$, $(-h_4 \times w_{256a}, h_6 \times w_{256a})$, $(-h_4 \times w_{256a}, h_5 \times w_{256a})$, $(-h_4 \times w_{256a}, h_4 \times w_{256a})$, $(-h_4 \times w_{256a}, h_3 \times w_{256a})$, $(-h_4 \times w_{256a}, h_2 \times w_{256a})$, $(-h_4 \times w_{256a}, h_1 \times w_{256a})$, $(-h_4 \times w_{256a}, -15 \times w_{256a})$, $(-h_4 \times w_{256a}, -h_7 \times w_{256a})$, $(-h_4 \times w_{256a}, -h_6 \times w_{256a})$, $(-h_4 \times w_{256a}, -h_5 \times w_{256a})$, $(-h_4 \times w_{256a}, -h_4 \times w_{256a})$, $(-h_4 \times w_{256a}, -h_3 \times w_{256a})$, $(-h_4 \times w_{256a}, -h_2 \times w_{256a})$, $(-h_4 \times w_{256a}, -h_1 \times w_{256a})$, $(-h_3 \times w_{256a}, 15 \times w_{256a})$, $(h_3 \times w_{256a}, h_7 \times w_{256a})$, $(-h_3 \times w_{256a}, h_6 \times w_{256a})$, $(-h_3 \times w_{256a}, h_5 \times w_{256a})$, $(-h_3 \times w_{256a}, h_4 \times w_{256a})$, $(-h_3 \times w_{256a}, h_3 \times w_{256a})$, $(-h_3 \times w_{256a}, h_2 \times w_{256a})$, $(-h_3 \times w_{256a}, h_1 \times w_{256a})$, $(-h_3 \times w_{256a}, -15 \times w_{256a})$, $(-h_3 \times w_{256a}, -h_7 \times w_{256a})$, $(-h_3 \times w_{256a}, -h_6 \times w_{256a})$, $(-h_3 \times w_{256a}, -h_5 \times w_{256a})$, $(-h_3 \times w_{256a}, -h_4 \times w_{256a})$, $(-h_3 \times w_{256a}, -h_3 \times w_{256a})$, $(-h_3 \times w_{256a}, -h_2 \times w_{256a})$, $(-h_3 \times w_{256a}, -h_1 \times w_{256a})$, $(-h_2 \times w_{256a}, 15 \times w_{256a})$, $(-h_2 \times w_{256a}, h_7 \times w_{256a})$, $(-h_2 \times w_{256a}, h_6 \times w_{256a})$, $(-h_2 \times w_{256a}, h_5 \times w_{256a})$, $-h_2 \times w_{256a}, h_4 \times w_{256a})$, $(-h_2 \times w_{256a}, h_3 \times w_{256a})$, $(-h_2 \times w_{256a}, h_2 \times w_{256a})$, $(-h_2 \times w_{256a}, h_1 \times w_{256a})$, $(-h_2 \times w_{256a}, -15 \times w_{256a})$, $(-h_2 \times w_{256a}, -h_7 \times w_{256a})$, $(-h_2 \times w_{256a}, -h_6 \times w_{256a})$, $(-h_2 \times w_{256a}, -h_5 \times w_{256a})$, $(-h_2 \times w_{256a}, -h_4 \times w_{256a})$, $(-h_2 \times w_{256a}, -h_3 \times w_{256a})$, $(-h_2 \times w_{256a}, -h_2 \times w_{256a})$, $(-h_2 \times w_{256a}, -h_1 \times w_{256a})$, $(-h_1 \times w_{256a}, 15 \times w_{256a})$, $(-h_1 \times w_{256a}, h_7 \times$ $w_{256a}$),($-h_1 \times w_{256a}, h_6 \times w_{256a}$),($-h_1 \times w_{256a}, h_5 \times w_{256a}$),($-h_1 \times w_{256a}, h_4 \times w_{256a}$),($-h_1 \times w_{256a}, h_3 \times w_{256a}$),($-h_1 \times w_{256a}, h_2 \times w_{256a}$),($-h_1 \times w_{256a}, h_1 \times w_{256a}$),($-h_1 \times w_{256a}, -15 \times w_{256a}$), ($-h_1 \times w_{256a}, -h_7 \times w_{256a}$),($-h_1 \times w_{256a}, -h_6 \times w_{256a}$),($-h_1 \times w_{256a}, -h_5 \times w_{256a}$),($-h_1 \times w_{256a}, -h_4 \times w_{256a}$),($-h_1 \times w_{256a}, -h_3 \times w_{256a}$),($-h_1 \times w_{256a}, -h_2 \times w_{256a}$),($-h_1 \times w_{256a}, -h_1 \times w_{256a}$), where $w_{256a}$ is a real number greater than 0.

In FIG. 9, the bits (input bits) to be transmitted are set to b0, b1, b2, b3, b4, b5, b6, and b7. For example, the bits to be transmitted (b0,b1,b2,b3,b4,b5,b6,b7)=(0,0,0,0,0,0,0,0) are mapped in signal point H701 of FIG. 9 and (I,Q)=($15 \times w_{256a}, 15 \times w_{256a}$) is obtained, where I and Q are the in-phase component and the orthogonal component of the post-mapping baseband signal, respectively.

That is, in-phase component I and orthogonal component Q of the post-mapping baseband signal (in 256QAM) are decided based on the bits to be transmitted (b0,b1,b2,b3,b4,b5,b6,b7). An example of the relationship between a set of b0, b1, b2, b3, b4, b5, b6, and b7 (00000000 to 11111111) and the coordinates of the signal point is indicated in FIG. 9. The values of the sets of b0, b1, b2, b3, b4, b5, b6, and b7 (00000000 to 11111111) are indicated immediately below the 256 signal points (the marks "○" in FIG. 9) of 256QAM:

($15 \times w_{256a}, 15 \times w_{256a}$),($15 \times w_{256a}, h_7 \times w_{256a}$),($15 \times w_{256a}, h_6 \times w_{256a}$),($15 \times w_{256a}, h_5 \times w_{256a}$),($15 \times w_{256a}, h_4 \times w_{256a}$),($15 \times w_{256a}, h_3 \times w_{256a}$),($15 \times w_{256a}, h_2 \times w_{256a}$),($15 \times w_{256a}, h_1 \times w_{256a}$),($15 \times w_{256a}, -15 \times w_{256a}$),($15 \times w_{256a}, -h_7 \times w_{256a}$),($15 \times w_{256a}, -h_6 \times w_{256a}$),($15 \times w_{256a}, -h_5 \times w_{256a}$),($15 \times w_{256a}, -h_4 \times w_{256a}$),($15 \times w_{256a}, -h_3 \times w_{256a}$),($15 \times w_{256a}, -h_2 \times w_{256a}$),($15 \times w_{256a}, -h_1 \times w_{256a}$), ($h_7 \times w_{256a}, 15 \times w_{256a}$),($h_7 \times w_{256a}, h_7 \times w_{256a}$),($h_7 \times w_{256a}, h_6 \times w_{256a}$),($h_7 \times w_{256a}, h_5 \times w_{256a}$),($h_7 \times w_{256a}, h_4 \times w_{256a}$),($h_7 \times w_{256a}, h_3 \times w_{256a}$),($h_7 \times w_{256a}, h_2 \times w_{256a}$),($h_7 \times w_{256a}, h_1 \times w_{256a}$),($h_7 \times w_{256a}, -15 \times w_{256a}$),($h_7 \times w_{256a}, -h_7 \times w_{256a}$),($h_7 \times w_{256a}, -h_6 \times w_{256a}$),($h_7 \times w_{256a}, -h_5 \times w_{256a}$),($h_7 \times w_{256a}, -h_4 \times w_{256a}$),($h_7 \times w_{256a}, -h_3 \times w_{256a}$),($h_7 \times w_{256a}, -h_2 \times w_{256a}$),($h_7 \times w_{256a}, -h_1 \times w_{256a}$), ($h_6 \times w_{256a}, 15 \times w_{256a}$),($h_6 \times w_{256a}, h_7 \times w_{256a}$),($h_6 \times w_{256a}, h_6 \times w_{256a}$),($h_6 \times w_{256a}, h_5 \times w_{256a}$),($h_6 \times w_{256a}, h_4 \times w_{256a}$),($h_6 \times w_{256a}, h_3 \times w_{256a}$),($h_6 \times w_{256a}, h_2 \times w_{256a}$),($h_6 \times w_{256a}, h_1 \times w_{256a}$),($h_6 \times w_{256a}, -15 \times w_{256a}$),($h_6 \times w_{256a}, -h_7 \times w_{256a}$),($h_6 \times w_{256a}, -h_6 \times w_{256a}$),($h_6 \times w_{256a}, -h_5 \times w_{256a}$),($h_6 \times w_{256a}, -h_4 \times w_{256a}$),($h_6 \times w_{256a}, -h_3 \times w_{256a}$),($h_6 \times w_{256a}, -h_2 \times w_{256a}$),($h_6 \times w_{256a}, -h_1 \times w_{256a}$), ($h_5 \times w_{256a}, 15 \times w_{256a}$),($h_5 \times w_{256a}, h_7 \times w_{256a}$),($h_5 \times w_{256a}, h_6 \times w_{256a}$),($h_5 \times w_{256a}, h_5 \times w_{256a}$),($h_5 \times w_{256a}, h_4 \times w_{256a}$),($h_5 \times w_{256a}, h_3 \times w_{256a}$),($h_5 \times w_{256a}, h_2 \times w_{256a}$),($h_5 \times w_{256a}, h_1 \times w_{256a}$),($h_5 \times w_{256a}, -15 \times w_{256a}$),($h_5 \times w_{256a}, -h_7 \times w_{256a}$),($h_5 \times w_{256a}, -h_6 \times w_{256a}$),($h_5 \times w_{256a}, -h_5 \times w_{256a}$),($h_5 \times w_{256a}, -h_4 \times w_{256a}$),($h_5 \times w_{256a}, -h_3 \times w_{256a}$),($h_5 \times w_{256a}, -h_2 \times w_{256a}$),($h_4 \times w_{256a}, -h_1 \times w_{256a}$), ($h_4 \times w_{256a}, 15 \times w_{256a}$),($h_4 \times w_{256a}, h_7 \times w_{256a}$),($h_4 \times w_{256a}, h_6 \times w_{256a}$),($h_4 \times w_{256a}, h_5 \times w_{256a}$),($h_4 \times w_{256a}, h_4 \times w_{256a}$),($h_4 \times w_{256a}, h_3 \times w_{256a}$),($h_4 \times w_{256a}, h_2 \times w_{256a}$),($h_4 \times w_{256a}, h_1 \times w_{256a}$), ($h_4 \times w_{256a}, -15 \times w_{256a}$),($h_4 \times w_{256a}, -h_7 \times w_{256a}$),($h_4 \times w_{256a}, -h_6 \times w_{256a}$),($h_4 \times w_{256a}, -h_5 \times w_{256a}$),($h_4 \times w_{256a}, -h_4 \times w_{256a}$),($h_4 \times w_{256a}, -h_3 \times w_{256a}$),($h_4 \times w_{256a}, -h_2 \times w_{256a}$),($h_4 \times w_{256a}, -h_1 \times w_{256a}$), ($h_3 \times w_{256a}, 15 \times w_{256a}$),($h_3 \times w_{256a}, h_7 \times w_{256a}$),($h_3 \times w_{256a}, h_6 \times w_{256a}$),($h_3 \times w_{256a}, h_5 \times w_{256a}$),($h_3 \times w_{256a}, h_4 \times w_{256a}$),($h_3 \times w_{256a}, h_3 \times w_{256a}$),($h_3 \times w_{256a}, h_2 \times w_{256a}$),($h_3 \times w_{256a}, h_1 \times w_{256a}$),($h_3 \times w_{256a}, -15 \times w_{256a}$),($h_3 \times w_{256a}, -h_7 \times w_{256a}$),($h_3 \times w_{256a}, -h_6 \times w_{256a}$),($h_3 \times w_{256a}, -h_5 \times w_{256a}$),($h_3 \times w_{256a}, -h_4 \times w_{256a}$),($h_3 \times w_{256a}, -h_3 \times w_{256a}$),($h_3 \times w_{256a}, -h_2 \times w_{256a}$),($h_3 \times w_{256a}, -h_1 \times w_{256a}$), ($h_2 \times w_{256a}, 15 \times w_{256a}$),($h_2 \times w_{256a}, h_7 \times w_{256a}$),($h_2 \times w_{256a}, h_6 \times w_{256a}$),($h_2 \times w_{256a}, h_5 \times w_{256a}$),($h_2 \times w_{256a}, h_4 \times w_{256a}$),($h_2 \times w_{256a}, h_3 \times w_{256a}$),($h_2 \times w_{256a}, h_2 \times w_{256a}$),($h_2 \times w_{256a}, h_1 \times w_{256a}$),($h_2 \times w_{256a}, -15 \times w_{256a}$),($h_2 \times w_{256a}, -h_7 \times w_{256a}$),($h_2 \times w_{256a}, -h_6 \times w_{256a}$),($h_2 \times w_{256a}, -h_5 \times w_{256a}$),($h_2 \times w_{256a}, -h_4 \times w_{256a}$),($h_2 \times w_{256a}, -h_3 \times w_{256a}$),($h_2 \times w_{256a}, -h_2 \times w_{256a}$),($h_2 \times w_{256a}, -h_1 \times w_{256a}$), ($h_1 \times w_{256a}, 15 \times w_{256a}$),($h_1 \times w_{256a}, h_7 \times w_{256a}$),($h_1 \times w_{256a}, h_6 \times w_{256a}$),($h_1 \times w_{256a}, h_5 \times w_{256a}$),($h_1 \times w_{256a}, h_4 \times w_{256a}$),($h_1 \times w_{256a}, h_3 \times w_{256a}$),($h_1 \times w_{256a}, h_2 \times w_{256a}$),($h_1 \times w_{256a}, h_1 \times w_{256a}$),($h_1 \times w_{256a}, 15 \times w_{256a}$),($h_1 \times w_{256a}, -h_7 \times w_{256a}$),($h_1 \times w_{256a}, -h_6 \times w_{256a}$),($h_1 \times w_{256a}, -h_5 \times w_{256a}$),($h_1 \times w_{256a}, -h_4 \times w_{256a}$),($h_1 \times w_{256a}, -h_3 \times w_{256a}$),($h_1 \times w_{256a}, -h_2 \times w_{256a}$),($h_1 \times w_{256a}, -h_1 \times w_{256a}$), ($-15 \times w_{256a}, 15 \times w_{256a}$),($-15 \times w_{256a}, h_7 \times w_{256a}$),($-15 \times w_{256a}, h_6 \times w_{256a}$),($-15 \times w_{256a}, h_5 \times w_{256a}$),($-15 \times w_{256a}, h_4 \times w_{256a}$),($-15 \times w_{256a}, h_3 \times w_{256a}$),($-15 \times w_{256a}, h_2 \times w_{256a}$),($15 \times w_{256a}, h_1 \times w_{256a}$),($-15 \times w_{256a}, -15 \times w_{256a}$),($-15 \times w_{256a}, -h_7 \times w_{256a}$),($-15 \times w_{256a}, -h_6 \times w_{256a}$),($15 \times w_{256a}, -h_5 \times w_{256a}$),($15 \times w_{256a}, -h_4 \times w_{256a}$),($-15 \times w_{256a}, -h_3 \times w_{256a}$),($15 \times w_{256a}, -h_2 \times w_{256a}$),($-15 \times w_{256a}, -h_1 \times w_{256a}$), ($-h_7 \times w_{256a}, 15 \times w_{256a}$),($-h_7 \times w_{256a}, h_7 \times w_{256a}$),($-h_7 \times w_{256a}, h_6 \times w_{256a}$),($-h_7 \times w_{256a}, h_5 \times w_{256a}$),($-h_7 \times w_{256a}, h_4 \times w_{256a}$),($-h_7 \times w_{256a}, h_3 \times w_{256a}$),($h_7 \times w_{256a}, h_2 \times w_{256a}$),($-h_7 \times w_{256a}, h_1 \times w_{256a}$),($-h_7 \times w_{256a}, -15 \times w_{256a}$),($-h_7 \times w_{256a}, -h_7 \times w_{256a}$),($-h_7 \times w_{256a}, -h_6 \times w_{256a}$),($-h_7 \times w_{256a}, -h_5 \times w_{256a}$),($-h_7 \times w_{256a}, -h_4 \times w_{256a}$),($-h_7 \times w_{256a}, -h_3 \times w_{256a}$),($-h_7 \times w_{256a}, -h_2 \times w_{256a}$),($-h_7 \times w_{256a}, -h_1 \times w_{256a}$), ($-h_6 \times w_{256a}, 15 \times w_{256a}$),($h_6 \times w_{256a}, h_7 \times w_{256a}$),($-h_6 \times w_{256a}, h_6 \times w_{256a}$),($-h_6 \times w_{256a}, h_5 \times w_{256a}$),($-h_6 \times w_{256a}, h_4 \times w_{256a}$),($-h_6 \times w_{256a}, h_3 \times w_{256a}$),($-h_6 \times w_{256a}, h_2 \times w_{256a}$),($-h_6 \times w_{256a}, h_1 \times w_{256a}$), ($-h_6 \times w_{256a}, -15 \times w_{256a}$),($-h_6 \times w_{256a}, -h_7 \times w_{256a}$),($-h_6 \times w_{256a}, -h_6 \times w_{256a}$),($-h_6 \times w_{256a}, -h_5 \times w_{256a}$),($-h_6 \times w_{256a}, -h_4 \times w_{256a}$),($-h_6 \times w_{256a}, -h_3 \times w_{256a}$),($-h_6 \times w_{256a}, -h_2 \times w_{256a}$),($-h_6 \times w_{256a}, -h_1 \times w_{256a}$), ($-h_5 \times w_{256a}, 15 \times w_{256a}$),($-h_5 \times w_{256a}, h_7 \times w_{256a}$),($-h_5 \times w_{256a}, h_6 \times w_{256a}$),($-h_5 \times w_{256a}, h_5 \times w_{256a}$),($-h_5 \times w_{256a}, h_4 \times w_{256a}$),($-h_5 \times w_{256a}, h_3 \times w_{256a}$),($-h_5 \times w_{256a}, h_2 \times w_{256a}$),($-h_5 \times w_{256a}, h_1 \times w_{256a}$),($-h_5 \times w_{256a}, 15 \times w_{256a}$),($-h_5 \times w_{256a}, -h_7 \times w_{256a}$),($-h_5 \times w_{256a}, -h_6 \times w_{256a}$),($-h_5 \times w_{256a}, -h_5 \times w_{256a}$),($-h_5 \times w_{256a}, -h_4 \times w_{256a}$),($-h_5 \times w_{256a}, -h_3 \times w_{256a}$),($-h_5 \times w_{256a}, -h_2 \times w_{256a}$),($-h_5 \times w_{256a}, -h_1 \times w_{256a}$), ($-h_4 \times w_{256a}, 15 \times w_{256a}$),($-h_4 \times w_{256a}, h_7 \times w_{256a}$),($-h_4 \times w_{256a}, h_6 \times w_{256a}$),($-h_4 \times w_{256a}, h_5 \times w_{256a}$),($-h_4 \times w_{256a}, h_4 \times w_{256a}$),($-h_4 \times w_{256a}, h_3 \times w_{256a}$),($-h_4 \times w_{256a}, h_2 \times w_{256a}$),($-h_4 \times w_{256a}, h_1 \times w_{256a}$),($-h_4 \times w_{256a}, -15 \times w_{256a}$),($-h_4 \times w_{256a}, -h_7 \times w_{256a}$),($-h_4 \times w_{256a}, -h_6 \times w_{256a}$),($-h_4 \times w_{256a}, -h_5 \times w_{256a}$),($-h_4 \times w_{256a}, -h_4 \times w_{256a}$),($-h_4 \times w_{256a}, -h_3 \times w_{256a}$),($-h_4 \times w_{256a}, -h_2 \times w_{256a}$),($-h_4 \times w_{256a}, -h_1 \times w_{256a}$), ($-h_3 \times w_{256a}, 15 \times w_{256a}$),($-h_3 \times w_{256a}, h_7 \times w_{256a}$),($-h_3 \times w_{256a}, h_6 \times w_{256a}$),($-h_3 \times w_{256a}, h_5 \times w_{256a}$),($-h_3 \times w_{256a}, h_4 \times w_{256a}$),($-h_3 \times w_{256a}, h_3 \times w_{256a}$),($-h_3 \times w_{256a}, h_2 \times w_{256a}$),($-h_3 \times w_{256a}, h_1 \times w_{256a}$),($-h_3 \times w_{256a}, -15 \times w_{256a}$),($-h_3 \times w_{256a}, -h_7 \times w_{256a}$),($-h_3 \times w_{256a}, -h_6 \times w_{256a}$),($-h_3 \times w_{256a}, -h_5 \times w_{256a}$),($-h_3 \times w_{256a}, -h_4 \times w_{256a}$),($-h_3 \times w_{256a}, -h_3 \times w_{256a}$),($-h_3 \times w_{256a}, -h_2 \times w_{256a}$),($-h_3 \times w_{256a}, -h_1 \times w_{256a}$), ($-h_2 \times w_{256a}, 15 \times w_{256a}$),($-h_2 \times w_{256a}, h_7 \times w_{256a}$),($-h_2 \times w_{256a}, h_6 \times w_{256a}$),($-h_2 \times w_{256a}, h_5 \times w_{256a}$),($-h_2 \times w_{256a}, h_4 \times w_{256a}$),($-h_2 \times w_{256a}, h_3 \times w_{256a}$),($-h_2 \times w_{256a}, h_2 \times w_{256a}$),($-h_2 \times w_{256a}, h_1 \times w_{256a}$),($-h_2 \times w_{256a}, -15 \times w_{256a}$),($-h_2 \times w_{256a}, -h_7 \times w_{256a}$),($-h_2 \times w_{256a}, -h_6 \times w_{256a}$),($-h_2 \times w_{256a}, -h_5 \times w_{256a}$),($-h_2 \times w_{256a}, -h_4 \times w_{256a}$),($-h_2 \times w_{256a}, -h_3 \times w_{256a}$),($-h_2 \times w_{256a}, -h_2 \times w_{256a}$),($-h_2 \times w_{256a}, -h_1 \times w_{256a}$), ($-h_1 \times w_{256a}, 15 \times w_{256a}$),($-h_1 \times w_{256a}, h_7 \times w_{256a}$),($-h_1 \times w_{256a}, h_6 \times w_{256a}$),($-h_1 \times w_{256a}, h_5 \times w_{256a}$),($-h_1 \times w_{256a}, h_4 \times w_{256a}$),($-h_1 \times w_{256a}, h_3 \times w_{256a}$),($-h_1 \times w_{256a}, h_2 \times w_{256a}$),($-h_1 \times w_{256a}, h_1 \times w_{256a}$),($-h_1 \times w_{256a}, -15 \times w_{256a}$),($-h_1 \times w_{256a}, -h_7 \times w_{256a}$),($-h_1 \times w_{256a}, -h_6 \times w_{256a}$),($-h_1 \times w_{256a}, -h_5 \times w_{256a}$),($-h_1 \times w_{256a}, -h_4 \times w_{256a}$),($-h_1 \times w_{256a}, -h_3 \times w_{256a}$),($-h_1 \times w_{256a}, -h_2 \times w_{256a}$),($-h_1 \times w_{256a}, -h_1 \times w_{256a}$).

The coordinates in the in-phase I-orthogonal Q plane of the signal point ("○") immediately above the set of b0, b1, b2, b3, b4, b5, b6, and b7 (00000000 to 11111111) serve as in-phase component I and orthogonal component Q of the post-mapping baseband signal. The relationship between the set of b0, b1, b2, b3, b4, b5, b6, and b7 (00000000 to 11111111) in 256QAM and the coordinates of the signal point is not limited to that illustrated in FIG. 9.

The 256 signal points in FIG. 9 are referred to as "signal point 1", "signal point 2", . . . , "signal point 255", and "signal point 256" (because 256 signal points exist, "signal point 1" to "signal point 256" exist). Di is a distance between "signal point i" and an origin in the in-phase I-orthogonal Q plane. $w_{256a}$ is given as follows.

[Mathematical formula 7]

$$w_{256a} = \frac{z}{\sqrt{\frac{\sum_{i=1}^{256} D_i^2}{256}}} \quad \text{(Equation 7)}$$

From (Equation 7), an average power of the post-mapping baseband signal is $z^2$.

The 256QAM mapping method is generally called non-uniform 256QAM. However, in this case, the 256QAM mapping method is referred to as "256QAM mapping method #1".

The mapping method in the case of "$(h_{a1},h_{a2},h_{a3},h_{a4},h_{a5},h_{a6},h_{a7})=(1,3,5,7,9,11,13)$" in the above description is referred to as uniform 256QAM, and is hereinafter referred to as "256QAM mapping method #0".

Figure 10:
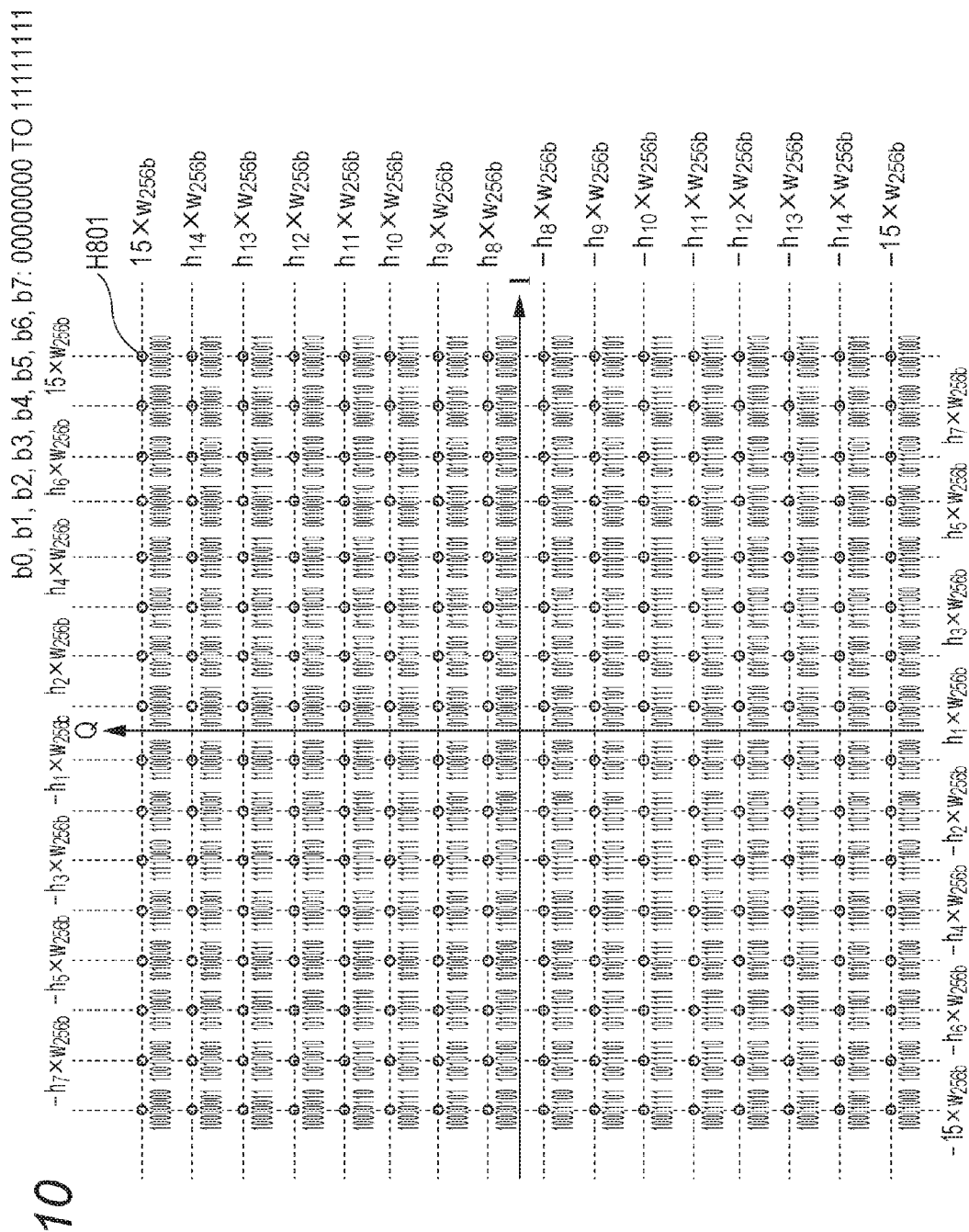
FIG. 10 is a view illustrating another example of the 256QAM signal point arrangement in the in-phase I-orthogonal Q plane.

FIG. 10 illustrates an example of the 256QAM signal point arrangement in the in-phase I-orthogonal Q plane. In FIG. 10, 256 marks "O" (white circle) indicate the 256QAM signal points, the horizontal axis indicates the in-phase component I, and the vertical axis indicates the orthogonal component Q.

In FIG. 10, $h_1>0$ ($h_1$ is a real number greater than 0) and $h_2>0$ ($h_2$ is a real number greater than 0) and $h_3>0$ ($h_3$ is a real number greater than 0) and $h_4>0$ ($h_4$ is a real number greater than 0) and $h_5>0$ ($h_5$ is a real number greater than 0) and $h_6>0$ ($h_6$ is a real number greater than 0) and $h_7>0$ ($h_7$ is a real number greater than 0) and $h_8>0$ ($h_8$ is a real number greater than 0) and $h_9>0$ ($h_9$ is a real number greater than 0) and $h_{10}>0$ ($h_{10}$ is a real number greater than 0) and $h_{11}>0$ ($h_{11}$ is a real number greater than 0) and $h_{12}>0$ ($h_{12}$ is a real number greater than 0) and $h_{13}>0$ ($h_{13}$ is a real number greater than 0) and $h_{14}>0$ ($h_{14}$ is a real number greater than 0) hold, and $\{h_1 \neq 15$ and $h_2 \neq 15$ and $h_3 \neq 15$ and $h_4 \neq 15$ and $h_5 \neq 15$ and $h_6 \neq 15$ and $h_7 \neq 15$
and $h_1 \neq h_2$ and $h_1 \neq h_3$ and $h_1 \neq h_4$ and $h_1 \neq h_5$ and $h_1 \neq h_6$ and $h_1 \neq h_7$
and $h_2 \neq h_3$ and $h_2 \neq h_4$ and $h_2 \neq h_5$ and $h_2 \neq h_5$ and $h_2 \neq h_7$
and $h_3 \neq h_4$ and $h_3 \neq h_5$ and $h_3 \neq h_6$ and $h_3 \neq h_7$
and $h_4 \neq h_5$ and $h_4 \neq h_6$ and $h_4 \neq h_7$
and $h_5 \neq h_6$ and $h_5 \neq h_7$
and $h_6 \neq h_7\}$
and
$\{h_8 \neq 15$ and $h_9 \neq 15$ and $h_{10} \neq 15$ and $h_{11} \neq 15$ and $h_{12} \neq 15$ and $h_{13} \neq 15$ and $h_{14} \neq 15$
and $h_8 \neq h_9$ and $h_7 \neq h_{10}$ and $h_8 \neq h_{11}$ and $h_8 \neq h_{12}$ and $h_8 \neq h_{13}$ and $h_8 \neq h_{14}$
and $h_9 \neq h_{10}$ and $h_9 \neq h_{11}$ and $h_9 \neq h_{12}$ and $h_9 \neq h_{13}$ and $h_9 \neq h_{14}$
and $h_{10} \neq h_{11}$ and $h_{10} \neq h_{12}$ and $h_{10} \neq h_{13}$ and $h_{10} \neq h_{14}$
and $h_{11} \neq h_{12}$ and $h_{11} \neq h_{13}$ and $h_{11} \neq h_{14}$
and $h_{12} \neq h_{13}$ and $h_{12} \neq h_{14}$
and $h_{13} \neq h_{14}\}$
and
$\{h_1 \neq h_8$ or $h_2 \neq h_9$ or $h_3 \neq h_{10}$ or $h_4 \neq h_{11}$, or $h_5 \neq h_{12}$ or $h_6 \neq h_{13}$ or $h_7 \neq h_{14}$ holds$\}$ hold.

In the in-phase I-orthogonal Q plane, coordinates of the 256 signal points (in FIG. 10, the mark "O" indicates the signal point) for 256QAM are expressed as follows:
$(15 \times w_{256b}, 15 \times w_{256b}), (15 \times w_{256b}, h_{14} \times w_{256b}), (15 \times w_{256b}, h_{13} \times w_{256b}), (15 \times w_{256b}, h_{12} \times w_{256b}), (15 \times w_{256b}, h_{11} \times w_{256b}), (15 \times w_{256b}, h_{10} \times w_{256b}), (15 \times w_{256b}, h_9 \times w_{256b}), (15 \times w_{256b}, h_8 \times w_{256b}), (15 \times w_{256b}, -15 \times w_{256b}), (15 \times w_{256b}, -h_{14} \times w_{256b}), (15 \times w_{256b}, -h_{13} \times w_{256b}), (15 \times w_{256b}, -h_{12} \times w_{256b}), (15 \times w_{256b}, -h_{11} \times w_{256b}), (15 \times w_{256b}, -h_{10} \times w_{256b}), (15 \times w_{256b}, -h_9 \times w_{256b}), (15 \times w_{256b}, -h_8 \times w_{256b}), (h_7 \times w_{256b}, 15 \times w_{256b}), (h_7 \times w_{256b}, h_{14} \times w_{256b}), (h_7 \times w_{256b}, h_{13} \times w_{256b}), (h_7 \times w_{256b}, h_{12} \times w_{256b}), (h_7 \times w_{256b}, h_{11} \times w_{256b}), (h_7 \times w_{256b}, h_{10} \times w_{256b}), (h_7 \times w_{256b}, h_9 \times w_{256b}), (h_7 \times w_{256b}, h_8 \times w_{256b}), (h_7 \times w_{256b}, -15 \times w_{256b}), (h_7 \times w_{256b}, -h_{14} \times w_{256b}), (h_7 \times w_{256b}, -h_{13} \times w_{256b}), (h_7 \times w_{256b}, -h_{12} \times w_{256b}), (h_7 \times w_{256b}, -h_{11} \times w_{256b}), (h_7 \times w_{256b}, -h_{10} \times w_{256b}), (h_7 \times w_{256b}, -h_9 \times w_{256b}), (h_7 \times w_{256b}, -h_8 \times w_{256b}), (h_6 \times w_{256b}, 15 \times w_{256b}), (h_6 \times w_{256b}, h_{14} \times w_{256b}), (h_6 \times w_{256b}, h_{13} \times w_{256b}), (h_6 \times w_{256b}, h_{12} \times w_{256b}), (h_6 \times w_{256b}, h_{11} \times w_{256b}), (h_6 \times w_{256b}, h_{10} \times w_{256b}), (h_6 \times w_{256b}, h_9 \times w_{256b}), (h_6 \times w_{256b}, h_8 \times w_{256b}), (h_6 \times w_{256b}, 15 \times w_{256b}), (h_6 \times w_{256b}, -h_{14} \times w_{256b}), (h_6 \times w_{256b}, -h_{13} \times w_{256b}), (h_6 \times w_{256b}, -h_{12} \times w_{256b}), (h_6 \times w_{256b}, h_{11} \times w_{256b}), (h_6 \times w_{256b}, -h_{10} \times w_{256b}), (h_6 \times w_{256b}, -h_9 \times w_{256b}), (h_6 \times w_{256b}, -h_8 \times w_{256b}), (h_5 \times w_{256b}, 15 \times w_{256b}), (h_5 \times w_{256b}, h_{14} \times w_{256b}), (h_5 \times w_{256b}, h_{13} \times w_{256b}), (h_5 \times w_{256b}, h_{12} \times w_{256b}), (h_5 \times w_{256b}, h_{11} \times w_{256b}), (h_5 \times w_{256b}, h_{10} \times w_{256b}), (h_5 \times w_{256b}, h_9 \times w_{256b})$ $(h_5 \times w_{256b}, h_8 \times w_{256b}), (h_5 \times w_{256b}, -15 \times w_{256}) \quad (h_5 \times w_{256b}, -h_{14} \times w_{256b}), (h_5 \times w_{256b}, -h_{13} \times w_{256b}), (h_5 \times w_{256b}, -h_{12} \times w_{256b}), (h_5 \times w_{256b}, -h_{11} \times w_{256b}), (h_5 \times w_{256b}, -h_{10} \times w_{256b}), (h_5 \times w_{256b}, -h_9 \times w_{256b}), (h_5 \times w_{256b}, -h_8 \times w_{256b}), (h_4 \times w_{256b}, 15 \times w_{256b}), (h_4 \times w_{256b}, h_{14} \times w_{256b}), (h_4 \times w_{256b}, h_{13} \times w_{256b}), (h_4 \times w_{256b}, h_{12} \times w_{256b}), (h_4 \times w_{256b}, h_{11} \times w_{256b}), (h_4 \times w_{256b}, h_{10} \times w_{256b}), (h_4 \times w_{256b}, h_9 \times w_{256b}), (h_4 \times w_{256b}, h_8 \times w_{256b}), (h_4 \times w_{256b}, -15 \times w_{256b}), (h_4 \times w_{256b}, -h_{14} \times w_{256b}), (h_4 \times w_{256b}, -h_{13} \times w_{256b}), (h_4 \times w_{256b}, -h_{12} \times w_{256b}), (h_4 \times w_{256b}, -h_{11} \times w_{256b}), (h_4 \times w_{256b}, -h_{10} \times w_{256b}), (h_4 \times w_{256b}, -h_9 \times w_{256b}), (h_4 \times w_{256b}, -h_8 \times w_{256b}), (h_3 \times w_{256b}, 15 \times w_{256b}), (h_3 \times w_{256b}, h_{14} \times w_{256b}), (h_3 \times w_{256b}, h_{13} \times w_{256b}), (h_3 \times w_{256b}, h_{12} \times w_{256b}), (h_3 \times w_{256b}, h_{11} \times w_{256b}), (h_3 \times w_{256b}, h_{10} \times w_{256b}), (h_3 \times w_{256b}, h_9 \times w_{256b}), (h_3 \times w_{256b}, h_8 \times w_{256b}), (h_3 \times w_{256b}, -15 \times w_{256b}), (h_3 \times w_{256b}, -h_{14} \times w_{256b}), (h_3 \times w_{256b}, -h_{13} \times w_{256b}), (h_3 \times w_{256b}, -h_{12} \times w_{256b}), (h_3 \times w_{256b}, -h_{11} \times w_{256b}), (h_3 \times w_{256b}, -h_{10} \times w_{256b}), (h_3 \times w_{256b}, -h_9 \times w_{256b}) \quad (h_3 \times w_{256b}, -h_8 \times w_{256b}), (h_2 \times w_{256b}, 15 \times w_{256b}); (h_2 \times w_{256b}, h_{14} \times w_{256b}), (h_2 \times w_{256b}, h_{13} \times w_{256b}), (h_2 \times w_{256b}, h_{12} \times w_{256b}), (h_2 \times w_{256b}, h_{11} \times w_{256b}), (h_2 \times w_{256b}, h_{10} \times w_{256b}), (h_2 \times w_{256b}, h_9 \times w_{256b}), (h_2 \times w_{256b}, h_8 \times w_{256b}), (h_2 \times w_{256b}, -15 \times w_{256b}), (h_2 \times w_{256b}, -h_{14} \times w_{256b}), (h_2 \times w_{256b}, -h_{13} \times w_{256b}), (h_2 \times w_{256b}, -h_{12} \times w_{256b}), (h_2 \times w_{256b}, -h_{11} \times w_{256b}), (h_2 \times w_{256b}, -h_{10} \times w_{256b}), (h_2 \times w_{256b}, -h_9 \times w_{256b}), (h_2 \times w_{256b}, -h_8 \times w_{256b}), (h_1 \times w_{256b}, 15 \times w_{256b}), (h_1 \times w_{256b}, h_{14} \times w_{256b}), (h_1 \times w_{256b}, h_{13} \times w_{256b}), (h_1 \times w_{256b}, h_{12} \times w_{256b}), (h_1 \times w_{256b}, h_{11} \times w_{256b}), (h_1 \times w_{256b}, h_{10} \times w_{256b}), (h_1 \times w_{256b}, h_9 \times w_{256b}), (h_1 \times w_{256b}, h_8 \times w_{256b}), (h_1 \times w_{256b}, -15 \times w_{256b}), (h_1 \times w_{256b}, -h_{14} \times w_{256b}), (h_1 \times w_{256b}, -h_{13} \times w_{256b}), (h_1 \times w_{256b}, -h_{12} \times w_{256b}), (h_1 \times w_{256b}, -h_{11} \times w_{256b}), (h_1 \times w_{256b}, -h_{10} \times w_{256b}), (h_1 \times w_{256b}, -h_9 \times w_{256b}), (h_1 \times w_{256b}, -h_8 \times w_{256b}), (15 \times w_{256b}, -15 \times w_{256b}), (-15 \times w_{256b}, h_{14} \times w_{256b}), (-15 \times w_{256b}, h_{13} \times w_{256b}), (-15 \times w_{256b}, h_{12} \times w_{256b}), (-15 \times w_{256b}, h_{11} \times w_{256b}), (-15 \times w_{256b}, h_{10} \times w_{256b}) \quad (-15 \times w_{256b}, h_9 \times w_{256b}), (-15 \times w_{256b}, h_8 \times w_{256b}), (-15 \times w_{256b}, -15 \times w_{256b}), (-15 \times w_{256b}, -h_{14} \times w_{256b}), (-15 \times w_{566b}, -h_{13} \times w_{256b}), (-15 \times w_{256b}, -h_{12} \times w_{256b}), (-15 \times w_{256b}, -h_{11} \times w_{256b}), (-15 \times w_{256b}, -h_{10} \times w_{256b}), (-15 \times w_{256b}, -h_9 \times w_{256b}) (-15 \times w_{256b}, h_8 \times w_{256b}), (-h_7 \times w_{256b}, 15 \times w_{256b}), (-h_7 \times w_{256b}, h_{14} \times w_{256b}), (-h_7 \times w_{256b}, h_{13} \times w_{256b}), (-h_7 \times w_{256b}, h_{12} \times w_{256b}), (-h_7 \times w_{256b}, h_{11} \times w_{256b}), (-h_7 \times w_{256b}, h_{10} \times w_{256b}), (-h_7 \times w_{256b}, h_9 \times w_{256b}), (-h_7 \times w_{256b}, h_8 \times w_{256b}), (-h_7 \times w_{256b}, -15 \times w_{256b}), (-h_7 \times w_{256b}, -h_{14} \times w_{256b}), (-h_{256b}, -h_{13} \times w_{256b}), (-h_7 \times w_{256b}, -h_{12} \times w_{256b}), (-h_7 \times w_{256b}, -h_{11} \times w_{256b}), (-h_7 \times w_{256b}, -h_{10} \times w_{256b}), (-h_7 \times w_{256b},-$ $(h_9 \times w_{256b}), (-h_7 \times w_{256b}, -h_8 \times w_{256b}), (-h_6 \times w_{256b}, 15 \times w_{256b}), (-h_6 \times w_{256b}, h_{14} \times w_{256b}), (-h_6 \times w_{256b}, h_{13} \times w_{256b}), (-h_6 \times w_{256b}, h_{12} \times w_{256b}), (-h_6 \times w_{256b}, h_{11} \times w_{256b}), (-h_6 \times w_{256b}, h_{10} \times w_{256b}), (-h_6 \times w_{256b}, h_9 \times w_{256b}), (-h_6 \times w_{256b}, h_8 \times w_{256b}), (-h_6 \times w_{256b}, -15 \times w_{256b}), (-h_6 \times w_{256b}, -h_{14} \times w_{256b}), (-h_6 \times w_{256b}, -h_{13} \times w_{256b}), (-h_6 \times w_{256b}, -h_{12} \times w_{256b}), (-h_6 \times w_{256b}, -h_{11} \times w_{256b}), (-h_6 \times w_{256b}, -h_{10} \times w_{256b}), (-h_6 \times w_{256b}, -h_9 \times w_{256b}), (-h_6 \times w_{256b}, -h_8 \times w_{256b}), (-h_5 \times w_{256b}, 15 \times w_{256b}), (-h_5 \times w_{256b}, h_{14} \times w_{256b}), (-h_5 \times w_{256b}, h_{13} \times w_{256b}), (-h_5 \times w_{256b}, h_{12} \times w_{256b}), (-h_5 \times w_{256b}, h_{11} \times w_{256b}), (-h_5 \times w_{256b}, h_{10} \times w_{256b}), (-h_5 \times w_{256b}, h_9 \times w_{256b}), (-h_5 \times w_{256b}, h_8 \times w_{256b}), (-h_5 \times w_{256b}, -15 \times w_{256b}), (-h_5 \times w_{256b}, -h_{14} \times w_{256b}), (h_5 \times w_{256b}, -h_{13} \times w_{256b}), (h_5 \times w_{256b}, -h_{12} \times w_{256b}), (-h_5 \times w_{256b}, -h_{11} \times w_{256b}), (-h_5 \times w_{256b}, -h_{10} \times w_{256b}), (-h_5\ w_{256b}, -h_9 \times w_{256b}), (-h_5 \times w_{256b}, -h_8 \times w_{256b}), (-h_4 \times w_{256b}, 15 \times w_{256b}), (-h_4 \times w_{256b}, h_{14} \times w_{256b}), (-h_4 \times w_{256b}, h_{13} \times w_{256b}), (-h_4 \times w_{256b}, h_{12} \times w_{256b}), (-h_4 \times w_{256b}, h_{11} \times w_{256b}), (-h_4 \times w_{256b}, h_{10} \times w_{256b}), (-h_4 \times w_{256b}, h_9 \times w_{256b}), (-h_4 \times w_{256b}, h_8 \times w_{256b}), (-h_4 \times w_{256b}, -15 \times w_{256b}), (-h_4 \times w_{256b}, -h_{14} \times w_{256b}), (-h_4 \times w_{256b}, -h_{13} \times w_{256b}), (-h_4 \times w_{256b}, -h_{12} \times w_{256b}), (-h_4 \times w_{256b}, -h_{11} \times w_{256b}), (-h_4 \times w_{256b}, -h_{10} \times w_{256b}), (-h_4 \times w_{256b}, -h_9 \times w_{256b}), (-h_4 \times w_{256b}, -h_8 \times w_{256b}), (-h_3 \times w_{256b}, 15 \times w_{256b}), (-h_3 \times w_{256b}, h_{14} \times w_{256b}), (-h_3 \times w_{256b}, h_{13} \times w_{256b}), (-h_3 \times w_{256b}, h_{12} \times w_{256b}), (-h_3 \times w_{256b}, h_{11} \times w_{256b}), (-h_3 \times w_{256b}, h_{10} \times w_{256b}), (-h_3 \times w_{256b}, h_9 \times w_{256b}), (-h_3 \times w_{256b}, h_8 \times w_{256b}), (-h_3 \times w_{256b}, -15 \times w_{256b}), (-h_3 \times w_{256b}, -h_{14} \times w_{256b}), (-h_3 \times w_{256b}, -h_{13} \times w_{256b}), (-h_3 \times w_{256b}, -h_{12} \times w_{256b}), (-h_3 \times w_{256b}, -h_{11} \times w_{256b}), (-h_3 \times w_{256b}, -h_{10} \times w_{256b}), (h_3 \times w_{256b}, -h_9 \times w_{256b}), (-h_3 \times w_{256b}, -h_8 \times w_{256b}), (-h_2 \times w_{256b}, 15 \times w_{256b}), (h_2 \times w_{256b}, h_{14} \times w_{256b}), (h_2 \times w_{256b}, h_{13} \times w_{256b}), (-h_2 \times w_{256b}, h_{12} \times w_{256b}), (-h_2 \times w_{256b}, h_{11} \times w_{256b}), (-h_2 \times w_{256b}, h_{10} \times w_{256b}), (-h_2 \times w_{256b}, h_9 \times w_{256b}), (-h_2 \times w_{256b}, h_8 \times w_{256b}), (-h_2 \times w_{256b}, -15 \times w_{256b}), (-h_2 \times w_{256b}, -h_{14} \times w_{256b}), (-h_2 \times w_{256b}, -h_{13} \times w_{256b}), (-h_2 \times w_{256b}, -h_{12} \times w_{256b}), (-h_2 \times w_{256b}, -h_{11} \times w_{256b}), (-h_2 \times w_{256b}, -h_{10} \times w_{256b}), (-h_2 \times w_{256b}, -h_9 \times w_{256b}), (-h_2 \times w_{256b}, -h_8 \times w_{256b}), (-h_1 \times w_{256b}, 15 \times w_{256b}), (-h_1 \times w_{256b}, h_{14} \times w_{256b}), (-h_1 \times w_{256b}, h_{13} \times w_{256b}), (h_1 \times w_{256b}, h_{12} \times w_{256b}), (-h_1 \times w_{256b}, h_{11} \times w_{256b}), (-h_1 \times w_{256b}, h_{10} \times w_{256b}), (-h_1 \times w_{256b}, h_9 \times w_{256b}), (-h_1 \times w_{256b}, h_8 \times w_{256b}), (-h_1 \times w_{256b}, -15 \times w_{256b}), (-h_1 \times w_{256b}, -h_{14} \times w_{256b}), (-h_1 \times w_{256b}, -h_{13} \times w_{256b}), (-h_1 \times w_{256b}, -h_{12} \times w_{256b}), (-h_1 \times w_{256b}, -h_{11} \times w_{256b}), (-h_1 \times w_{256b}, -h_{10} \times w_{256b}), (-h_1 \times w_{256b}, -h_9 \times w_{256b}), (-h_1 \times w_{256b}, -h_8 \times w_{256b})$, where $w_{256b}$ is a real number greater than 0.

In FIG. 10, the bits (input bits) to be transmitted are set to b0, b1, b2, b3, b4, b5, b6, and b7. For example, the bits to be transmitted (b0,b1,b2,b3,b4,b5,b6,b7)=(0,0,0,0,0,0,0,0) are mapped in signal point H801 of FIG. 10 and (I,Q)=(15×$w_{256b}$,15×$w_{256b}$) is obtained, where I and Q are the in-phase component and the orthogonal component of the post-mapping baseband signal, respectively.

That is, in-phase component I and orthogonal component Q of the post-mapping baseband signal (in 256QAM) are decided based on the bits to be transmitted (b0,b1,b2,b3,b4, b5,b6,b7). An example of the relationship between a set of b0, b1, b2, b3, b4, b5, b6, and b7 (00000000 to 11111111) and the coordinates of the signal point is indicated in FIG. 10. FIG. 10 illustrates the values of the sets of b0, b1, b2, b3, b4, b5, b6, and b7 (00000000 to 11111111) immediately below the 256 signal points (the marks "◯" in FIG. 10) of 256QAM:

$(15 \times w_{256b}, 15 \times w_{256b}), (15 \times w_{256b}, h_{14} \times w_{256b}), (15 \times w_{256b}, h_{13} \times w_{256b}), (15 \times w_{256b}, h_{12} \times w_{256b}), (15 \times w_{256b}, h_{11} \times w_{256b}), (15 \times w_{256b}, h_{10} \times w_{256b}), (15 \times w_{256b}, h_9 \times w_{256b}), (15 \times w_{256b}, h_8 \times w_{256b}), (15 \times w_{256b}, -15 \times w_{256b}), (15 \times w_{256b}, -h_{14} \times w_{256b}), (15 \times w_{256b}, -h_{13} \times w_{256b}), (15 \times w_{256b}, -h_{12} \times w_{256b}), (15 \times w_{256b}, -h_{11} \times w_{256b}), (15 \times w_{256b}, -h_{10} \times w_{256b}), (15 \times w_{256b}, -h_9 \times w_{256b}), (15 \times w_{256b}, -h_8 \times w_{256b}), (h_7 \times w_{256b}, 15 \times w_{256b}), (h_7 \times w_{256b}, h_{14} \times w_{256b}), (h_7 \times w_{256b}, h_{13} \times w_{256b}), (h_7 \times w_{256b}, h_{12} \times w_{256b}), (h_7 \times w_{256b}, h_{11} \times w_{256b}), (h_7 \times w_{256b}, h_{10} \times w_{256b}), (h_7 \times w_{256b}, h_9 \times w_{256b}), (h_7 \times w_{256b}, h_8 \times w_{256b}), (h_7 \times w_{256b}, -15 \times w_{256b}), (h_7 \times w_{256b}, -h_{14} \times w_{256b}), (h_7 \times w_{256b}, -h_{13} \times w_{256b}), (h_7 \times w_{256b}, -h_{12} \times w_{256b}), (h_7 \times w_{256b}, -h_{11} \times w_{256b}), (h_7 \times w_{256b}, -h_{10} \times w_{256b}), (h_7 \times w_{256b}, -h_9 \times w_{256b}), (h_7 \times w_{256b}, -h_8 \times w_{256b}), (h_6 \times w_{256b}, 15 \times w_{256b}), (h_6 \times w_{256b}, h_{14} \times w_{256b}), (h_6 \times w_{256b}, h_{13} \times w_{256b}), (h_6 \times w_{256b}, h_{12} \times w_{256b}), (h_6 \times w_{256b}, h_{11} \times w_{256b}), (h_6 \times w_{256b}, h_{10} \times w_{256b}), (h_6 \times w_{256b}, h_9 \times w_{256b}), (h_6 \times w_{256b}, h_6 \times w_{256b}), (h_6 \times w_{256b}, -15 \times w_{256b}), (h_6 \times w_{256b}, -h_{14} \times w_{256b}), (h_6 \times w_{256b}, -h_{13} \times w_{256b}), (h_6 \times w_{256b}, -h_{12} \times w_{256b}), (h_6 \times w_{256b}, -h_{11} \times w_{256b}), (h_6 \times w_{256b}, -h_{10} \times w_{256b}), (h_6 \times w_{256b}, -h_3 \times w_{256b}), (h_6 \times w_{256b}, -h_8 \times w_{256b}), (h_5 \times w_{256b}, 15 \times w_{256b}), (h_5 \times w_{256b}, h_{14} \times w_{256b}), (h_5 \times w_{256b}, h_{13} \times w_{256b}), (h_5 \times w_{256b}, h_{12} \times w_{256b}), (h_5 \times w_{256b}, h_{11} \times w_{256b}), (h_5 \times w_{256b}, h_{10} \times w_{256b}), (h_{10} \times w_{256b}, h_9 \times w_{256b}), (h_5 \times w_{256b}, h_8 \times w_{256b}), (h_5 \times w_{256b}, -15 \times w_{256b}), (h_5 \times w_{256b}, -h_{14} \times w_{256b}), (h_5 \times w_{256b}, -h_{13} \times w_{256b}), (h_5 \times w_{256b}, -h_{12} \times w_{256b}), (h_5 \times w_{256b}, -h_{11} \times w_{256b}), (h_5 \times w_{256b}, -h_{10} \times w_{256b}), (h_5 \times w_{25b}, -h_9 \times w_{256b}), (h_5 \times w_{256b}, -h_8 \times w_{256b}), (h_4 \times w_{256b}, 15 \times w_{256b}), (h_4 \times w_{256b}, h_4 \times w_{256b}), (h_4 \times w_{256b}, h_{11} \times w_{256b}), (h_4 \times w_{256b}, h_{12} \times w_{256b}), (h_4 \times w_{256b}, h_{11} \times w_{256b}), (h_4 \times w_{256b}, h_{10} \times w_{256b}), (h_4 \times w_{256b}, h_9 \times w_{256b}), (h_4 \times w_{256b}, h_8 \times w_{256b}), (h_4 \times w_{256b}, -15 \times w_{256b}), (h_4 \times w_{256b}, -h_{14} \times w_{256b}), (h_4 \times w_{256b}, -h_{13} \times w_{256b}), (h_4 \times w_{256b}, h_{12} \times w_{256b}), (h_4 \times w_{256b}, -h_{11} \times w_{256b}), (h_4 \times w_{256b}, -h_{10} \times w_{256b}), (h_4 \times w_{256b}, -h_9 \times w_{256b}), (h_4 \times w_{256b}, -h_8 \times w_{256b}), (h_3 \times w_{256b}, 15 \times w_{256b}), (h_3 \times w_{256b}, h_{14} \times w_{256b}), (h_3 \times w_{256b}, h_{13} \times w_{256b}), (h_3 \times w_{256b}, h_{12} \times w_{256b}), (h_3 \times w_{256b}, h_{11} \times w_{256b}), (h_3 \times w_{256b}, h_{10} \times w_{256b}), (h_3 \times w_{256b}, h_9 \times w_{256b}), (h_3 \times w_{256b}, h_8 \times w_{256b}), (h_3 \times w_{256b}, -15 \times w_{256b}), (h_3 \times w_{256b}, -h_{14} \times w_{256b}), (h_3 \times w_{256b}, -h_{13} \times w_{256b}), (h_3 \times w_{256b}, -h_{12} \times w_{256b}), (h_3 \times w_{256b}, -h_{11} \times w_{256b}), (h_3 \times w_{256b}, -h_{10} \times w_{256b}), (h_3 \times w_{256b}, -h_9 \times w_{256b}), (h_3 \times w_{256b}, -h_8 \times w_{256b}), (h_2 \times w_{256b}, -15 \times w_{256b}), (h_2 \times w_{256b}, h_{14} \times w_{256b}), (h_2 \times w_{256b}, h_{13} \times w_{256b}), (h_2 \times w_{256b}, h_{12} \times w_{256b}), (h_2 \times w_{256b}, h_{11} \times w_{256b}), (h_2 \times w_{256b}, h_{16} \times w_{256b}), (h_2 \times w_{256b}, h_9 \times w_{256b}), (h_2 \times w_{256b}, h_8 \times w_{256b}), (h_2 \times w_{256b}, -15 \times w_{256b}), (h_2 \times w_{256b}, -h_{14} \times w_{256b}), (h_2 \times w_{256b}, -h_{13} \times w_{256b}), (h_2 \times w_{256b}, -h_{12} \times w_{256b}), (h_2 \times w_{256b}), (h_{11} \times w_{256b}), (h_2 \times w_{256b}, -h_{10} \times w_{256b}), (h_2 \times w_{256b}, -h_9 \times w_{256b}), (h_2 \times w_{256b}, -h_8 \times w_{256b}), (h_1 \times w_{256b}, 15 \times w_{256b}), (h_1 \times w_{256b}, h_{14} \times w_{256b}), (h_1 \times w_{256b}, h_{13} \times w_{256b}), (h_1 \times w_{256b}, h_{12} \times w_{256b}), (h_1 \times w_{256b}, h_{11} \times w_{256b}), (h_1 \times w_{256b}, h_{16} \times w_{256b}), (h_1 \times w_{256b}, h_9 \times w_{256b}), (h_1 \times w_{256b}, h_1 \times w_{256b}), (h_1 \times w_{256b}, -15 \times w_{256b}), (h_1 \times w_{256b}, -h_{14} \times w_{256b}), (h_1 \times w_{256b}, -h_{13} \times w_{256b}), (h_1 \times w_{256b}, -h_{12} \times w_{256b}), (h_1 \times w_{256b}, -h_{11} \times w_{256b}), (h_1 \times w_{256b}, -h_{10} \times w_{256b}), (h_1 \times w_{256b}, -h_9 \times w_{256b}), (h_1 \times w_{256b}, -h_8 \times w_{256b}), (-15 \times w_{256b}, 15 \times w_{256b}), (-15 \times w_{256b}, h_{14} \times w_{256b}), (-15 \times w_{256b}, h_{13}\ w_{256b}), (-15 \times w_{256b}, h_{12} \times w_{256b}), (15 \times w_{256b}, h_{11} \times w_{256b}), (-15 \times w_{256b}, h_{10} \times w_{256b}), (-15 \times w_{256b}, h_9 \times w_{256b}), (-15 \times w_{256b}, h_8 \times w_{256b}), (-15 \times w_{256b}), (-15 \times w_{256b}, -h_{14} \times w_{256b}), (-15 \times w_{256b}), (-15 \times w_{256b}, -h_3 \times w_{256b}), (-15 \times w_{256b}, -h_{12} \times w_{256b}), (-15 \times w_{256b}, -h_{11} \times w_{256b}), (15 \times w_{256b}, -h_{10} \times w_{256b}), (-15 \times w_{256b}, -h_9 \times w_{256b}), (-15 \times w_{256b}, -h_7 \times w_{256b}, h_{15} \times w_{256b}), (-h_7 \times w_{256b}, h_{14} \times w_{256b}), (-h_7 \times w_{256b}, h_{13} \times w_{256b}), (-h_7 \times w_{256b}, h_2 \times w_{256b}), (-h_7 \times w_{256b}, h_{11} \times w_{256b}), (-h_7 \times w_{256b}, h_{10} \times w_{256b}), (-h_7 \times w_{256b}, h_9 \times w_{256b}), (-h_7 \times w_{256b}, h_8 \times w_{256b}), (-h_7 \times w_{256b}, -15 + w_{256b}), (-h_7 \times w_{256b}, -h_{14} \times w_{256b}), (h_7 \times w_{256b}, -h_{13} \times w_{256b}), (h_7 \times w_{256b}, -h_{12} \times w_{256b}), (-h_7 \times w_{256b}, -h_{11} \times w_{256b}), (-h_7 \times w_{256b}, -h_{10} \times w_{256b}), (-h_7 \times w_{256b}, -h_9 \times w_{256b}), (-h_7 \times w_{256b}, -h_8 \times w_{256b}), (-h_6 \times w_{256b}, 15 \times w_{256b}), (-h_6 \times w_{256b}, h_{14} \times w_{256b}), (-h_6 \times w_{256b}, h_{13} \times w_{256b}), (-h_6 \times w_{256b}, h_{12} \times w_{256b}), (-h_6 \times w_{256b}, h_{11} \times w_{256b}), (-h_6 \times w_{256b}, h_9 \times w_{256b}), (-h_6 \times w_{256b}, -h_9 \times w_{256b}), (-h_6 \times w_{256b}, h_6 \times w_{256b}), (-h_6 \times w_{256b}, -15 \times w_{256b}), (-h_6 \times w_{256b}, -h_{14} \times w_{256b}), (-h_6 \times w_{256b}, -h_{13} \times w_{256b}), (-h_6 \times w_{256b}, -h_{12} \times w_{256b}), (-h_6 \times w_{256b}, -h_{11} \times w_{256b}), (-h_6 \times w_{256b}, -h_{10} \times w_{256b}), (-h_6 \times w_{256b}, -h_9 \times w_{256b}), (-h_6 \times w_{256b}, -h_6 \times w_{256b}), (-h_5 \times w_{256b}, 15 \times w_{256b}), (-h_5 \times w_{256b}, h_{14} \times w_{256b}), (-h_5 \times w_{256b}, h_{13} \times w_{256b}), (-h_5 \times w_{256b}, h_8 \times w_{256b}), (-h_5 \times w_{256b}, h_{11} \times w_{256b}), (-h_5 \times w_{256b}, h_{10} \times w_{256b}), (-h_5 \times w_{256b}, h_9 \times w_{256b}), (-h_5 \times w_{256b}, h_8 \times w_{256b}), (-h_5 \times w_{256b}, -15 \times w_{256b}), (-h_5 \times$ $w_{256b}, -h_{14} \times w_{256b}), (-h_5 \times w_{256b}, -h_{13} \times w_{256b}), (-h_5 \times w_{256b}, -h_{12} \times w_{256b}), (-h_5 \times w_{256b}, -h_{11} \times w_{256b}), (-h_5 \times w_{256b}, -h_{10} \times w_{256b}), (-h_5 \times w_{256b}, -h_9 \times w_{256b}), (-h_5 \times w_{256b}, -h_8 \times w_{256b}), (-h_4 \times w_{256b}, -h_4 \times w_{256b}), (-h_4 \times w_{256b}, h_{14} \times w_{256b}), (-h_4 \times w_{256b}, h_{13} \times w_{256b}), (-h_4 \ w_{256b}, h_{12} \times w_{256b}), (-h_4 \times w_{256b}, h_{11} \times w_{256b}), (-h_4 \times w_{256b}, h_{10} \times w_{256b}), (-h_4 \times w_{256b}, -h_9 \times w_{256b}), (-h_4 \times w_{256b}, h_8 \times w_{256b}), (-h_4 \times w_{256b}, -15 \times w_{256b}) (-h_4 \times w_{256b}, h_{14} \times w_{256b}), (h_4 \times w_{256b}, -h_{13} \times w_{256b}), (-h_4 \times w_{256b}, -h_{12} \times w_{256b}), (-h_4 \times w_{256b}, -h_{11} \times w_{256b}), (-h_4 \times w_{256b}, -h_{10} \times w_{256b}), (-h_4 \times w_{256b}, -h_9 \times w_{256b}), (-h_4 \times w_{256b}, -h_8 \times w_{256b}), \quad (-h_3 \times w_{256b}, 15 \times w_{256b}) (-h_3 \times w_{256b}, h_{14} \times w_{256b}), (-h_3 \times w_{256b}, -h_3 \times w_{256b}), (-h_3 \times w_{256b}, h_2 \times w_{256b}), (-h_3 \times w_{256b}, h_{11} \times w_{256b}), (-h_3 \times w_{256b}, h_{10} \times w_{256b}), (-h_3 \times w_{256b}, h_9 \times w_{256b}), (-h_3 \ w_{256b}, h_8 \times w_{256b}), (-h_3 \times w_{256b}, -15 \times w_{256b}), (-h_3 \times w_{256b}, -h_{14} \times w_{256b}), (-h_3 \times w_{256b}, -h_{13} \times w_{256b}), (-h_3 \times w_{256b}, -h_{12} \times w_{256b}), (-h_3 \times w_{256b}, -h_{11} \times w_{256b}), (-h_3 \times w_{256b}, -h_{10} \times w_{256b}), (-h_3 \times w_{256b}, -h_9 \times w_{256b}), (-h_3 \times w_{256b}, -h_8 \times w_{256b}), \quad (-h_2 \times w_{256b}, 15 \times w_{256b}), (-h_2 \times w_{256b}, h_{14} \times w_{256b}), (-h_2 \times w_{256b}, h_{13} \times w_{256b}), (-h_2 \times w_{256b}, h_{12} \times w_{256b}), (-h_2 \times w_{256b}, h_{11} \times w_{256b}), (-h_2 \times w_{256b}, h_{10} \times w_{256b}), (-h_2 \times w_{256b}, h_9 \times w_{256b}), (-h_2 \times w_{256b}, h_8 \times w_{256b}), (-h_2 \times w_{256b}, -15 \times w_{256b}), (-h_2 \times w_{256b}, -h_{14} \times w_{256b}), (-h_2 \times w_{256b}, -h_{13} \times w_{256b}), (-h_2 \times w_{256b}, -h_{12} \times w_{256b}), (-h_2 \times w_{256b}, -h_1 \times w_{256b}), (-h_2 \times w_{256b}, h_{10} \times w_{256b}) (-h_2 \times w_{256b}, -h_9 \times w_{256b}), (-h_2 \times w_{256b}, -h_8 \times w_{256b}), (-h_1 \times w_{256b}, 15 \times w_{256b}), (-h_1 \times w_{256b}, h_{14} \times w_{256b}), (-h_1 \times w_{256b}, h_{13} \times w_{256b}), (-h_1 \times w_{256b}, h_{12} \times w_{256b}), (-h_1 \times w_{256b}, h_{11} \times w_{256b}), (-h_1 \times w_{256b}, \ h_{10} \times w_{256b}), (-h_1 \times w_{256b}, h_1 \times w_{256b}), (-h_1 \times w_{256b}, h_8 \times w_{256b}), (-h_1 \times w_{256b}, -15 \times w_{256b}), (-h_1 \times w_{256b}, -h_{14} \times w_{256b}), (-h_1 \times w_{256b}, -h_{13} \times w_{256b}), (-h_1 \times w_{256b}, -h_{12} \times w_{256b}), (-h_1 \times w_{256b}, \ -h_{11} \times w_{256b}), (-h_1 \times w_{256b}, -h_{10} \times w_{256b}), (-h_1 \times w_{256b}, -h_9 \times w_{256b}), (-h_1 \times w_{256b}, -h_8 \times w_{256b}).$ The coordinates in the in-phase I-orthogonal Q plane of the signal point ("○") immediately above the set of b0, b1, b2, b3, b4, b5, b6, and b7 (00000000 to 11111111) serve as in-phase component I and orthogonal component Q of the post-mapping baseband signal. The relationship between the set of b0, b1, b2, b3, b4, b5, b6, and b7 (00000000 to 11111111) in 256QAM and the coordinates of the signal point is not limited to that illustrated in FIG. 10.

The 256 signal points in FIG. 10 are referred to as "signal point 1", "signal point 2", ..., "signal point 255", and "signal point 256" (because 256 signal points exist, "signal point 1" to "signal point 256" exist). Di is a distance between "signal point i" and an origin in the in-phase I-orthogonal Q plane. $w_{256b}$ is given as follows.

[Mathematical formula 8]

$$w_{256b} = \frac{z}{\sqrt{\frac{\sum_{i=1}^{256} D_i^2}{256}}} \quad \text{(Equation 8)}$$

From (Equation 8), an average power of the post-mapping baseband signal is $z^2$.

Hereinafter, the 256QAM mapping method is referred to as "256QAM mapping method #2".

Figure 11:
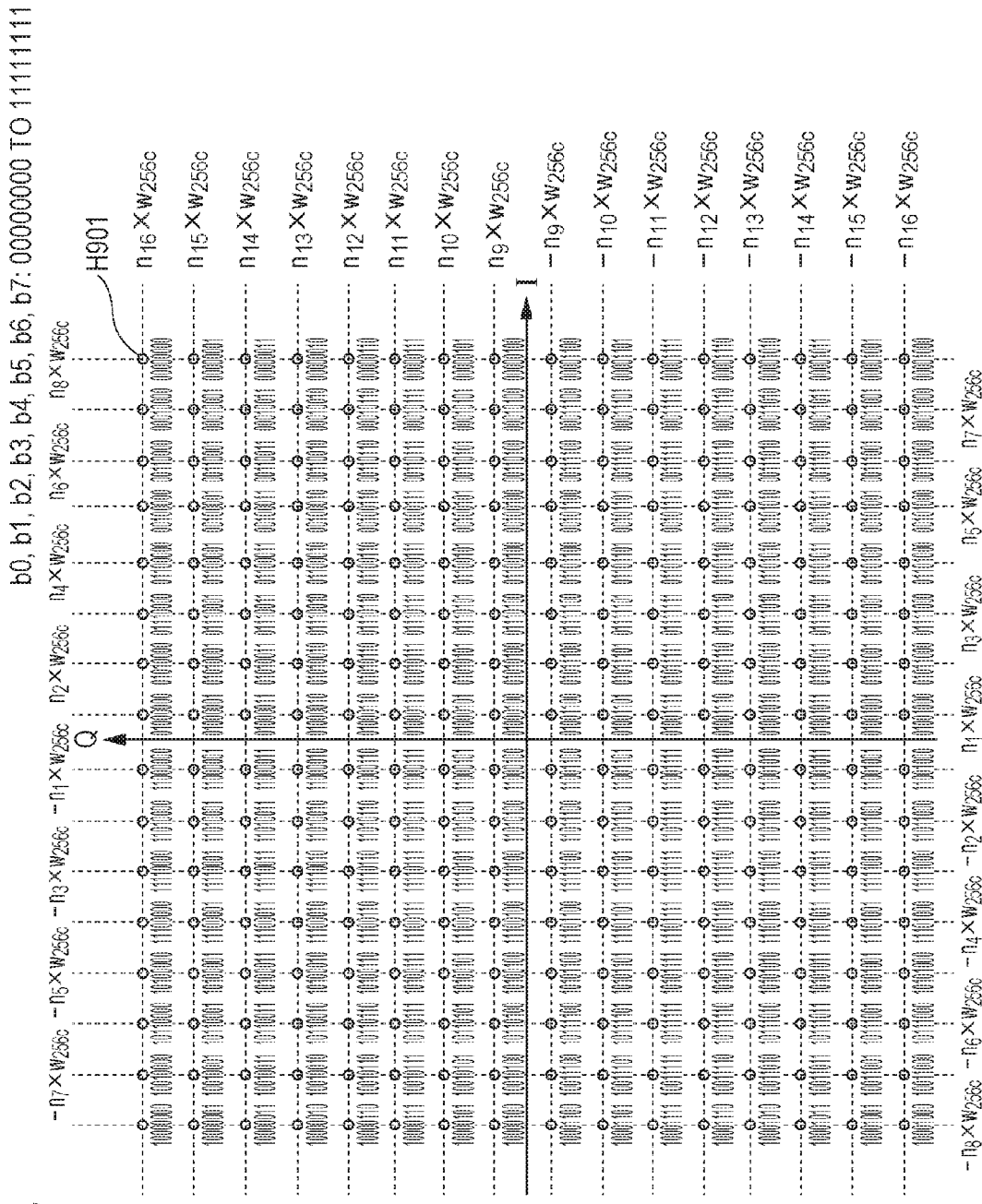
FIG. 11 is a view illustrating still another example of the 256QAM signal point arrangement in the in-phase I-orthogonal Q plane.

FIG. 11 illustrates an example of the 256QAM signal point arrangement in the in-phase I-orthogonal Q plane. In FIG. 11, 256 marks "○" (white circle) indicate the 256QAM signal points, the horizontal axis indicates the in-phase component I, and the vertical axis indicates the orthogonal component Q.

In FIG. 11,

"$n_1 > 0$ ($n_1$ is a real number greater than 0) and $n_2 > 0$ ($n_2$ is a real number greater than 0) and $n_3 > 0$ ($n_3$ is a real number greater than 0) and $n_4 > 0$ ($n_4$ is a real number greater than 0) and $n_5 > 0$ ($n_5$ is a real number greater than 0) and $n_6 > 0$ ($n_6$ is a real number greater than 0) and $n_7 > 0$ ($n_7$ is a real number greater than 0) and $n_8 > 0$ (no is a real number greater than 0) and $n_9 > 0$ (ng is a real number greater than 0) and $n_{10} > 0$ ($n_{10}$ is a real number greater than 0) and $n_{11} > 0$ ($n_{11}$ is a real number greater than 0) and $n_{12} > 0$ ($n_{12}$ is a real number greater than 0) and $n_{13} > 0$ ($n_{13}$ is a real number greater than 0) and $n_{14} > 0$ ($n_{14}$ is a real number greater than 0) and $n_{15} > 0$ ($n_{15}$ is a real number greater than 0) and $n_{16} > 0$ ($n_{16}$ is a real number greater than 0) hold, and $\{n_1 \neq n_2$ and $n_1 \neq n_3$ and $n_1 \neq n_4$ and $n_1 \neq n_5$ and $n_1 \neq n_6$ and $n_1 \neq n_7$ and $n_1 \neq n_8$ and $n_2 \neq n_3$ and $n_2 \neq n_4$ and $n_2 \neq n_5$ and $n_2 \neq n_6$ and $n_2 \neq n_7$ and $n_2 \neq n_8$ and $n_3 \neq n_4$ and $n_3 \neq n_5$ and $n_3 \neq n_6$ and $n_3 \neq n_7$ and $n_3 \neq n_8$ and $n_4 \neq n_5$ and $n_4 \neq n_6$ and $n_4 \neq n_7$ and $n_4 \neq n_8$ and $n_5 \neq n_6$ and $n_5 \neq n_7$ and $n_5 \neq n_8$ and $n_6 \neq n_7$ and $n_6 \neq n_8$ and $n_7 \neq n_8\}$ and $\{n_9 \neq n_{10}$ and $n_9 \neq n_{11}$ and $n_9 \neq n_{12}$ and $n_9 \neq n_{13}$ and $n_9 \neq n_{14}$ and $n_9 \neq n_{15}$ and $n_9 \neq n_{16}$ and $n_{10} \neq n_{11}$ and $n_{10} \neq n_{12}$ and $n_{10} \neq n_{13}$ and $n_{10} \neq n_{14}$ and $n_{10} \neq n_{15}$ and $n_{10} \neq n_{16}$ and $n_{11} \neq n_{12}$ and $n_{11} \neq n_{13}$ and $n_{11} \neq n_{14}$ and $n_{11} \neq n_{15}$ and $n_{11} \neq n_{16}$ and $n_{12} \neq n_{13}$ and $n_{12} \neq n_{14}$ and $n_{12} \neq n_{15}$ and $n_{12} \neq n_6$ and $n_{13} \neq n_{14}$ and $n_{13} \neq n_{15}$ and $n_{13} \neq n_{16}$ and $n_{14} \neq n_{15}$ and $n_{14} \neq n_{16}$ and $n_{15} \neq n_{16}\}$ and ($\{n_1 \neq n_9$ or $n_2 \neq n_{10}$ or $n_3 \neq n_{11}$ or $n_4 \neq n_{12}$ or $n_5 \neq n_{13}$ or $n_6 \neq n_{14}$ or $n_7 \neq n_{15}$ or $n_8 \neq n_{16}$ holds$\}$ hold."

or

"$n_1 > 0$ ($n_1$ is a real number greater than 0) and $n_2 > 0$ ($n_2$ is a real number greater than 0) and $n_3 > 0$ ($n_3$ is a real number greater than 0) and $n_4 > 0$ ($n_4$ is a real number greater than 0) and $n_5 > 0$ ($n_5$ is a real number greater than 0) and $n_6 > 0$ ($n_6$ is a real number greater than 0) and $n_7 > 0$ ($n_7$ is a real number greater than 0) and $n_8 > 0$ ($n_8$ is a real number greater than 0) and $n_9 > 0$ ($n_9$ is a real number greater than 0) and $n_{10} > 0$ ($n_{10}$ is a real number greater than 0) and $n_{11} > 0$ ($n_{11}$ is a real number greater than 0) and $n_{12} > 0$ ($n_{12}$ is a real number greater than 0) and $n_{13} > 0$ ($n_{13}$ is a real number greater than 0) and $n_{14} > 0$ ($n_{14}$ is a real number greater than 0) and $n_{15} > 0$ ($n_{15}$ is a real number greater than 0) and $n_{16} > 0$ ($n_{16}$ is a real number greater than 0) hold, and $\{n_1 \neq n_2$ and $n_1 \neq n_3$ and $n_1 \neq n_4$ and $n_1 \neq n_5$ and $n_1 \neq n_6$ and $n_1 \neq n_7$ and $n_1 \neq n_8$ and $n_2 \neq n_3$ and $n_2 : n_4$ and $n_2 \neq n_5$ and $n_2 \neq n_6$ and $n_2 \neq n_7$ and $n_2 \ n_8$ and $n_3 \neq n_4$ and $n_3 \neq n_5$ and $n_3 \neq n_6$ and $n_3 \neq n_7$ and $n_3 \neq n_6$ and $n_4 \neq n_5$ and $n_4 \neq n_6$ and $n_4 \neq n_7$ and $n_4 \neq n_8$ and $n_5 \neq n_6$ and $n_5 \neq n_7$ and $n_5 \neq n_8$ and $n_6 \neq n_7$ and $n_5 \neq n_8$ and $n_7 \neq n_8\}$ and $\{n_9 \neq n_{10}$ and $n_9 \neq n_{11}$ and $n_9 \neq n_{12}$ and $n_9 \neq n_{13}$ and $n_9 \neq n_{14}$ and $n_9 \neq n_{15}$ and $n_9 \neq n_{16}$ and $n_{10} \neq n_1$, and $n_{10} \neq n_{12}$ and $n_{10} \neq n_{13}$ and $n_{10} \neq n_{14}$ and $n_{10} \neq n_{15}$ and $n_{10} \neq n_{16}$ and $n_{11} \neq n_{12}$ and $n_{11} \neq n_{13}$ and $n_{11} \neq n_{14}$ and $n_{11} \neq n_{15}$ and $n_{11} \neq n_{16}$ and $n_{12} \neq n_{13}$ and $n_{12} \neq n_{14}$ and $n_{12} \neq n_{15}$ and $n_{12} \neq n_{16}$ and $n_{13} \neq n_{14}$ and $n_{13} \neq n_{15}$ and $n_{13} \neq n_{16}$ and $n_{14} \neq n_{15}$ and $n_{14} \neq n_{16}$ and $n_{15} \neq n_{16}$}
and
{$n_1 \neq n_9$ or $n_2 \neq n_{10}$ or $n_3 \neq n_{11}$ or $n_4 \neq n_{12}$ or $n_5 \neq n_{13}$ or $n_6 \neq n_{14}$ or $n_7 \neq n_{15}$ or $n_8 \neq n_6$ holds},
and
{$n_1 = n_9$ or $n_2 = n_{10}$ or $n_3 = n_{11}$ or $n_4 = n_{12}$ or $n_5 = n_{13}$ or $n_{10} = n_{14}$ or $n_7 = n_{15}$ or $n_8 = n_{16}$ holds} hold."

In the in-phase I-orthogonal Q plane, coordinates of the 256 signal points (in FIG. 11, the mark "0" indicates the signal point) for 256QAM are expressed as follows:

$(n_8 \times w_{256c}, n_{16} \times w_{256c}), (n_6 \times w_{256c}, n_{15} \times w_{256c}), (n_6 \times w_{256c}, n_{14} \times w_{256c}), (n_8 \times w_{256c}, n_{13} \times w_{256c}), (n_6 \times w_{256c}, n_{12} \times w_{256c}), (n_8 \times w_{256c}, n_{11} \times w_{256c}), (n_8 \times w_{256c}, n_{10} \times w_{256c}), (n_8 \times w_{256c}, n_9 \times w_{256c}), (n_8 \times w_{256c}, -n_{16} \times w_{256c}), (n_7 \times w_{256c}, -n_{15} \times w_{256c}), (n_7 \times w_{256c}, -n_{14} \times w_{256c}), (n_7 \times w_{256c}, -n_{13} \times w_{256c}), (n_8 \times w_{256c}, -n_{12} \times w_{256c}), (n_6 \times w_{256c}, -n_{11} \times w_{256c}), (n_6 \times w_{256c}, -n_{10} \times w_{256c}), (n \times w_{256c}, -n_9 \times w_{256c}), (n_7 \times w_{256c}, n_{16} \times w_{256c}), (n_7 \times w_{256c}, n_{15} \times w_{256c}), (n_7 \times w_{256c}, n_{14} \times w_{256c}), (n_7 \times w_{256c}, n_{13} \times w_{256c}), (n_7 \times w_{256c}, n_{12} \times w_{256c}), (n_7 \times w_{256c}, n_{11} \times w_{256c}), (n_7 \times w_{256c}, n_{10} \times w_{256c}), (n_7 \times w_{256c}, n_9 \times w_{256c}), (n_7 \times w_{256c}, -n_{16} \times w_{256c}), (n_7 \times w_{256c}, -n_{15} \times w_{256c}), (n_7 \times w_{256c}, -n_{14} \times w_{256c}), (n_7 \times w_{256c}, -n_{13} \times w_{256c}), (n_7 \times w_{256c}, -n_{12} \times w_{256c}), (n_7 \times w_{256c}, -n_{11} \times w_{256c}), (n_7 \times w_{256c}, -n_{10} \times w_{256c}), (n_7 \times w_{256c}, -n_9 \times w_{256c}), (n_6 \times w_{256c}, n_{16} \times w_{256c}), (n_6 \times w_{256c}, n_{15} \times w_{256c}), (n_6 \times w_{256c}, n_{14} \times w_{256c}), (n_6 \times w_{256c}, n_{13} \times w_{256c}), (n_6 \times w_{256c}, -n_{12} \times w_{256c}), (n_6 \times w_{256c}, -n_{11} \times w_{256c}), (n_6 \times w_{256c}, n \times w_{256c}, -n_{10} \times w_{256c}), (n_6 \times w_{256c}, -n_9 \times w_{256c}), (n_6 \times w_{256c}, -n_{16} \times w_{256c}), (n_6 \times w_{256c}, -n_{15} \times w_{256c}), (n_6 \times w_{256c}, -n_{14} \times w_{256c}), (n_6 \times w_{256c}, -n_{13} \times w_{256c}), (n_6 \times w_{256c}, -n_{12} \times w_{256c}), (n_6 \times w_{256c}, -n_{11} \times w_{256c}), (n_6 \times w_{256c}, -n_{10} \times w_{256c}), (n_6 \times w_{256c}, -n_9 \times w_{256c}), (n_5 \times w_{256c}, n_{16} \times w_{256c}), (n_5 \times w_{256c}, n_{14} \times w_{256c}), (n_5 \times w_{256c}, n_{13} \times w_{256c}), (n_5 \times w_{256c}, n_{12} \times w_{256c}), (n_5 \times w_{256c}, n_{11} \times w_{256c}), (n_5 \times w_{256c}, n_{10} \times w_{256c}), (n_5 \times w_{256c}, n_9 \times w_{256c}), (n_5 \times w_{256c}, -n_{16} \times w_{256c}), (n_5 \times w_{256c}, -n_{15} \times w_{256c}), (n_5 \times w_{256c}, -n_{14} \times w_{256c}), (n_5 \times w_{256c}, -n_{13} \times w_{256c}), (n_5 \times w_{256c}, -n_{12} \times w_{256c}), (n_4 \times w_{256c}, -n_{11} \times w_{256c}), (n_4 \times w_{256c}, -n_{10} \times w_{256c}), (n_4 \times w_{256c}, -n_9 \times w_{256c}), (n_4 \times w_{256c}, n_{16} \times w_{256c}), (n_4 \times w_{256c}, n_{15} \times w_{256c}), (n_4 \times w_{256c}, n_{14} \times w_{256c}), (n_{14} \times w_{256c}, n_{13} \times w_{256c}), \times w_{256c}, n_{12} \times w_{256c}), (n_4 \times w_{256c}, n_{11} \times w_{256c}), (n_4 \times w_{256c}, n_{10} \times w_{256c}), (n_4 \times w_{256c}, n_9 \times w_{256c}), (n_4 \times w_{256c}, -n_{16} \times w_{256c}), (n_4 \times w_{256c}, -n_{15} \times w_{256c}), (n_4 \times w_{256c}, -n_{14} \times w_{256c}), (n_4 \times w_{256c}, -n_{13} \times w_{256c}), (n_4 \times w_{256c}, -n_{12} \times w_{256c}), (n_4 \times w_{256c}, -n_{11} \times w_{256c}), (n_4 \times w_{256c}, -n_{10} \times w_{256c}), (n_4 \times w_{256c}, -n_9 \times w_{256c}), (n_3 \times w_{256c}, n_{16} \times w_{256c}), (n_3 \times w_{256c}, n_{15} \times w_{256c}), (n_3 \times w_{256c}, -n_{14} \times w_{256c}), (n_3 \times w_{256c}, n_{13} \times w_{256c}), (n_3 \times w_{256c}, n_{12} \times w_{256c}), (n_3 \times w_{256c}, n_{11} \times w_{256c}), (n_3 \times w_{256c}, n_{10} \times w_{256c}), (n_3 \times w_{256c}, n_9 \times w_{256c}), (n_3 \times w_{256c}, -n_{16} \times w_{256c}), (n_3 \times w_{256c}, -n_{15} \times w_{256c}), (n_3 \times w_{256c}, -n_{14} \times w_{256c}), (n_3 \times w_{256c}, -n_{13} \times w_{256c}), (n_3 \times w_{256c}, -n_{12} \times w_{256c}), (n_3 \times w_{256c}, -n_{11} \times w_{256c}), (n_3 \times w_{256c}, -n_{10} \times w_{256c}), (n_4 \times w_{256c}, -n_9 \times w_{256c}), (n_2 \times w_{256c}, -n_{16} \times w_{256c}), (n_4 \times w_{256c}, n_{15} \times w_{256c}), (n_2 \times w_{256c}, n_{14} \times w_{256c}), (n_2 \times w_{256c}, n_{13} \times w_{256c}), \times w_{256c}, n_{12} \times w_{256c}), (n_2 \times w_{256c}, n_{11} \times w_{256c}), (n_4 \times w_{256c}, n_{10} \times w_{256c}), (n_2 \times w_{256c}, n_9 \times w_{256c}), (n_2 \times w_{256c}, -n_{16} \times w_{256c}), (n_4 \times w_{256c}, -n_{15} \times w_{256c}), (n_2 \times w_{256c}, -n_{14} \times w_{256c}), (n_2 \times w_{256c}, -n_{13} \times w_{256c}), (n_2 \times w_{256c}, -n_{12} \times w_{256c}), (n_2 \times w_{256c}, -n_{11} \times w_{256c}), (n_2 \times w_{256c}, -n_{10} \times w_{256c}), (n_2 \times w_{256c}, -n_9 \times w_{256c}), (n_1 \times w_{256c}, n_{16} \times w_{256c}), (n_1 \times w_{256c}, n_{15} \times w_{256c}), (n_1 \times w_{256c}, n_{14} \times w_{256c}), (n_1 \times w_{256c}, n_{13} \times w_{256c}), (n_1 \times w_{256c}, n_{12} \times w_{256c}), (n_1 \times w_{256c}, n_{11} \times w_{256c}), (n_1 \times w_{256c}, n_{10} \times w_{256c}), (n_1 \times w_{256c}, n_9 \times w_{256c}), (n_1 \times w_{256c}, -n_{16} \times w_{256c}), (n_1 \times w_{256c}, -n_{15} \times w_{256c}), (n_1 \times w_{256c}, -n_{14} \times w_{256c}), (n_1 \times w_{256c}, -n_{13} \times w_{256c}), (n_1 \times w_{256c}, -n_{12} \times w_{256c}), (n_1 \times w_{256c}, -n_{11} \times w_{256c}), (n_1 \times w_{256c}, -n_{10} \times w_{256c}), (n_1 \times w_{256c}, -n_9 \times w_{256c}), (-n_8 \times w_{256c}, n_{16} \times w_{256c}), (-n_8 \times w_{256c}, n_{15} \times w_{256c}), (-n_8 \times w_{256c}, n_{14} \times w_{256c}), (-n_8 \times w_{256c}, n_{13} \times w_{256c}), (-n_8 \times w_{256c}, n_{12} \times w_{256c}), (-n_8 \times w_{256c}, n_{11} \times w_{256c}), (-n_8 \times w_{256c}, n_{10} \times w_{256c}), (-n_8 \times w_{256c}, n_9 \times w_{256c}), (-n_8 \times w_{256c}, -n_{16} \times w_{256c}), (-n_8 \times w_{256c}, -n_{15} \times w_{256c}), (-n_8 \times w_{256c}, -n_{14} \times w_{256c}), (-n_8 \times w_{256c}, -n_{13} \times w_{256c}), (-n_8 \times w_{256c}, -n_{12} \times w_{256c}), (-n_8 \times w_{256c}, -n_{11} \times w_{256c}), (-n_8 \times w_{256c}, -n_{10} \times w_{256c}), (-n_8 \times w_{256c}, -n_9 \times w_{256c}), (-n_7 \times w_{256c}, n_{16} \times w_{256c}), (-n_7 \times w_{256c}, n_{15} \times w_{256c}), (-n_7 \times w_{256c}, n_{14} \times w_{256c}), (-n_7 \times w_{256c}, n_{13} \times w_{256c}), (-n_7 \times w_{256c}, n_{12} \times w_{256c}), (-n_7 \times w_{256c}, n_{11} \times w_{256c}), (-n_7 \times w_{256c}, n_{10} \times w_{256c}), (-n_7 \times w_{256c}, n_9 \times w_{256c}), (-n_7 \times w_{256c}, -n_{16} \times w_{256c}), (n_8 \times w_{256c}, -n_{15} \times w_{256c}), (-n_7 \times w_{256c}, -n_{14} \times w_{256c}), (-n_7 \times w_{256c}, -n_{13} \times w_{256c}), (-n_{12} \times w_{256c}), (-n_7 \times w_{256c}, -n_{11} \times w_{256c}), (-n_7 \times w_{256c}, -n_{10} \times w_{256c}), (-n_7 \times w_{256c}, -n_9 \times w_{256c}), (-n_6 \times w_{256c}, n_{16} \times w_{256c}), (-n_6 \times w_{256c}, n_{15} \times w_{256c}), (-n_8 \times w_{256c}, n_{14} \times w_{256c}), (-n_6 \times w_{256c}, n_{13} \times w_{256c}), (-n_6 \times w_{256c}, n_{12} \times w_{256c}), (-n_6 \times w_{256c}, n_{11} \times w_{256c}), (-n_6 \times w_{256c}, n_{10} \times w_{256c}), (-n_6 \times w_{256c}, n_9 \times w_{256c}), (-n_6 \times w_{256c}, -n_{16} \times w_{256c}), (-n_6 \times w_{256c}, -n_{15} \times w_{256c}), (-n_6 \times w_{256c}, -n_{14} \times w_{256c}), (-n_6 \times w_{256c}, n_{13} \times w_{256c}), (-n_6 \times w_{256c}, -n_{12} \times w_{256c}), (-n_6 \times w_{256c}, -n_{11} \times w_{256c}), (-n_6 \times w_{256c}, -n_{10} \times w_{256c}), (-n_8 \times w_{256c}, -n_9 \times w_{256c}), (-n_5 \times w_{256c}, n_{16} \times w_{256c}), (-n_5 \times w_{256c}, n_{15} \times w_{256c}), (-n_5 \times w_{256c}, n_{14} \times w_{256c}), (-n_5 \times w_{256c}, n_{13} \times w_{256c}), (-n_5 \times w_{256c}, n_{12} \times w_{256c}), (-n_5 \times w_{256c}, n_{11} \times w_{256c}), (-n_5 \times w_{256c}, n_{10} \times w_{256c}), (-n_5 \times w_{256c}, n_9 \times w_{256c}), (-n_5 \times w_{256c}, -n_{16} \times w_{256c}), (-n_5 \times w_{256c}, -n_{15} \times w_{256c}), (-n_5 \times w_{256c}, -n_{14} \times w_{256c}), (-n_5 \times w_{256c}, -n_{13} \times w_{256c}), (-n_5 \times w_{256c}, -n_{12} \times w_{256c}), (-n_5 \times w_{256c}, -n_{11} \times w_{256c}), (-n_5 \times w_{256c}, n_{10} \times w_{256c}), (-n_5 \times w_{256c}, -n_9 \times w_{256c}), (-n_4 \times w_{256c}, n_{16} \times w_{256c}), (-n_4 \times w_{256c}, n_{15} \times w_{256c}), (-n_4 \times w_{256c}, n_{14} \times w_{256c}), (-n_4 \times w_{256c}, n_{13} \times w_{256c}), (-n_4 \times w_{256c}, n_{12} \times w_{256c}), (-n_4 \times w_{256c}, n_{11} \times w_{256c}), (-n_4 \times w_{256c}, n_{10} \times w_{256c}), (-n_4 \times w_{256c}, -n_9 \times w_{256c}), (-n_4 \times w_{256c}, -n_{16} \times w_{256c}), (-n_4 \times w_{256c}, -n_{15} \times w_{256c}), (-n_4 \times w_{256c}, -n_{14} \times w_{256c}, n_{14} \times w_{256c}), (-n_4 \times w_{256c}, -n_{13} \times w_{256c}), (-n_4 \times w_{256c}, -n_{12} \times w_{256c}), (-n_4 \times w_{256c}, -n_{11} \times w_{256c}), (-n_4 \times w_{256c}, -n_{10} \times w_{256c}), (-n_4 \times w_{256c}, -n_9 \times w_{256c}), (-n_3 \times w_{256c}, n_{16} \times w_{256c})(-n_3 \times w_{256c}, n_{15} \times w_{256c}), (-n_3 \times w_{256c}, n_{14} \times w_{256c}), (-n_3 \times w_{256c}, n_{13} \times w_{256c}), (-n_3 \times w_{256c}, n_{12} \times w_{256c}), (-n_3 \times w_{256c}, n_{11} \times w_{256c}), (-n_3 \times w_{256c}, n_{10} \times w_{256c}), (-n_3 \times w_{256c}, n_9 \times w_{256c}), (-n_3 \times w_{256c}, -n_{16} \times w_{256c}), (-n_3 \times w_{256c}, -n_{15} \times w_{256c}), (-n_3 \times w_{256c}, -n_{14} \times w_{256c}), (-n_3 \times w_{256c}, -n_{13} \times w_{256c}), (-n_3 \times w_{256c}, -n_{12} \times w_{256c}), (-n_3 \times w_{256c}, -n_{11} \times w_{256c}), (-n_3 \times w_{256c}, -n_{10} \times w_{256c}), (-n_3 \times w_{256c}, -n_9 \times w_{256c}), (-n_2 \times w_{256c}, n_{16} \times w_{256c}), (-n_2 \times w_{256c}, n_{15} \times w_{256c}), (-n_2 \times w_{256c}, n_{14} \times w_{256c}), (-n_2 \times w_{256c}, n_{13} \times w_{256c}), (-n_2 \times w_{256c}, n_{12} \times w_{256c}), (-n_2 \times w_{256c}, n_{11} \times w_{256c}), (-n_2 \times w_{256c}, n_{10} \times w_{256c}), (-n_2 \times w_{256c}, n_9 \times w_{256c}), (-n_2 \times w_{256c}, -n_{16} \times w_{256c}), (-n_2 \times w_{256c}, -n_{15} \times w_{256c}), (-n_2 \times w_{256c}, -n_{14} \times w_{256c}), (-n_2 \times w_{256c}, -n_{13} \times w_{256c}), (-n_2 \times w_{256c}, -n_{12} \times w_{256c}), (-n_2 \times w_{256c}, -n_{11} \times w_{256c}), (-n_2 \times w_{256c}, -n_{10} \times w_{256c}), (-n_2 \times w_{256c}, -n_9 \times w_{256c}), (-n_1 \times w_{256c}, n_{16} \times w_{256c}), (-n_1 \times w_{256c}, n_{15} \times w_{256c}), (-n_1 \times w_{256c}, -n_{14} \times w_{256c}), (-n_1 \times w_{256c}, n_{13} \times w_{256c}), (-n_1 \times w_{256c}, n_{12} \times w_{256c}), (-n_1 \times w_{256c}, n_{11} \times w_{256c}), (-n_{11} \times w_{256c}, n_{10} \times w_{256c}), (-n_1 \times w_{256c}, n_9 \times w_{256c}), (-n_1 \times w_{256c}, -n_{16} \times w_{256c}), (-n_1 \times w_{256c}, -n_{15} \times w_{256c}), (-n_1 \times w_{256c}, -n_{14} \times w_{256c}), (-n_1 \times w_{256c}, -n_{13} \times w_{256c}), (-n_1 \times w_{256c}, -n_{12} \times w_{256c}), (-n_1 \times w_{256c}, -n_{11} \times w_{256c}), (-n_1 \times w_{256c}, -n_{10} \times w_{256c}), (-n_1 \times w_{256c}, -n_9 \times w_{256c})$, where $w_{256c}$ is a real number greater than 0.

In FIG. 11, the bits (input bits) to be transmitted are set to b0, b1, b2, b3, b4, b5, b6, and b7. For example, the bits to be transmitted (b0,b1,b2,b3,b4,b5,b6,b7)=(0,0,0,0,0,0,0,0) are mapped in signal point H901 of FIG. 11 and $(I,Q)=(n_8 \times w_{256c}, n_{16} \times w_{256c})$ is obtained, where I and Q are the in-phase component and the orthogonal component of the post-mapping baseband signal, respectively.

In FIG. 11, in-phase component I and orthogonal component Q of the post-mapping baseband signal (in 256QAM) are decided based on the bits to be transmitted (b0,b1,b2, b3,b4,b5,b6,b7). An example of the relationship between a set of b0, b1, b2, b3, b4, b5, b6, and b7 (00000000 to 11111111) and the coordinates of the signal point is indicated in FIG. 11. The values of the sets of b0, b1, b2, b3, b4, b5, b6, and b7 (00000000 to 11111111) are indicated immediately below the 256 signal points (the marks "○" in FIG. 11) of 256QAM:

$(n_8 \times w_{256c}, n_{16} \times w_{256c}), (n_8 \times w_{256c}, n_{15} \times w_{256c}), (n_8 \times w_{256c}, n_{14} \times w_{256c}), (n_8 \times w_{256c}, n_{13} \times w_{256c}), (n_8 \times w_{256c}, n_{12} \times w_{256c}), (n_8 \times w_{256c}, n_{11} \times w_{256c}), (n_8 \times w_{256c}, n_{10} \times w_{256c}), (n_8 \times w_{256c}, n_9 \times w_{256c}), (n_8 \times w_{256c}, -n_{16} \times w_{256c}), (n_8 \times w_{256c}, -n_{15} \times w_{256c}), (n_8 \times w_{256c}, -n_{14} \times w_{256c}), (n_8 \times w_{256c}, -n_{13} \times w_{256c}), (n_8 \times w_{256c}, -n_{12} \times w_{256c}), (n_8 \times w_{256c}, -n_{11} \times w_{256c}), (n_8 \times w_{256c}, -n_{10} \times w_{256c}), (n_8 \times w_{256c}, -n_9 \times w_{256c}),\ (n_7 \times w_{256c}, n_{16} \times w_{256c}), (n_7 \times w_{256c}, n_{15} \times w_{256c}), (n_7 \times w_{256c}, n_{14} \times w_{256c}), (n_7 \times w_{256c}, n_{13} \times w_{256c}), (n_7 \times w_{256c}, n_{12} \times w_{256c}), (n_7 \times w_{256c}, n_{11} \times w_{256c}), (n_7 \times w_{256c}, n_{10} \times w_{256c}), (n_7 \times w_{256c}, n_9 \times w_{256c}), (n_7 \times w_{256c}, -n_{16} \times w_{256c}), (n_7 \times w_{256c}, -n_{15} \times w_{256c}), (n_7 \times w_{256c}, -n_{14} \times w_{256c}), (n_7 \times w_{256c}, -n_{13} \times w_{256c}), (n_7 \times w_{256c}, -n_{12} \times w_{256c}), (n_7 \times w_{256c}, -n_{11} \times w_{256c}), (n_7 \times w_{256c}, -n_{10} \times w_{256c}), (n_7 \times w_{256c}, -n_9 \times w_{256c}),\ (n_6 \times w_{256c}, n_{16} \times w_{256c}), (n_6 \times w_{256c}, n_{15} \times w_{256c}), (n_6 \times w_{256c}, n_{14} \times w_{256c}), (n_6 \times w_{256c}, n_{13} \times w_{256c}), (n_6 \times w_{256c}, n_{12} \times w_{256c}), (n_6 \times w_{256c}, n_{11} \times w_{256c}), (n_6 \times w_{256c}, n_{10} \times w_{256c}), (n_6 \times w_{256c}, n_9 \times w_{256c}), (n_6 \times w_{256c}, -n_{16} \times w_{256c}), (n_6 \times w_{256c}, -n_{15} \times w_{256c}), (n_6 \times w_{256c}, -n_{14} \times w_{256c}), (n_6 \times w_{256c}, -n_{13} \times w_{256c}), (n_6 \times w_{256c}, -n_{12} \times w_{256c}), (n_6 \times w_{256c}, -n_{11} \times w_{256c}), (n_6 \times w_{256c}, -n_{10} \times w_{256c}), (n_6 \times w_{256c}, -n_9 \times w_{256c}),\ (n_5 \times w_{256c}, n_{16} \times w_{256c}), (n_5 \times w_{256c}, n_{15} \times w_{256c}), (n_5 \times w_{256c}, n_{14} \times w_{256c}), (n_5 \times w_{256c}, n_{13} \times w_{256c}), (n_5 \times w_{256c}, n_{12} \times w_{256c}), (n_5 \times w_{256c}, n_{11} \times w_{256c}), (n_5 \times w_{256c}, n_{10} \times w_{256c}), (n_5 \times w_{256c}, n_9 \times w_{256c}), (n_5 \times w_{256c}, -n_{16} \times w_{256c}), (n_5 \times w_{256c}, -n_{15} \times w_{256c}), (n_5 \times w_{256c}, -n_{14} \times w_{256c}), (n_5 \times w_{256c}, -n_{13} \times w_{256c}), (n_5 \times w_{256c}, -n_{12} \times w_{256c}), (n_5 \times w_{256c}, -n_{11} \times w_{256c}), (n_5 \times w_{256c}, -n_{10} \times w_{256c}), (n_5 \times w_{256c}, -n_9 \times w_{256c}),\ (n_4 \times w_{256c}, n_{16} \times w_{256c}), (n_4 \times w_{256c}, n_{15} \times w_{256c}), (n_4 \times w_{256c}, n_{14} \times w_{256c}), (n_4 \times w_{256c}, n_{13} \times w_{256c}), (n_4 \times w_{256c}, n_{12} \times w_{256c}), (n_4 \times w_{256c}, n_{11} \times w_{256c}), (n_4 \times w_{256c}, n_{10} \times w_{256c}), (n_4 \times w_{256c}, n_9 \times w_{256c}), (n_4 \times w_{256c}, -n_{16} \times w_{256c}), (n_4 \times w_{256c}, -n_{15} \times w_{256c}), (n_4 \times w_{256c}, -n_{14} \times w_{256c}), (n_4 \times w_{256c}, -n_{13} \times w_{256c}), (n_4 \times w_{256c}, -n_{12} \times w_{256c}), (n_4 \times w_{256c}, -n_{11} \times w_{256c}), (n_4 \times w_{256c}, -n_{10} \times w_{256c}), (n_4 \times w_{256c}, -n_9 \times w_{256c}),\ (n_3 \times w_{256c}, n_{16} \times w_{256c}), (n_3 \times w_{256c}, n_{15} \times w_{256c}), (n_3 \times w_{256c}, n_{14} \times w_{256c}), (n_3 \times w_{256c}, n_{13} \times w_{256c}), (n_3 \times w_{256c}, n_{12} \times w_{256c}), (n_3 \times w_{256c}, n_{11} \times w_{256c}), (n_3 \times w_{256c}, n_{10} \times w_{256c}), (n_3 \times w_{256c}, n_9 \times w_{256c}), (n_3 \times w_{256c}, -n_{16} \times w_{256c}), (n_3 \times w_{256c}, -n_{15} \times w_{256c}), (n_3 \times w_{256c}, -n_{14} \times w_{256c}), (n_3 \times w_{256c}, -n_{13} \times w_{256c}), (n_3 \times w_{256c}, -n_{12} \times w_{256c}), (n_3 \times w_{256c}, -n_{11} \times w_{256c}), (n_3 \times w_{256c}, -n_{10} \times w_{256c}), (n_3 \times w_{256c}, -n_9 \times w_{256c}),\ (n_2 \times w_{256c}, n_{16} \times w_{256c}), (n_2 \times w_{256c}, n_{15} \times w_{256c}), (n_2 \times w_{256c}, n_{14} \times w_{256c}), (n_2 \times w_{256c}, n_{13} \times w_{256c}), (n_2 \times w_{256c}, n_{12} \times w_{256c}), (n_2 \times w_{256c}, n_{11} \times w_{256c}), (n_2 \times w_{256c}, n_{10} \times w_{256c}), (n_2 \times w_{256c}, n_9 \times w_{256c}), (n_2 \times w_{256c}, -n_{16} \times w_{256c}), (n_2 \times w_{256c}, -n_{15} \times w_{256c}), (n_2 \times w_{256c}, -n_{14} \times w_{256c}), (n_2 \times w_{256c}, -n_{13} \times w_{256c}), (n_2 \times w_{256c}, -n_{12} \times w_{256c}), (n_2 \times w_{256c}, -n_{11} \times w_{256c}), (n_2 \times w_{256c}, -n_{10} \times w_{256c}), (n_2 \times w_{256c}, -n_9 \times w_{256c}),\ (n_1 \times w_{256c}, n_{16} \times w_{256c}), (n_1 \times w_{256c}, n_{15} \times w_{256c}), (n_1 \times w_{256c}, n_{14} \times w_{256c}), (n_1 \times w_{256c}, n_{13} \times w_{256c}), (n_1 \times w_{256c}, n_{12} \times w_{256c}), (n_1 \times w_{256c}, n_{11} \times w_{256c}), (n_1 \times w_{256c}, n_{10} \times w_{256c}), (n_1 \times w_{256c}, n_9 \times w_{256c}), (n_1 \times w_{256c}, -n_{16} \times w_{256c}), (n_1 \times w_{256c}, -n_{15} \times w_{256c}), (n_1 \times w_{256c}, -n_{14} \times w_{256c}), (n_1 \times w_{256c}, -n_{13} \times w_{256c}), (n_1 \times w_{256c}, -n_{12} \times w_{256c}), (n_1 \times w_{256c}, -n_{11} \times w_{256c}), (n_1 \times w_{256c}, -n_{10} \times w_{256c}), (n_1 \times w_{256c}, -n_9 \times w_{256c}),\ (-n_8 \times w_{256c}, n_{16} \times w_{256c}), (-n_8 \times w_{256c}, n_{15} \times w_{256c}), (-n_8 \times w_{256c}, n_{14} \times w_{256c}), (-n_8 \times w_{256c}, n_{13} \times w_{256c}), (-n_8 \times w_{256c}, n_{12} \times w_{256c}), (-n_8 \times w_{256c}, n_{11} \times w_{256c}), (-n_8 \times w_{256c}, n_{10} \times w_{256c}), (-n_8 \times w_{256c}, n_9 \times w_{256c}), (-n_8 \times w_{256c}, -n_{16} \times w_{256c}), (-n_8 \times w_{256c}, -n_{15} \times w_{256c}), (-n_8 \times w_{256c}, -n_{14} \times w_{256c}), (-n_8 \times w_{256c}, -n_{13} \times w_{256c}), (-n_8 \times w_{256c}, -n_{12} \times w_{256c}), (-n_8 \times w_{256c}, -n_{11} \times w_{256c}), (-n_8 \times w_{256c}, -n_{10} \times w_{256c}), (-n_8 \times w_{256c}, -n_9 \times w_{256c}),\ (-n_7 \times w_{256c}, n_{16} \times w_{256c}), (-n_7 \times w_{256c}, n_{15} \times w_{256c}), (-n_7 \times w_{256c}, n_{14} \times w_{256c}), (-n_7 \times w_{256c}, n_{13} \times w_{256c}), (-n_7 \times w_{256c}, n_{12} \times w_{256c}), (-n_7 \times w_{256c}, n_{11} \times w_{256c}), (-n_7 \times w_{256c}, n_{10} \times w_{256c}), (-n_7 \times w_{256c}, n_9 \times w_{256c}), (-n_7 \times w_{256c}, -n_{16} \times w_{256c}), (-n_7 \times w_{256c}, -n_{15} \times w_{256c}), (-n_7 \times w_{256c}, -n_{14} \times w_{256c}), (-n_7 \times w_{256c}, -n_{13} \times w_{256c}), (-n_7 \times w_{256c}, -n_{12} \times w_{256c}), (-n_7 \times w_{256c}, -n_{11} \times w_{256c}), (-n_7 \times w_{256c}, -n_{10} \times w_{256c}), (-n_7 \times w_{256c}, -n_9 \times w_{256c}),\ (-n_6 \times w_{256c}, n_{16} \times w_{256c}), (-n_6 \times w_{256c}, n_{15} \times w_{256c}), (-n_6 \times w_{256c}, n_{14} \times w_{256c}), (-n_6 \times w_{256c}, n_{13} \times w_{256c}), (-n_6 \times w_{256c}, n_{12} \times w_{256c}), (-n_6 \times w_{256c}, n_{11} \times w_{256c}), (-n_6 \times w_{256c}, n_{10} \times w_{256c}), (-n_6 \times w_{256c}, n_9 \times w_{256c}), (-n_6 \times w_{256c}, -n_{16} \times w_{256c}), (-n_6 \times w_{256c}, -n_{15} \times w_{256c}), (-n_6 \times w_{256c}, -n_{14} \times w_{256c}), (-n_6 \times w_{256c}, -n_{13} \times w_{256c}), (-n_6 \times w_{256c}, -n_{12} \times w_{256c}), (-n_6 \times w_{256c}, -n_{11} \times w_{256c}), (-n_6 \times w_{256c}, -n_{10} \times w_{256c}), (-n_6 \times w_{256c}, -n_9 \times w_{256c}),\ (-n_5 \times w_{256c}, n_{16} \times w_{256c}), (-n_5 \times w_{256c}, n_{15} \times w_{256c}), (-n_5 \times w_{256c}, n_{14} \times w_{256c}), (-n_5 \times w_{256c}, n_{13} \times w_{256c}), (-n_5 \times w_{256c}, n_{12} \times w_{256c}), (-n_5 \times w_{256c}, n_{11} \times w_{256c}), (-n_5 \times w_{256c}, n_{10} \times w_{256c}), (-n_5 \times w_{256c}, n_9 \times w_{256c}), (-n_5 \times w_{256c}, -n_{16} \times w_{256c}), (-n_5 \times w_{256c}, -n_{15} \times w_{256c}), (-n_5 \times w_{256c}, -n_{14} \times w_{256c}), (-n_5 \times w_{256c}, -n_{13} \times w_{256c}), (-n_5 \times w_{256c}, -n_{12} \times w_{256c}), (-n_5 \times w_{256c}, -n_{11} \times w_{256c}), (-n_5 \times w_{256c}, -n_{10} \times w_{256c}), (-n_5 \times w_{256c}, -n_9 \times w_{256c}),\ (-n_4 \times w_{256c}, n_{16} \times w_{256c}), (-n_4 \times w_{256c}, n_{15} \times w_{256c}), (-n_4 \times w_{256c}, n_{14} \times w_{256c}), (-n_4 \times w_{256c}, n_{13} \times w_{256c}), (-n_4 \times w_{256c}, n_{12} \times w_{256c}), (-n_4 \times w_{256c}, n_{11} \times w_{256c}), (-n_4 \times w_{256c}, n_{10} \times w_{256c}), (-n_4 \times w_{256c}, n_9 \times w_{256c}), (-n_4 \times w_{256c}, -n_{16} \times w_{256c}), (-n_4 \times w_{256c}, -n_{15} \times w_{256c}), (-n_4 \times w_{256c}, -n_{14} \times w_{256c}), (-n_4 \times w_{256c}, -n_{13} \times w_{256c}), (-n_4 \times w_{256c}, -n_{12} \times w_{256c}), (-n_4 \times w_{256c}, -n_{11} \times w_{256c}), (-n_4 \times w_{256c}, -n_{10} \times w_{256c}), (-n_4 \times w_{256c}, -n_9 \times w_{256c}),\ (-n_3 \times w_{256c}, n_{16} \times w_{256c}), (-n_3 \times w_{256c}, n_{15} \times w_{256c}), (-n_3 \times w_{256c}, n_{14} \times w_{256c}), (-n_3 \times w_{256c}, n_{13} \times w_{256c}), (-n_3 \times w_{256c}, n_{12} \times w_{256c}), (-n_3 \times w_{256c}, n_{11} \times w_{256c}), (-n_3 \times w_{256c}, n_{10} \times w_{256c}), (-n_3 \times w_{256c}, n_9 \times w_{256c}), (-n_3 \times w_{256c}, -n_{16} \times w_{256c}), (-n_3 \times w_{256c}, -n_{15} \times w_{256c}), (-n_3 \times w_{256c}, -n_{14} \times w_{256c}), (-n_3 \times w_{256c}, -n_{13} \times w_{256c}), (-n_3 \times w_{256c}, -n_{12} \times w_{256c}), (-n_3 \times w_{256c}, -n_{11} \times w_{256c}), (-n_3 \times w_{256c}, -n_{10} \times w_{256c}), (-n_3 \times w_{256c}, -n_9 \times w_{256c}),\ (-n_2 \times w_{256c}, n_{16} \times w_{256c}), (-n_2 \times w_{256c}, n_{15} \times w_{256c}), (-n_2 \times w_{256c}, n_{14} \times w_{256c}), (-n_2 \times w_{256c}, n_{13} \times w_{256c}), (-w_{256c}), (-n_2 \times w_{256c}, n_{12} \times w_{256c}), (-n_2 \times w_{256c}, n_{11} \times w_{256c}), (-n_2 \times w_{256c}, n_{10} \times w_{256c}), (-n_2 \times w_{256c}, n_9 \times w_{256c})\ (-n_2 \times w_{256c}, -n_{16} \times w_{256c}), (-n_2 \times w_{256c}, -n_{15} \times w_{256c}), (-n_2 \times w_{256c}, -n_{14} \times w_{256c}), (-n_2 \times w_{256c}, -n_{13} \times w_{256c}), (-n_2 \times w_{256c}, -n_{12} \times w_{256c}), (-n_2 \times w_{256c}, -n_{11} \times w_{256c}), (-n_2 \times w_{256c}, -n_{10} \times w_{256c}), (-n_2 \times w_{256c}, -n_9 \times w_{256c}),\ (-n_1 \times w_{256c}, n_{16} \times w_{256c}), (-n_1 \times w_{256c}, n_{15} \times w_{256c}), (-n_1 \times w_{256c}, n_{14} \times w_{256c}), (-n_1 \times w_{256c}, n_{13} \times w_{256c}), (-n_1 \times w_{256c}, n_{12} \times w_{256c}), (-n_1 \times w_{256c}, n_{11} \times w_{256c}), (-n_1 \times w_{256c}, n_{10} \times w_{256c}), (-n_1 \times w_{256c}, n_9 \times w_{256c}), (-n_1 \times w_{256c}, -n_{16} \times w_{256c}), (-n_1 \times w_{256c}, -n_{15} \times w_{256c}), (-n_1 \times w_{256c}, -n_{14} \times w_{256c}), (-n_1 \times w_{256c}, -n_{13} \times w_{256c}), (-n_1 \times w_{256c}, -n_{12} \times w_{256c}), (-n_1 \times w_{256c}, -n_{11} \times w_{256c}), (-n_1 \times w_{256c}, -n_{10} \times w_{256c}), (-n_1 \times w_{256c}, -n_9 \times w_{256c})$.

The coordinates in the in-phase I-orthogonal Q plane of the signal point ("○") immediately above the set of b0, b1, b2, b3, b4, b5, b6, and b7 (00000000 to 11111111) serve as in-phase component I and orthogonal component Q of the post-mapping baseband signal. The relationship between the set of b0, b1, b2, b3, b4, b5, b6, and b7 (00000000 to 11111111) in 256QAM and the coordinates of the signal point is not limited to that illustrated in FIG. 11.

The 256 signal points in FIG. 11 are referred to as "signal point 1", "signal point 2", . . . , "signal point 255", and "signal point 256" (because 256 signal points exist, "signal point 1" to "signal point 256" exist). Di is a distance between "signal point i" and an origin in the in-phase I-orthogonal Q plane. $w_{256c}$ is given as follows.

[Mathematical formula 9]

$$w_{256c} = \frac{z}{\sqrt{\frac{\sum_{i=1}^{256} D_i^2}{256}}} \quad \text{(Equation 9)}$$

From (Equation 9), an average power of the post-mapping baseband signal is $z^2$.

Hereinafter, the 256QAM mapping method is referred to as "256QAM mapping method #3".

The mapping method in each modulation scheme is as described above. Detailed usage of the method in the transmission device is described later.

A configuration of the transmission device will be described below.

Figure 12:
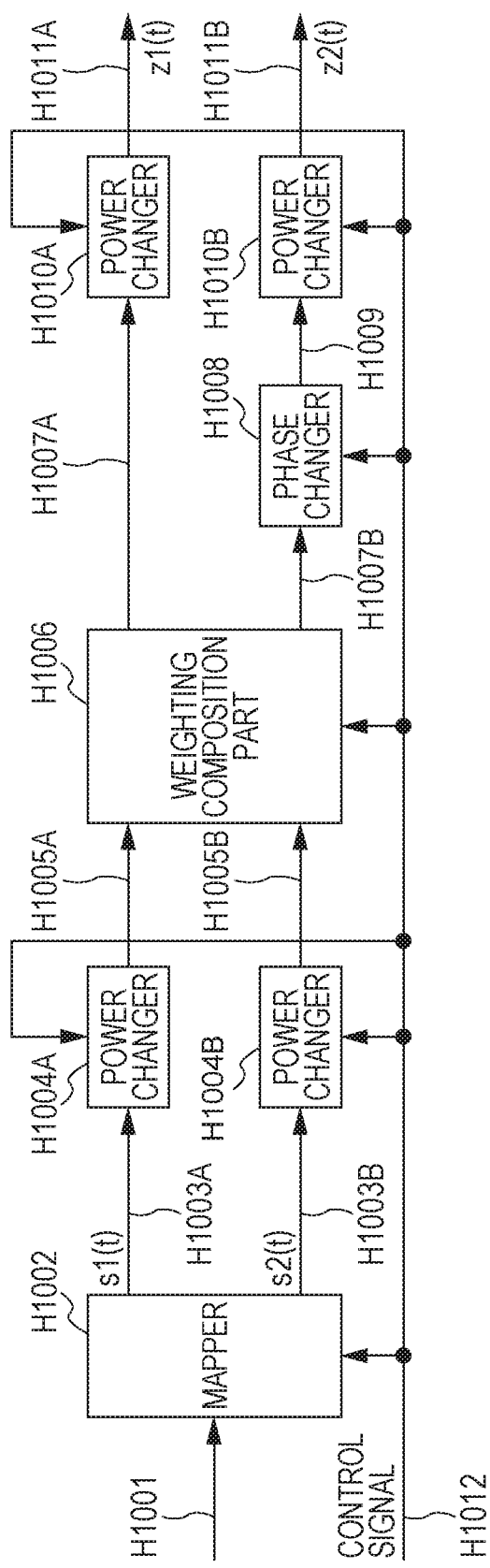
FIG. 12 is a view illustrating a configuration example of signal processing of a transmission device.

Referring to FIG. 12, data H1001 and control signal H1012 are input to mapper H1002. Data H1001 is obtained after the pieces of processing such as error correction coding and interleaving (data rearrangement) are performed on the information. Mapper H1002 sets a modulation scheme of post-mapping signal s1 and a modulation scheme of post-mapping signal s2 based on control signal H1012, performs the mapping on data H1001, and output post-mapping signal s1($t$) (H1003A) and post-mapping signal s2($t$) (H1003B) (signal s1($t$) and signal s2($t$) are complex numbers). Signals s1 and s2 may be a function of frequency f or a function of time t (accordingly, the output may be expressed as signals s1($f$) and s2($f$) or signals s1($t,f$) and s2($t,f$)). In this case, for example, it is assumed that signals s1 and s2 are the function of time t.

Post-mapping signal s1($t$) (H1003A) and control signal H1012 are input to power changer H1004A, and power changer H1004A sets coefficient u (u is a real number but not zero (u≠0)) based on control signal H1012, multiplies post-mapping signal s1($t$) by coefficient u, and outputs post-power-change signal H1005A (x1($t$)=u×s1($t$)) (post-power-change signal H1005A is set to x1($t$)).

Post-mapping signal s2($t$) (H1003B) and control signal H1012 are input to power changer H1004B, and power changer H1004B sets coefficient v (v is a real number but not zero (v≠0)) based on control signal H1012, multiplies post-mapping signal s2($t$) by coefficient v, and outputs post-power-change signal H1005B (x2($t$)=v×s2($t$)) (post-power-change signal H1005B is set to x2($t$)).

Power changer H1004A and power changer H1004B may directly output the post-mapping signal of the input signal without changing power (at this point, u=1.0 and v=1.0 are obtained). In the case that the power change is omitted, power changer H1004A and power changer H1004B may be eliminated from the transmission device in FIG. 12 (the same holds true for FIG. 13).

Post-power-change signal H1005A (x1($t$)), post-power-change signal H1005B (x2($t$)), and control signal H1012 are input to weighting composition part H1006, and weighting composition part H1006 sets 2×2 matrix (pre-coding matrix) W including a complex number as an element based on control signal H1012, multiplies matrix W by post-power-change signal H1005A (x1($t$)) and post-power-change signal H1005B (x2($t$)) (pre-coding), and outputs post-weighting-composition signal z1'($t$) (H1007A) and post-weighting-composition signal z2'($t$) (H1007B).

Matrix (pre-coding matrix) W is given by the following equation.

[Mathematical formula 10]

$$W = \begin{pmatrix} w_{11} & w_{12} \\ w_{21} & w_{22} \end{pmatrix} \quad \text{(Equation 10)}$$

Elements w11, w12, w21, and w22 may be or does not need to be a function of time t. Elements w11, w12, w21, and w22 may be a real number or a complex number.

Post-weighting-composition signal z1'($t$) (H1007A) and post-weighting-composition signal z2'($t$) (H10076) are given by the following equation.

[Mathematical formula 11]

$$\begin{pmatrix} z1'(t) \\ z2'(t) \end{pmatrix} = \begin{pmatrix} w_{11} & w_{12} \\ w_{21} & w_{22} \end{pmatrix} \begin{pmatrix} x1(t) \\ x2(t) \end{pmatrix} \quad \text{(Equation 11)}$$

Post-weighting-composition signal z2'($t$) (H1007B) and control signal H1012 are input to phase changer H1008, and phase changer H1008 sets regularly changing phase change value θ(t) based on control signal H1012, performs a phase change on post-weighting-composition signal z2'($t$) (H1007B), and outputs post-phase-change signal H1009 (z2"($t$)). Accordingly, post-phase-change signal H1009 (z2"($t$)) is given by the following equation.

[Mathematical formula 12]

$$z2''(t) = e^{j\theta(t)} \times z2'(t) \quad \text{(Equation 12)}$$

j is an imaginary unit. Although phase change value θ(t) is dealt with as the function of time t, phase change value θ may be the function of frequency f or the function of frequency f and time t. The phase change is described later.

Post-weighting-composition signal z1'($t$) (H1007A) and control signal H1012 are input to power changer H1010A, and power changer H1010A sets coefficient a (a is a real number but not zero (a≠0)) based on control signal H1012, multiplies post-weighting-composition signal z1'($t$) (H1007A) by coefficient a, and outputs post-power-change signal H1011A (z1($t$)=a×z1'($t$)) (post-power-change signal H1011A is set to z1($t$)).

Post-phase-change signal H1009 (z2"($t$)) and control signal H1012 are input to power changer H1010B, and power changer H1010B sets coefficient b (b is a real number but not zero (b≠0)) based on control signal H1012, multiplies post-phase-change signal H1009 (z2"($t$)) by coefficient b, and outputs post-power-change signal H1011B (z2($t$)=b×z2"($t$)) (post-power-change signal H1011B is set to z2($t$)).

Power changer H1010A and power changer H1010B may directly output the post-mapping signal of the input signal without changing power (at this point, a=1.0 and b=1.0 are obtained). In the case that power change is omitted, power changer H1010A and power changer H1010B may be eliminated from the transmission device in FIG. 12 (the same holds true for FIG. 13).

Therefore, a relationship between signals s1($t$) and s2($t$) and signals z1($t$) and z2($t$) are given as follows.

[Mathematical formula 13]

$$\begin{pmatrix} z1(t) \\ z2(t) \end{pmatrix} = \begin{pmatrix} a & 0 \\ 0 & b \end{pmatrix} \begin{pmatrix} 1 & 0 \\ 0 & e^{j\theta(t)} \end{pmatrix} \begin{pmatrix} w_{11} & w_{12} \\ w_{21} & w_{22} \end{pmatrix} \begin{pmatrix} u & 0 \\ 0 & v \end{pmatrix} \begin{pmatrix} s1(t) \\ s2(t) \end{pmatrix} \quad \text{(Equation 13)}$$

(Equation 14) is equivalent to (Equation 13).

[Mathematical formula 14]

$$\begin{pmatrix} z1(t) \\ z2(t) \end{pmatrix} = \begin{pmatrix} 1 & 0 \\ 0 & e^{j\theta(t)} \end{pmatrix} \begin{pmatrix} a & 0 \\ 0 & b \end{pmatrix} \begin{pmatrix} w_{11} & w_{12} \\ w_{21} & w_{22} \end{pmatrix} \begin{pmatrix} u & 0 \\ 0 & v \end{pmatrix} \begin{pmatrix} s1(t) \\ s2(t) \end{pmatrix} \quad \text{(Equation 14)}$$

Figure 13:
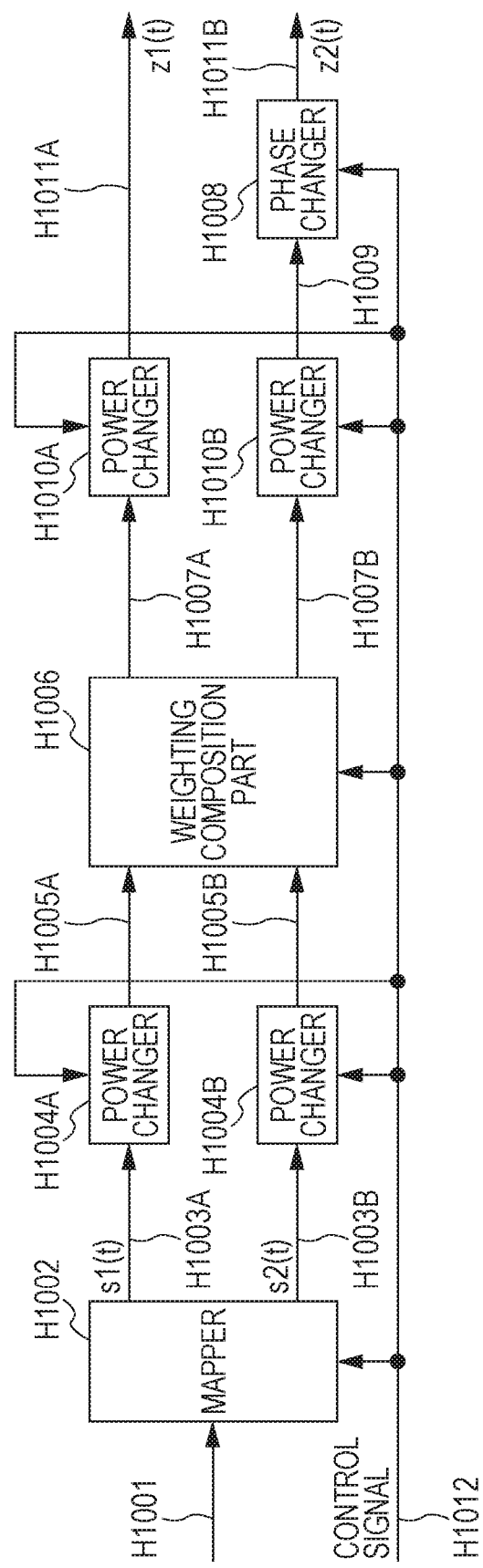
FIG. 13 is a view illustrating another configuration example of the signal processing of the transmission device.

In order to obtain (Equation 14), positions of phase changer H1008 and power changer H1010B are replaced with each other in FIG. 12. FIG. 13 illustrates the configuration after the replacement. The detailed description of the transmission device in FIG. 13 is omitted because the transmission device in FIG. 13 performs (Equation 14) similarly to the transmission device in FIG. 12. In the operation of FIG. 13, "phase changer H1008 performs the phase change on the input signal and outputs the post-phase-change signal" and "power changer H1010B performs the power change on the input signal and outputs the post-power-change signal".

z1(t) and z2(t) are transmitted from different antennas at the same clock time and the same frequency (common frequency).

Although z1(t) and z2(t) are the functions of time t, z1(t) and z2(t) may be the function of frequency f or the function of time t and frequency f (accordingly, the output may be expressed as z1(f) and z2(f) or z1(t,f) and z2(t,f)). In this case, for example, the output is described as the function of time t.

Therefore, z1(t), z2(t), z1'(t), z2'(t), and z2"(t) are also the function of time t. However, z1(t), z2(t), z1'(t), z2'(t), and z2"(t) may be the function of frequency f or the function of time t and frequency f.

Figure 14:
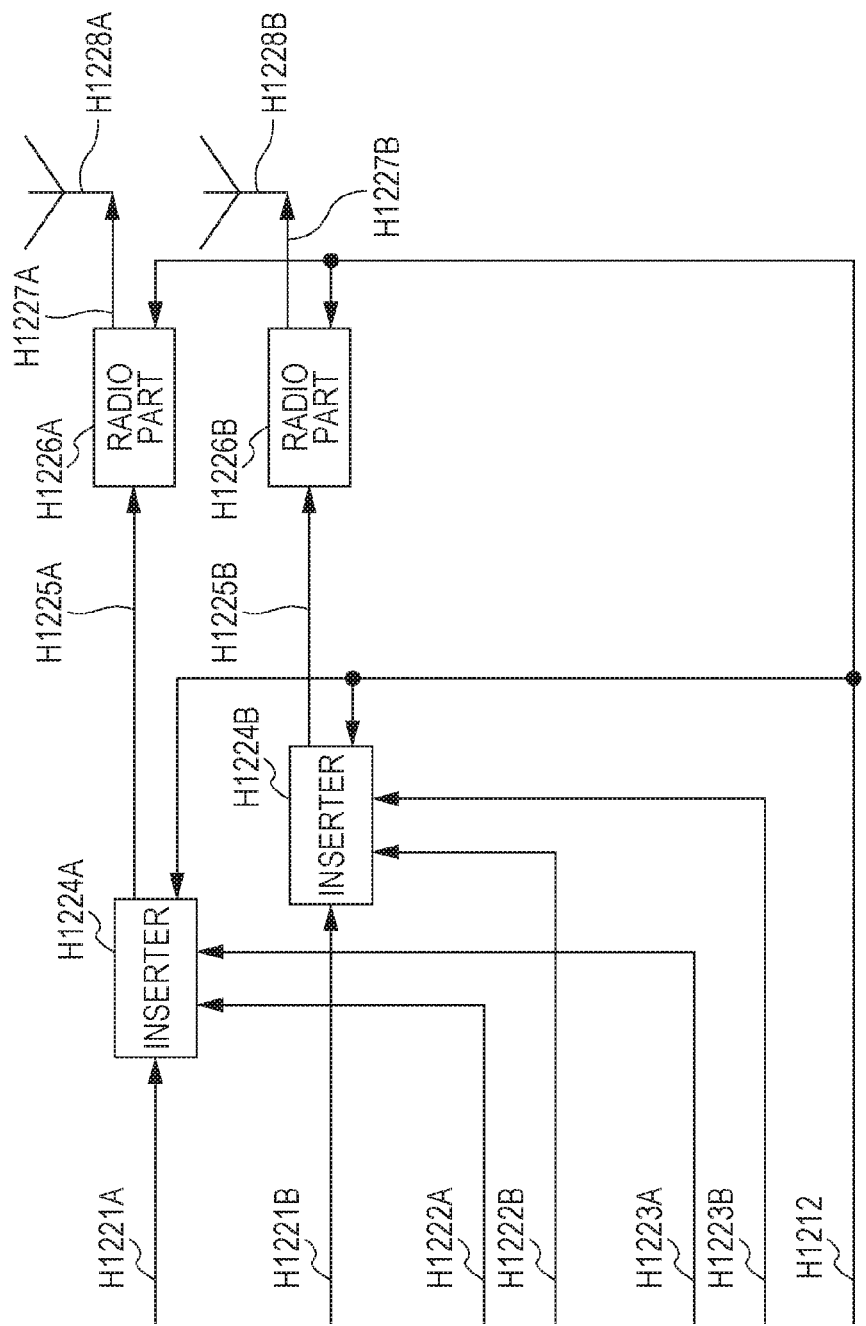
FIG. 14 is a view illustrating a configuration example of signal processing after the signal processing in FIG. 12 or 13.

FIG. 14 illustrates a configuration of signal processing after the signal processing in FIG. 12 or 13 is performed. Modulated signal H1221A, pilot symbol signal H1222A, control information symbol signal H1223A, and control signal H1212 are input to inserter H1224A. Inserter H1224A generates baseband signal H1225A based on a frame configuration using modulated signal H1221A, pilot symbol signal H1222A, and control information symbol signal H1223A based on information about the transmission method and frame configuration included in control signal H1212, and outputs baseband signal H1225A. Modulated signal H1221A corresponds to z1(t) in FIG. 12 or 13.

Similarly, modulated signal H1221B, pilot symbol signal H1222B, control information symbol signal H1223B, and control signal H1212 are input to inserter H1224B. Inserter H1224B generates baseband signal H1225B based on a frame configuration using modulated signal H1221B, pilot symbol signal H1222B, and control information symbol signal H1223B based on information about the transmission method and frame configuration included in control signal H1212, and outputs baseband signal H1225B. Modulated signal H1221B corresponds to z2(t) in FIG. 12 or 13.

Baseband signal H1225A and control signal H1212 are input to radio part H1226A, radio part H1226A generates transmission signal H1226A by performing an inverse Fourier transform or pieces of processing such as an orthogonal modulation, frequency conversion, and amplification based on control signal H1212 when, for example, an OFDM (Orthogonal Frequency Division Multiplexing) scheme is used, and radio part H1226A outputs transmission signal H1226A. Transmission signal H1226A is output from antenna H1228A as a radio wave.

Similarly, baseband signal H1225B and control signal H1212 are input to radio part H1226B, radio part H1226B generates transmission signal H1226B by performing the inverse Fourier transform or the pieces of processing such as the orthogonal modulation, the frequency conversion, and the amplification based on control signal H1212 when, for example, the OFDM scheme is used, and radio part H1226B outputs transmission signal H1226B. Transmission signal H1226B is output from antenna H1228B as a radio wave.

Figure 15:
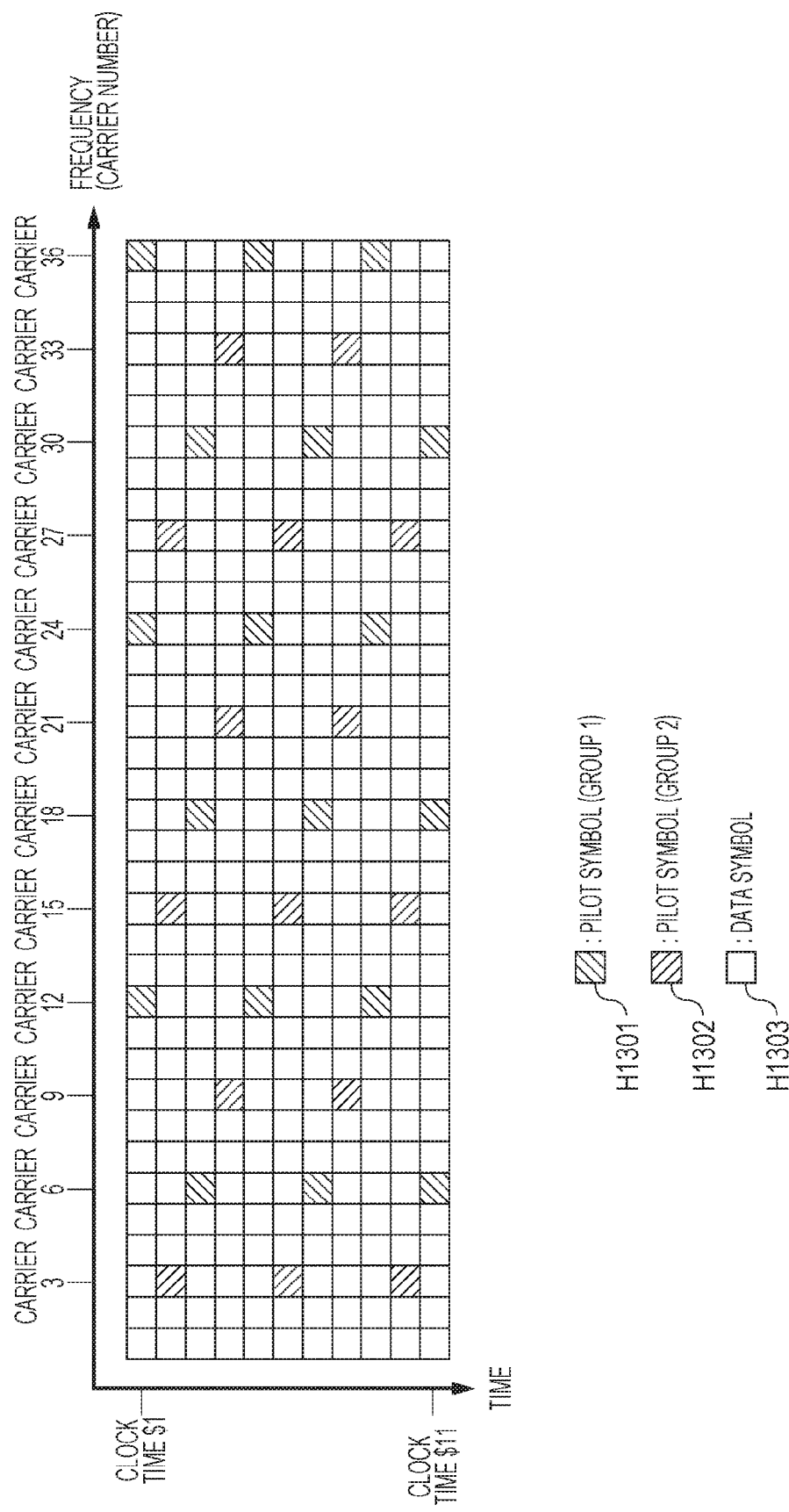
FIG. 15 is a view illustrating an example of a frame configuration in which MIMO is used.

FIG. 15 illustrates an example of a frame configuration of modulated signals which are transmitted through antennas, including z1(t) and z2(t) in FIGS. 12 and 13. In FIG. 15, the horizontal axis indicates the frequency (carrier), and the vertical axis indicates the time. For convenience, the control information symbol is not illustrated in the frame configuration of FIG. 15.

FIG. 15 illustrates the frame configuration of carrier 1 to carrier 36 and clock time $1 to clock time $11. In FIG. 15, H1301 designates a pilot symbol (conforming to a rule of group 1), H1302 designates a pilot symbol (conforming to a rule of group 2), and H1303 designates a data symbol.

Transmission signal H1227A in FIG. 14 has the frame configuration having symbols including the data symbols and pilot symbols as illustrated in FIG. 15, and transmission signal H1227A is transmitted from antenna H1228A. At this point, data symbol H1303 is the symbol corresponding to z1(t), and includes the s1(t) component and the s2(t) component (however, sometimes data symbol H1303 includes only one of the s1(t) component and the s2(t) component depending on the pre-coding matrix).

Transmission signal H1227B in FIG. 14 has the frame configuration having symbols including the data symbols and pilot symbols as illustrated in FIG. 15, and transmission signal H1227B is transmitted from antenna H1228B. At this point, data symbol H1303 is the symbol corresponding to z2(t), and includes the s1(t) component and the s2(t) component (however, sometimes data symbol H1303 includes only one of the s1(t) component and the s2(t) component depending on the pre-coding matrix).

The pilot symbol in the frame configuration of transmission signal H1227A and the pilot symbol in the frame configuration of transmission signal H1227B are not limited to the same configuration (do not necessarily have the same in-phase component and the same orthogonal component), but each of transmission signals H1227A and H1227B may include the pilot symbol conforming to a certain rule.

The frame configuration is not limited to that illustrated in FIG. 15, but may include a control information symbol including information on the transmission method, the modulation scheme, and the error correction method.

The frame configuration may be constructed with the pilot symbol and a null symbol (in-phase component I=0 and orthogonal component Q=0). For example, in the frame configuration, transmission signal H1227B may transmit the null symbol using a carrier in which transmission signal H1227A transmits the pilot symbol at a clock time at which transmission signal H1227A transmits the pilot symbol. In contrast, in the frame configuration, transmission signal H1227A may transmit the null symbol using a carrier in which transmission signal H1227B transmits the pilot symbol at a clock time at which transmission signal H1227B transmits the pilot symbol.

In the frame configuration, the pilot symbol may have another different configuration. It is necessary only to obtain a channel fluctuation of transmission signal H1227A and a channel fluctuation of transmission signal H1227B in the reception device.

Figure 16:
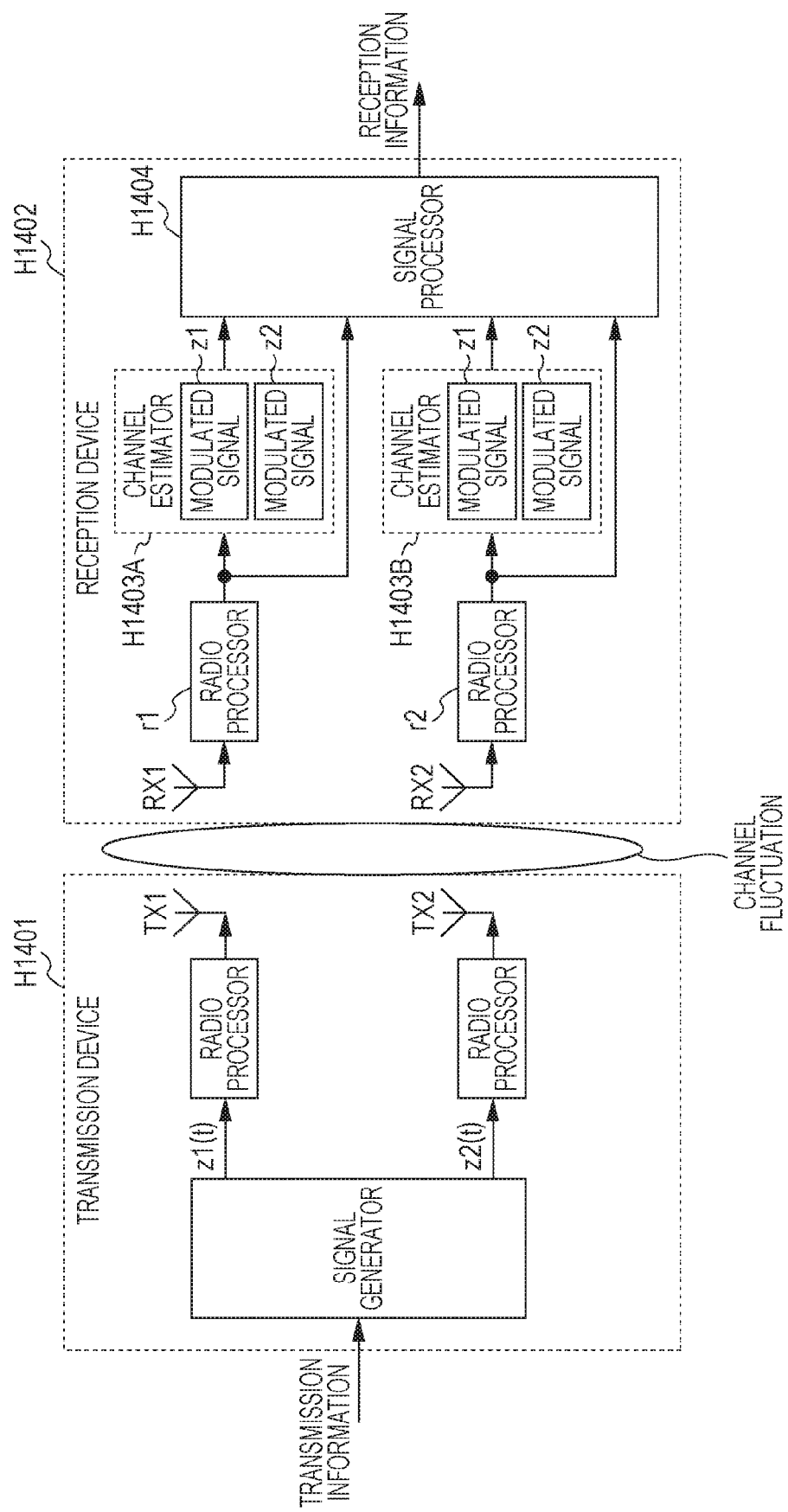
FIG. 16 is a view illustrating a relationship between the transmission device and the reception device.

FIG. 16 illustrates a relationship between the transmission device and the reception device of the exemplary embodiment. The operation of the transmission device is described above. The operation of the reception device will be described below.

FIG. 16 illustrates transmission device H1401 and reception device H1402. In FIG. 16, assuming that r1 is a reception signal of antenna RX1 of the reception device, that r2 is a reception signal of antenna RX2, and that h11, h12, h21, and h22 are a factor of radio wave propagation (channel fluctuation) between the antennas of the transmitter and receiver, the following equation holds.

[Mathematical formula 15]

$$\begin{pmatrix} r1(t) \\ r2(t) \end{pmatrix} = \begin{pmatrix} h_{11}(t) & h_{12}(t) \\ h_{21}(t) & h_{22}(t) \end{pmatrix} \begin{pmatrix} a & 0 \\ 0 & b \end{pmatrix} \begin{pmatrix} 1 & 0 \\ 0 & e^{j\theta(t)} \end{pmatrix}$$
$$\begin{pmatrix} w_{11} & w_{12} \\ w_{21} & w_{22} \end{pmatrix} \begin{pmatrix} u & 0 \\ 0 & v \end{pmatrix} \begin{pmatrix} s1(t) \\ s2(t) \end{pmatrix} + \begin{pmatrix} n1(t) \\ n2(t) \end{pmatrix}$$

(Equation 15)

In (Equation 15), n1 and n2 are noises.

In (Equation 15), each variable is the function of time t. Alternatively, each variable may be the function of frequency f or the function of time t and frequency f (in this case, each variable is the function of time t by way of example).

Channel estimator H1403A in FIG. 16 estimates $h11(t)$ and $h12(t)$ in (Equation 15). Therefore, channel estimator H1403A estimates values of $h11(t)$ and $h12(t)$ in (Equation 15) using, for example, the pilot symbol in FIG. 15. Channel estimator H1403B in FIG. 16 estimates $h21(t)$ and $h22(t)$ in (Equation 15). Therefore, channel estimator H1403B estimates values of $h21(t)$ and $h22(t)$ in (Equation 15) using, for example, the pilot symbol in FIG. 15.

Signal processor H1404 in FIG. 16 obtains a logarithmic likelihood ratio of each bit of the data transmitted by the transmission device using the relationship of (Equation 15). Then, signal processor H1404 performs pieces of processing such as deinterleaving and error correction decoding to obtain reception information.

An example of a way to switch the mapping method, pre-coding matrix, and phase change of s1 and s2 in FIGS. 12 and 13 will be described below.

First, a way to provide phase change value θ(t) in (Equation 12) will be described. In symbol number i (i is an integer of 0 or more), a value that can be taken by phase change value θ(i) is N kinds (N is an integer of 2 or more) of phase values. At this point, the N kinds of phase values are expressed by Phase[k](k is an integer of 0 to N−1 and 0 radian≤Phase[k]<2π radian). All the N kinds of phase values of Phase[k] are used in phase change value θ(i). The following condition holds, which allows the reception device to obtain the high data reception quality.

<Condition #1>

Assuming that x is an integer of 0 to N−1, that y is an integer of 0 to N−1, and that x≠y holds, Phase[x]≠Phase[y] holds in all integers x and y satisfying these assumptions.

Additionally, the following condition may be satisfied.
<Condition #2>

Assuming that x is an integer of 0 to N−3, Phase[x+2]−Phase[x+1]=Phase[x+1]−Phase[x] holds in all integers x satisfying the assumption (however, even if <Condition #2> is not satisfied, there is a possibility that the reception device obtains the high data reception quality).

In the case that symbol number i is an integer of 0 to G (G is an integer of N−1 or more), all the N kinds of phase values of Phase[k](k is an integer of 0 to N−1) are used in phase change value θ(i).

By way of example, phase change value θ(i)=Phase[i mod N] may be defined. mod is modulo, and therefore "i mod N" means a remainder when i is divided by N.

The mapping performed to generate signals s1 and s2 in FIGS. 12 and 13 will be described below.

(Modulation scheme used to generate signal s1(t),modulation scheme used to generate signal s2(t))=(16QAM, 16QAM) will be described below.

"16QAM mapping method #0", "16QAM mapping method #1", "16QAM mapping method #2", and "16QAM mapping method #3" are described above as the 16QAM mapping method.

At this point, in the transmission device, M kinds of 16QAM signal point arrangement methods belonging to one of "16QAM mapping method #0", "16QAM mapping method #1", "16QAM mapping method #2", and "16QAM mapping method #3" are prepared (M is an integer of 2 or more). At this point, mapper H1002 satisfies the following condition.

<Condition #3>

One of <3-1>, <3-2>, <3-3>, and <3-4> is satisfied.

<3-1>

In s1(i), all the M kinds of signal point arrangement methods are adopted.

<3-2>

In s2(i), all the M kinds of signal point arrangement methods are adopted.

<3-3>

All the M kinds of signal point arrangement methods are adopted in s1(i), and all the M kinds of signal point arrangement methods are also adopted in s2(i).

<3-4>

In the case that signal point arrangement method adopted in s1(i) and the signal point arrangement method adopted in s2(i) are combined, the transmission device adopts all the M kinds of signal point arrangement methods.

The following condition holds by expressing the M kinds of 16QAM mapping as "16QAM signal point arrangement $k" (k is an integer of 0 to M−1).

<Condition #4>

In the case that x is an integer of 0 to M−1, that y is an integer of 0 to M−1, and that x≠y holds, the following matter holds in all integers x and y.

{

$(I_{x,i}, Q_{x,i})$ (i is an integer of 0 to 15) represents coordinates of each of the 16 signal points in the in-phase I-orthogonal Q plane of "16QAM signal point arrangement $x", and $(I_{y,j}, Q_{y,j})$ (j is an integer of 0 to 15) represents coordinates of each of the 16 signal points in the in-phase I-orthogonal Q plane of "16QAM signal point arrangement $y". At this point, {in the case that j is an integer of 0 to 15, i satisfying $I_{x,i} \neq I_{y,j}$ exists in all integers j} or {in the case that j is an integer of 0 to 15, i satisfying $Q_{x,i} \neq Q_{y,j}$ exists in all integers j.}

}

In the reception device, a possibility of regularly generating a small state of the minimum Euclid of each of 256 reception candidate signal points (the candidate signal points of 16×16=256 exist because the 16QAM signal is simultaneously received through two lines) in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The following matter holds for "g=h" in 16QAM signal point arrangement $g and 16QAM signal point arrangement $h.

{

$(I_{g,i}, Q_{g,i})$ (i is an integer of 0 to 15) represents coordinates of each of the 16 signal points in the in-phase I-orthogonal Q plane of "16QAM signal point arrangement $g", and $(I_{h,j}, Q_{h,j})$ (j is an integer of 0 to 15) represents coordinates of each of the 16 signal points in the in-phase I-orthogonal Q plane of "16QAM signal point arrangement $h". At this point, {in the case that that k is an integer of 0 to 15, the case that $I_{g,k}=I_{h,k}$ and $Q_{g,k}=Q_{h,k}$ hold exists in all integers k.}
}

Similarly, for "g≠h", the following matter is satisfied.
{
$(I_{g,i},Q_{g,i})$ (i is an integer of 0 to 15) represents coordinates of each of the 16 signal points in the in-phase I-orthogonal Q plane of "16QAM signal point arrangement $g", and $(I_{h,j}, Q_{h,j})$ (j is an integer of 0 to 15) represents coordinates of each of the 16 signal points in the in-phase I-orthogonal Q plane of "16QAM signal point arrangement $h". At this point,
{in the case that that k is an integer of 0 to 15, the case that $I_{g,k}=I_{h,k}$ and $Q_{g,k}=Q_{h,k}$ hold does not exist in integers k.}
}

At this point, the mapping set is defined.

The mapping set is defined as "(s1(t) 16QAM signal point arrangement $p_1$, s2(t) 16QAM signal point arrangement $p_2$)".

At this point, the following matter holds in the same mapping set.

"When the first mapping set is (s1(t) 16QAM signal point arrangement $p_1$, s2(t) 16QAM signal point arrangement $p_2$) while the second mapping set is (s1(t) 16QAM signal point arrangement $q_1$, s2(t) 16QAM signal point arrangement $q_2$), $p_1=q_1$ and $p_2=q_2$ hold in the case that the first mapping set is identical to the second mapping set."

The following matter holds in the different mapping set.

"When the first mapping set is (s1(t) 16QAM signal point arrangement $p_1$, s2(t) 16QAM signal point arrangement $p_2$) while the second mapping set is (s1(t) 16QAM signal point arrangement $q_1$, s2(t) 16QAM signal point arrangement $q_2$), $p_1 \neq q_1$ or $p_2 \neq q_2$ holds in the case that the first mapping set is different from the second mapping set."

At this point, the transmission device (the mapper in FIGS. 12 and 13) prepares L (L is an integer of 2 or more) kinds of mapping sets, and sets the L kinds of mapping sets to "mapping set *k" (k is an integer of 0 to L−1). At this point, the L kinds of mapping sets satisfy the following condition.

<Condition #5>

In the case that x is an integer of 0 to L−1, that y is an integer of 0 to L−1, and that x*y holds, "mapping set *x" differs from "mapping set *y" in all integers x and y.

The following condition is provided.

<Condition #6>

In the case that x is an integer of 0 to L−1, the following matter is satisfied in all integers x.

{The phase changer (subsequent to the weighting composition part) in FIG. 12 or 13 (or FIG. 18, 19, 20, or 21) performs the phase change on the signal generated using signals s1 and s2 generated using "mapping set *x". At this point, all the N kinds of phase values of Phase[k] are used as phase change value θ.}

An example of <Condition #6> will be described below. Phase[0] and Phase[1] exist because N=2 kinds of phase values exist as the phase change value. L=3 kinds of mapping sets exist. Accordingly, "mapping set *0", "mapping set *1", and "mapping set *2" exist. At this point, FIG. 17 illustrates the state in which <Condition #6> is satisfied.

In FIG. 17, the horizontal axis indicates time number (slot number) i.

First, attention is paid to "mapping set *0". In time number 0, the mapper H1002 in FIG. 12 or 13 performs the mapping using "mapping set *0", and the phase changer performs the phase change using Phase[0].

In time number 1, the mapper in FIG. 12 or 13 performs the mapping using "mapping set *0", and the phase changer performs the phase change using Phase[1].

Accordingly, for "mapping set *0", the phase changer H1002 in FIG. 12 or 13 uses all the N=2 kinds of phase values of Phase[k].

Attention is paid to "mapping set *1". In time number 2, the mapper H1002 in FIG. 12 or 13 performs the mapping using "mapping set *1", and the phase changer performs the phase change using Phase[0].

In time number 3, the mapper in FIG. 12 or 13 performs the mapping using "mapping set *1", and the phase changer performs the phase change using Phase[1].

Accordingly, for "mapping set *1", the phase changer in FIG. 12 or 13 uses all the N=2 kinds of phase values of Phase[k].

Attention is paid to "mapping set *2". In time number 4, the mapper in FIG. 12 or 13 performs the mapping using "mapping set *2", and the phase changer performs the phase change using Phase[0].

In time number 5, the mapper H1002 in FIG. 12 or 13 performs the mapping using "mapping set *2", and the phase changer performs the phase change using Phase[1].

Accordingly, for "mapping set *2", the phase changer in FIG. 12 or 13 uses all the N=2 kinds of phase values of Phase[k].

Therefore, FIG. 17 satisfies <Condition #6>. Therefore, in the reception device, a possibility of regularly generating a small state of the minimum Euclid of each of 256 reception candidate signal points (the candidate signal points of 16×16=256 exist because the 16QAM signal is simultaneously received through two lines) in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The reception device has a possibility of obtaining the similar advantage even if the following condition is satisfied instead of <Condition #6>.

<Condition #7>

In the case that x is an integer of 0 to L−1, x satisfying the following matter exists.

{The phase changer (subsequent to the weighting composition part) in FIG. 12 or 13 (or FIG. 18, 19, 20, or 21) performs the phase change on the signal generated using signals s1 and s2 generated using "mapping set *x". All the N kinds of phase values of Phase[k] are used as phase change value θ.}

(Modulation scheme used to generate signal s1(t), modulation scheme used to generate signal s2(t))=(64QAM, 64QAM) in the mapping of signals s1 and s2 in FIGS. 12 and 13 will be described below.

"64QAM mapping method #0", "64QAM mapping method #1", "64QAM mapping method #2", and "64QAM mapping method #3" are described above as the 64QAM mapping method.

At this point, in the transmission device, M kinds of 64QAM signal point arrangement methods belonging to one of "64QAM mapping method #0", "64QAM mapping method #1", "64QAM mapping method #2", and "64QAM mapping method #3" are prepared (M is an integer of 2 or more). At this point, the 64QAM mapping method satisfies the following condition.

<Condition #8>

One of <8-1>, <8-2>, <8-3>, and <8-4> is satisfied.

<8-1>

In s1($i$), all the M kinds of signal point arrangement methods are adopted.

<8-2>

In s2($i$), all the M kinds of signal point arrangement methods are adopted.

<8-3>

All the M kinds of signal point arrangement methods are adopted in s1($i$), and all the M kinds of signal point arrangement methods are also adopted in s2($i$).

<8-4>

In the case that signal point arrangement method adopted in s1($i$) and the signal point arrangement method adopted in s2($i$) are combined, all the M kinds of signal point arrangement methods are adopted.

The following condition holds by expressing the M kinds of 64QAM mapping as "64QAM signal point arrangement $k" (k is an integer of 0 to M−1).

<Condition #9>

In the case that x is an integer of 0 to M−1, that y is an integer of 0 to M−1, and that x≠y holds, the following matter holds in all integers x and y.

{
($I_{x,i}$, $Q_{x,i}$) (i is an integer of 0 to 63) represents coordinates of each of the 64 signal points in the in-phase I-orthogonal Q plane of "64QAM signal point arrangement $x", and ($I_{y,j}$, $Q_{y,j}$) (j is an integer of 0 to 63) represents coordinates of each of the 64 signal points in the in-phase I-orthogonal Q plane of "64QAM signal point arrangement $y". At this point, {in the case that j is an integer of 0 to 63, i satisfying $I_{x,i} \neq I_{y,j}$ exists in all integers j} or {in the case that j is an integer of 0 to 63, i satisfying $Q_{x,i} \neq Q_{y,j}$ exists in all integers j.}
}

Therefore, in the reception device, a possibility of regularly generating a small state of the minimum Euclid of each of 4096 reception candidate signal points (the candidate signal points of 64×64=4096 exist because the 64QAM signal is simultaneously received through two lines) in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The following matter holds for "g=h" in 64QAM signal point arrangement $g and 64QAM signal point arrangement $h.

{
($I_{g,i}$, $Q_{g,i}$) (i is an integer of 0 to 63) represents coordinates of each of the 64 signal points in the in-phase I-orthogonal Q plane of "64QAM signal point arrangement $g", and ($I_{h,j}$, $Q_{h,j}$) (j is an integer of 0 to 63) represents coordinates of each of the 64 signal points in the in-phase I-orthogonal Q plane of "64QAM signal point arrangement $h". At this point, {in the case that that k is an integer of 0 to 63, the case that $I_{g,k} = I_{h,k}$ and $Q_{g,k} = Q_{h,k}$ hold exists in all integers k.}
}

Similarly, for "g≠h", the following matter is satisfied.

{
($I_{g,i}$, $Q_{g,i}$) (i is an integer of 0 to 63) represents coordinates of each of the 64 signal points in the in-phase I-orthogonal Q plane of "64QAM signal point arrangement $g", and ($I_{h,j}$, $Q_{h,j}$) (j is an integer of 0 to 63) represents coordinates of each of the 64 signal points in the in-phase I-orthogonal Q plane of "64QAM signal point arrangement $h". At this point, {in the case that that k is an integer of 0 to 63, the case that $I_{g,k} = I_{h,k}$ and $Q_{g,k} = Q_{h,k}$ hold does not exist in integers k.}
}

At this point, the mapping set is defined.

The mapping set is defined as "(s1($t$) 64QAM signal point arrangement $p_1$, s2($t$) 64QAM signal point arrangement $p_2$)".

At this point, the following matter holds in the same mapping set.

"When the first mapping set is (s1($t$) 64QAM signal point arrangement $p_1$, s2($t$) 64QAM signal point arrangement $p_2$) while the second mapping set is (s1($t$) 64QAM signal point arrangement $q_1$, s2($t$) 64QAM signal point arrangement $q_2$), $p_1 = q_1$ and $p_2 = q_2$ hold in the case that the first mapping set is identical to the second mapping set."

The following matter holds in the different mapping set.

"When the first mapping set is (s1($t$) 64QAM signal point arrangement $p_1$, s2($t$) 64QAM signal point arrangement $p_2$) while the second mapping set is (s1($t$) 64QAM signal point arrangement $q_1$, s2($t$) 64QAM signal point arrangement $q_2$), $p_1 \neq q_1$ or $p_2 \neq q_2$ holds in the case that the first mapping set is different from the second mapping set."

At this point, the transmission device (the mapper in FIGS. 12 and 13) prepares L (L is an integer of 2 or more) kinds of mapping sets, and sets the L kinds of mapping sets to "mapping set *k" (k is an integer of 0 to L−1). At this point, the L kinds of mapping sets satisfy the following condition.

<Condition #10>

In the case that x is an integer of 0 to L−1, that y is an integer of 0 to L−1, and that x≠y holds, "mapping set *x" differs from "mapping set *y" in all integers x and y.

The following condition is provided.

<Condition #11>

In the case that x is an integer of 0 to L−1, the following matter is satisfied in all integers x.

{The phase changer (subsequent to the weighting composition part) in FIG. 12 or 13 (or FIG. 18, 19, 20, or 21) performs the phase change on the signal generated using s1 and s2 generated using "mapping set *x". At this point, all the N kinds of phase values of Phase[k] are used as phase change value θ.}

An example of <Condition #11> will be described below. Phase[0] and Phase[1] exist because N=2 kinds of phase values exist as the phase change value. "Mapping set *0", "mapping set *1", and "mapping set *2" exist because L=3 kinds of mapping sets exist. At this point, FIG. 17 illustrates the state in which <Condition #11> is satisfied.

In FIG. 17, the horizontal axis indicates time number (slot number) i.

First, attention is paid to "mapping set *0". In time number 0, the mapper in FIG. 12 or 13 performs the mapping using "mapping set *0", and the phase changer performs the phase change using Phase[0].

In time number 1, the mapper in FIG. 12 or 13 performs the mapping using "mapping set *0", and the phase changer performs the phase change using Phase[1].

Accordingly, for "mapping set *0", the phase changer in FIG. 12 or 13 uses all the N=2 kinds of phase values of Phase[k].

Attention is paid to "mapping set *1". In time number 2, the mapper in FIG. 12 or 13 performs the mapping using "mapping set *1", and the phase changer performs the phase change using Phase[0].

In time number 3, the mapper in FIG. 12 or 13 performs the mapping using "mapping set 1", and the phase changer performs the phase change using Phase[1].

Accordingly, for "mapping set *1", the phase changer in FIG. 12 or 13 uses all the N=2 kinds of phase values of Phase[k].

Attention is paid to "mapping set *2". In time number 4, the mapper in FIG. 12 or 13 performs the mapping using "mapping set *2", and the phase changer performs the phase change using Phase[0].

In time number 5, the mapper in FIG. 12 or 13 performs the mapping using "mapping set *2", and the phase changer performs the phase change using Phase[1].

Accordingly, for "mapping set *2", the phase changer in FIG. 12 or 13 uses all the N=2 kinds of phase values of Phase[k].

Therefore, FIG. 17 satisfies <Condition #11>. In the reception device, a possibility of regularly generating a small state of the minimum Euclid of each of 4096 reception candidate signal points (the candidate signal points of 64×64=4096 exist because the 64QAM signal is simultaneously received through two lines) in the in-phase I-orthogonal Q plane can be lowered by satisfying these conditions (for example, in the case that the direct wave is dominant in the radio wave propagation environment).

Therefore, the reception device has a high possibility of obtaining the high data reception quality.

The reception device has a possibility of obtaining the similar advantage even if the following condition is satisfied instead of <Condition #11>.

<Condition #12>

In the case that x is an integer of 0 to L−1, x satisfying the following matter exists.

{The phase changer (subsequent to the weighting composition part) in FIG. 12 or 13 (or FIG. 18, 19, 20, or 21) performs the phase change on the signal generated using s1 and s2 generated using "mapping set *x". At this point, all the N kinds of phase values of Phase[k] are used as phase change value θ.}

(s1($t$) modulation scheme,s2($t$) modulation scheme)= (256QAM,256QAM) in the mapping of s1 and s2 in FIGS. 12 and 13 will be described below.

"256QAM mapping method #0", "256QAM mapping method #1", "256QAM mapping method #2", and "256QAM mapping method #3" are described above as the 256QAM mapping method.

At this point, M kinds of 256QAM signal point arrangement methods belonging to one of "256QAM mapping method #0", "256QAM mapping method #1", "256QAM mapping method #2", and "256QAM mapping method #3" are prepared (M is an integer of 2 or more) (in the transmission device). At this point, the 256QAM mapping method satisfies the following condition.

<Condition #13>

One of <13-1>, <13-2>, <13-3>, and <13-4> is satisfied.

<13-1>

In s1($i$), all the M kinds of signal point arrangement methods are adopted.

<13-2>

In s2($i$), all the M kinds of signal point arrangement methods are adopted.

<13-3>

All the M kinds of signal point arrangement methods are adopted in s1($i$), and all the M kinds of signal point arrangement methods are also adopted in s2($i$).

<13-4>

In the case that signal point arrangement method adopted in s1($i$) and the signal point arrangement method adopted in s2($i$) are combined, all the M kinds of signal point arrangement methods are adopted.

The following condition holds by expressing the M kinds of 256QAM mapping as "256QAM signal point arrangement $k" (k is an integer of 0 to M−1).

<Condition #14>

In the case that x is an integer of 0 to M−1, that y is an integer of 0 to M−1, and that x≠y holds, the following matter holds in all integers x and y.

{

$(I_{x,i}, Q_{x,i})$ (i is an integer of 0 to 255) represents coordinates of each of the 256 signal points in the in-phase I-orthogonal Q plane of "256QAM signal point arrangement $x", and $(I_{y,j}, Q_{y,j})$ (j is an integer of 0 to 255) represents coordinates of each of the 256 signal points in the in-phase I-orthogonal Q plane of "256QAM signal point arrangement $y". At this point, {in the case that j is an integer of 0 to 255, i satisfying $I_{x,i} \neq I_{y,j}$ exists in all integers j} or {in the case that j is an integer of 0 to 255, i satisfying $Q_{x,i} \neq Q_{y,j}$ exists in all integers j.}

}

Therefore, in the reception device, a possibility of regularly generating a small state of the minimum Euclid of each of 65536 reception candidate signal points (the candidate signal points of 256×256=65536 exist because the 256QAM signal is simultaneously received through two lines) in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The following matter holds for "g=h" in 256QAM signal point arrangement $g and 256QAM signal point arrangement $h.

{

$(I_{g,i}, Q_{g,i})$ (i is an integer of 0 to 255) represents coordinates of each of the 256 signal points in the in-phase I-orthogonal Q plane of "256QAM signal point arrangement $g", and $(I_{h,j}, Q_{h,j})$ (j is an integer of 0 to 255) represents coordinates of each of the 256 signal points in the in-phase I-orthogonal Q plane of "256QAM signal point arrangement $h". At this point, {in the case that that k is an integer of 0 to 255, the case that $I_{g,k}=I_{h,k}$ and $Q_{g,k}=Q_{h,k}$ hold exists in all integers k.}

}

Similarly, for "g≠h", the following matter is satisfied.

{

$(I_{g,i}, Q_{g,i})$ (i is an integer of 0 to 255) represents coordinates of each of the 256 signal points in the in-phase I-orthogonal Q plane of "256QAM signal point arrangement $g", and $(I_{h,j}, Q_{h,j})$ (j is an integer of 0 to 255) represents coordinates of each of the 256 signal points in the in-phase I-orthogonal Q plane of "256QAM signal point arrangement $h". At this point, {in the case that that k is an integer of 0 to 255, the case that $I_{g,k}=I_{h,k}$ and $Q_{g,k}=Q_{h,k}$ hold does not exist in integers k.}

}

At this point, the mapping set is defined.

The mapping set is defined as "(s1($t$) 256QAM signal point arrangement $p_1$,s2($t$) 256QAM signal point arrangement $p_2$)".

At this point, the following matter holds in the same mapping set.

"When the first mapping set is (s1(t) 256QAM signal point arrangement $\$p_1$, s2(t) 256QAM signal point arrangement $\$p_2$) while the second mapping set is (s1(t) 256QAM signal point arrangement $\$q_1$, s2(t) 256QAM signal point arrangement $\$q_2$), $p_1=q_1$ and $p_2=q_2$ hold in the case that the first mapping set is identical to the second mapping set."

The following matter holds in the different mapping set.

"When the first mapping set is (s1(t) 256QAM signal point arrangement $\$p_1$, s2(t) 256QAM signal point arrangement $\$p_2$) while the second mapping set is (s1(t) 256QAM signal point arrangement $\$q_1$, s2(t) 256QAM signal point arrangement $\$q_2$), $p_1 \neq q_1$ or $p_2 \neq q_2$ holds in the case that the first mapping set is different from the second mapping set."

At this point, the transmission device (the mapper in FIGS. 12 and 13) prepares L (L is an integer of 2 or more) kinds of mapping sets, and sets the L kinds of mapping sets to "mapping set *k" (k is an integer of 0 to L−1). At this point, the L kinds of mapping sets satisfy the following condition.

<Condition #15>

In the case that x is an integer of 0 to L−1, that y is an integer of 0 to L−1, and that x≠y holds, "mapping set *x" differs from "mapping set *y" in all integers x and y.

The following condition is provided.

<Condition #16>

In the case that x is an integer of 0 to L−1, the following matter is satisfied in all integers x.

{The phase changer (subsequent to the weighting composition part) in FIG. 12 or 13 (or FIG. 18, 19, 20, or 21) performs the phase change on the signal generated using signals s1 and s2 generated using "mapping set *x". At this point, all the N kinds of phase values of Phase[k] are used as phase change value θ.}

An example of <Condition #16> will be described below. Because N=2 kinds of phase values exist as the phase change value, Phase[0] and Phase[1] exist, and L=3 kinds of mapping sets exist. Accordingly, "mapping set *0", "mapping set *1", and "mapping set *2" exist. At this point, FIG. 17 illustrates the state in which <Condition #16> is satisfied.

In FIG. 17, the horizontal axis indicates time number (slot number) i.

At this point, attention is paid to "mapping set *0". In time number 0, the mapper in FIG. 12 or 13 performs the mapping using "mapping set *0", and the phase changer performs the phase change using Phase[0].

In time number 1, the mapper in FIG. 12 or 13 performs the mapping using "mapping set *0", and the phase changer performs the phase change using Phase[1].

Accordingly, for "mapping set *0", the phase changer in FIG. 12 or 13 uses all the N=2 kinds of phase values of Phase[k].

Attention is paid to "mapping set *1". In time number 2, the mapper in FIG. 12 or 13 performs the mapping using "mapping set *1", and the phase changer performs the phase change using Phase[0].

In time number 3, the mapper in FIG. 12 or 13 performs the mapping using "mapping set *1", and the phase changer performs the phase change using Phase[1].

Accordingly, for "mapping set *1", the phase changer in FIG. 12 or 13 uses all the N=2 kinds of phase values of Phase[k].

Attention is paid to "mapping set *2". In time number 4, the mapper in FIG. 12 or 13 performs the mapping using "mapping set *2", and the phase changer performs the phase change using Phase[0].

In time number 5, the mapper in FIG. 12 or 13 performs the mapping using "mapping set *2", and the phase changer performs the phase change using Phase[1].

Accordingly, for "mapping set *2", the phase changer in FIG. 12 or 13 uses all the N=2 kinds of phase values of Phase[k].

Therefore, FIG. 17 satisfies <Condition #16>. Therefore, in the reception device, a possibility of regularly generating a small state of the minimum Euclid of each of 65536 reception candidate signal points (the candidate signal points of 256×256=65536 exist because the 256QAM signal is simultaneously received through two lines) in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The reception device can obtain the similar advantage even if the following condition is satisfied instead of <Condition #16>.

<Condition #17>

In the case that x is an integer of 0 to L−1, x satisfying the following matter exists.

{The phase changer (subsequent to the weighting composition part) in FIG. 12 or 13 (or FIG. 18, 19, 20, or 21) performs the phase change on the signal generated using signals s1 and s2 generated using "mapping set *x". At this point, all the N kinds of phase values of Phase[k] are used as phase change value θ.}

The transmission device that transmits the modulated signal, which is generated through the configuration in FIG. 14 using z1(t) and z2(t) generated in FIG. 12 or 13, is described above. Alternatively, the transmission device may transmit the modulated signal that is generated through the configuration in FIG. 14 using z1(t) and z2(t) generated in FIG. 18, 19, 20, or 21 instead of FIG. 12 or 13. Configurations in FIGS. 18, 19, 20, and 21 will be described below.

Figure 18:
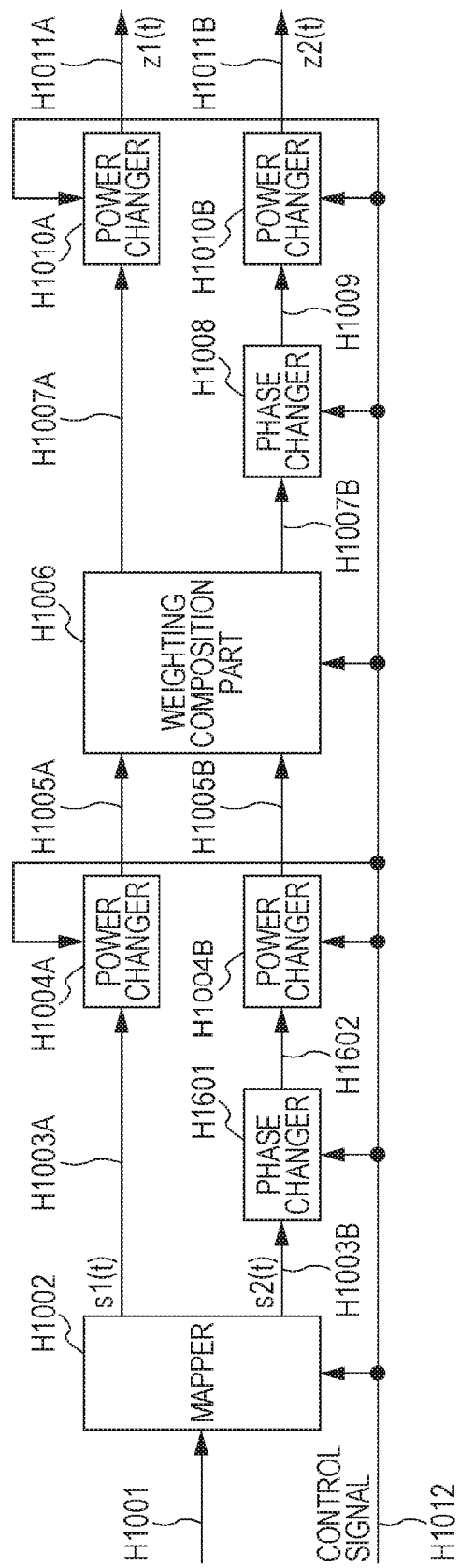
FIG. 18 is a view illustrating another configuration example of the signal processing after the signal processing in FIG. 12 or 13.

First, the configuration in FIG. 18 will be described. In FIG. 18, the component operated similarly to that in FIG. 12 is designated by the same reference mark.

Referring to FIG. 18, data H1001 obtained by performing pieces of processing such as error correction coding and interleaving (data rearrangement) and control signal H1012 are input to mapper H1002, and mapper H1002 sets a modulation scheme used to generate signal s1 and a modulation scheme used to generate signal s2 based on control signal H1012, performs the mapping in order to generate signals s1 and s2, and outputs post-mapping signal s1(t) (H1003A) and post-mapping signal s2(t) (H1003B) (s1(t) and s2(t) are complex numbers). Signals s1 and s2 may be a function of frequency f or a function of time t and frequency f (accordingly, the output may be expressed as s1(f) and s2(f) or s1($t,f$) and s2($t,f$)). In this case, it is assumed that signals s1 and s2 are the function of time t.

Post-mapping signal s2(t) (H1003B) and control signal H1012 are input to phase changer H1601, and phase changer H1601 sets regularly changing phase change value λ(t) based on control signal H1012, performs the phase change on post-mapping signal s2(t) (H1003B), and outputs post-phase-change signal H1602 (s2'(t)). Accordingly, post-phase-change signal H1602 (s2'(t)) is given by the following equation.

[Mathematical formula 16]

$$s2'(t) = e^{j\lambda(t)} \times s2(t) \quad \text{(Equation 16)}$$

j is an imaginary unit. Although phase change value θ(t) is dealt with as the function of time t, phase change value θ may be the function of frequency f or the function of frequency f and time t. The phase change is described later.

Post-mapping signal s1(t) (H1003A) and control signal H1012 are input to power changer H1004A, and power changer H1004A sets coefficient u (u is a real number but not zero (u≠0)) based on control signal H1012, multiplies post-mapping signal s1(t) by coefficient u, and outputs post-power-change signal H1005A (x1(t)=u×s1(t)) (post-power-change signal H1005A is set to x1(t)).

Post-phase-change signal H1602 (s2'(t)) and control signal H1012 are input to power changer H1004B, and power changer H1004B sets coefficient v (v is a real number but not zero (v≠0)) based on control signal H1012, multiplies post-phase-change signal H1602 (s2'(t)) by coefficient v, and outputs post-power-change signal H1005B (x2(t)=v×s2'(t)) (post-power-change signal H1005B is set to x2(t)).

Power changer H1004A and power changer H1004B may output the post-mapping signal of the input signal without changing power (at this point, u=1.0 and v=1.0 are obtained). Therefore, in the transmission device of FIG. 18, power changer H1004A and power changer H1004B may be eliminated (the same holds true for FIGS. 19, 20, and 21).

Post-power-change signal H1005A (x1(t)), post-power-change signal H1005B (x2(t)), and control signal H1012 are input to weighting composition part H1006, and weighting composition part H1006 sets 2×2 matrix (pre-coding matrix) W including a complex number as an element based on control signal H1012, multiplies matrix W by post-power-change signal H1005A (x1(t)) and post-power-change signal H1005B (x2(t)) (pre-coding), and outputs post-weighting-composition signal z1'(t) (H1007A) and post-weighting-composition signal z2'(t) (H1007B).

Matrix (pre-coding matrix) W is given by the following equation.

[Mathematical formula 17]

$$W = \begin{pmatrix} w_{11} & w_{12} \\ w_{21} & w_{22} \end{pmatrix} \quad \text{(Equation 17)}$$

w11, w12, w21, and w22 may be or does not need to be a function of time t. w11, w12, w21, and w22 may be a real number or a complex number.

Post-weighting-composition signal z1'(t) (H1007A) and post-weighting-composition signal z2'(t) (H1007B) are given by the following equation.

[Mathematical formula 18]

$$\begin{pmatrix} z1'(t) \\ z2'(t) \end{pmatrix} = \begin{pmatrix} w_{11} & w_{12} \\ w_{21} & w_{22} \end{pmatrix} \begin{pmatrix} x1(t) \\ x2(t) \end{pmatrix} \quad \text{(Equation 18)}$$

Post-weighting-composition signal z2'(t) (H1007B) and control signal H1012 are input to phase changer H1008, and phase changer H1008 sets regularly changing phase change value θ(t) based on control signal H1012, performs a phase change on post-weighting-composition signal z2'(t) (H1007B), and outputs post-phase-change signal H1009 (z2''(t)). Accordingly, post-phase-change signal H1009 (z2''(t)) is given by the following equation.

[Mathematical formula 19]

$$z2''(t) = e^{j\theta(t)} \times z2'(t) \quad \text{(Equation 19)}$$

j is an imaginary unit. Although phase change value θ(t) is dealt with as the function of time t, phase change value θ may be the function of frequency f or the function of frequency f and time t. The phase change is described later.

Post-weighting-composition signal z1'(t) (H1007A) and control signal H1012 are input to power changer H1010A, and power changer H1010A sets coefficient a (a is a real number but not zero (a≠0)) based on control signal H1012, multiplies post-weighting-composition signal z1'(t) (H1007A) by coefficient a, and outputs post-power-change signal H1011A (z1(t)=a×z1'(t)) (post-power-change signal H1011A is set to z1(t)).

Post-phase-change signal H1009 (z2''(t)) and control signal H1012 are input to power changer H1010B, and power changer H1010B sets coefficient b (b is a real number but not zero (b≠0)) based on control signal H1012, multiplies post-phase-change signal H1009 (z2''(t)) by coefficient b, and outputs post-power-change signal H1011B (z2(t)=b×z2''(t)) (post-power-change signal H1011B is set to z2(t)).

Power changer H1010A and power changer H1010B may output the post-mapping signal of the input signal without changing power (at this point, a=1.0 and b=1.0 are obtained). In the transmission device of FIG. 18, power changer H1010A and power changer H1010B may be eliminated (the same holds true for FIGS. 19, 20, and 21).

Therefore, a relationship between s1(t) and s2(t) and z1(t) and z2(t) are given as follows.

[Mathematical formula 20]

$$\begin{pmatrix} z1(t) \\ z2(t) \end{pmatrix} = \quad \text{(Equation 20)}$$

$$\begin{pmatrix} a & 0 \\ 0 & b \end{pmatrix} \begin{pmatrix} 1 & 0 \\ 0 & e^{j\theta(t)} \end{pmatrix} \begin{pmatrix} w_{11} & w_{12} \\ w_{21} & w_{22} \end{pmatrix} \begin{pmatrix} u & 0 \\ 0 & v \end{pmatrix} \begin{pmatrix} 1 & 0 \\ 0 & e^{j\lambda(t)} \end{pmatrix} \begin{pmatrix} s1(t) \\ s2(t) \end{pmatrix}$$

(Equation 20) is equivalent to (Equation 21).

[Mathematical formula 21]

$$\begin{pmatrix} z1(t) \\ z2(t) \end{pmatrix} = \quad \text{(Equation 21)}$$

$$\begin{pmatrix} a & 0 \\ 0 & b \end{pmatrix} \begin{pmatrix} 1 & 0 \\ 0 & e^{j\theta(t)} \end{pmatrix} \begin{pmatrix} w_{11} & w_{12} \\ w_{21} & w_{22} \end{pmatrix} \begin{pmatrix} 1 & 0 \\ 0 & e^{j\lambda(t)} \end{pmatrix} \begin{pmatrix} u & 0 \\ 0 & v \end{pmatrix} \begin{pmatrix} s1(t) \\ s2(t) \end{pmatrix}$$

Figure 19:
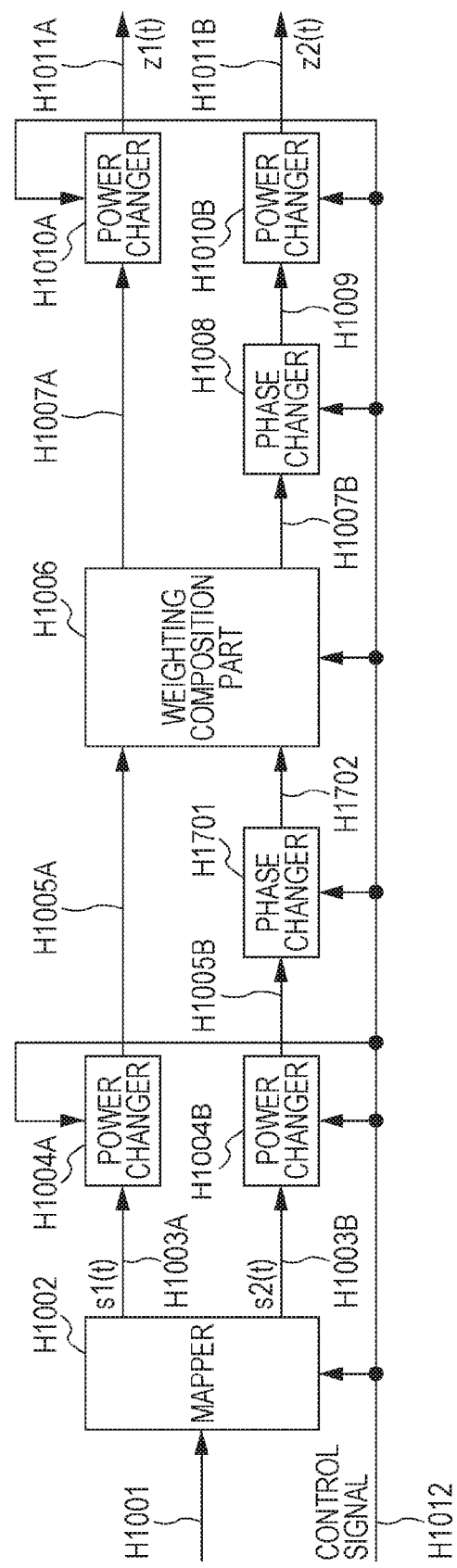
FIG. 19 is a view illustrating still another configuration example of the signal processing after the signal processing in FIG. 12 or 13.

In order to obtain (Equation 21), a configuration in which positions of phase changer H1601 and power changer H1004B in FIG. 18 are replaced with each other is illustrated in FIG. 19. The detailed description of the transmission device in FIG. 19 is omitted because the transmission device in FIG. 19 performs (Equation 21) similarly to the transmission device in FIG. 18. In the operation of FIG. 19, "phase changer H1701 performs the phase change on the input signal and outputs the post-phase-change signal" and "power changer H1004B performs the power change on the input signal and outputs the post-power-change signal".

(Equation 20) and (Equation 21) are equivalent to (Equation 22).

[Mathematical formula 22]

$$\begin{pmatrix} z1(t) \\ z2(t) \end{pmatrix} = \begin{pmatrix} 1 & 0 \\ 0 & e^{j\theta(t)} \end{pmatrix} \begin{pmatrix} a & 0 \\ 0 & b \end{pmatrix} \begin{pmatrix} w_{11} & w_{12} \\ w_{21} & w_{22} \end{pmatrix} \begin{pmatrix} u & 0 \\ 0 & v \end{pmatrix} \begin{pmatrix} 1 & 0 \\ 0 & e^{j\lambda(t)} \end{pmatrix} \begin{pmatrix} s1(t) \\ s2(t) \end{pmatrix}$$

(Equation 22)

Figure 20:
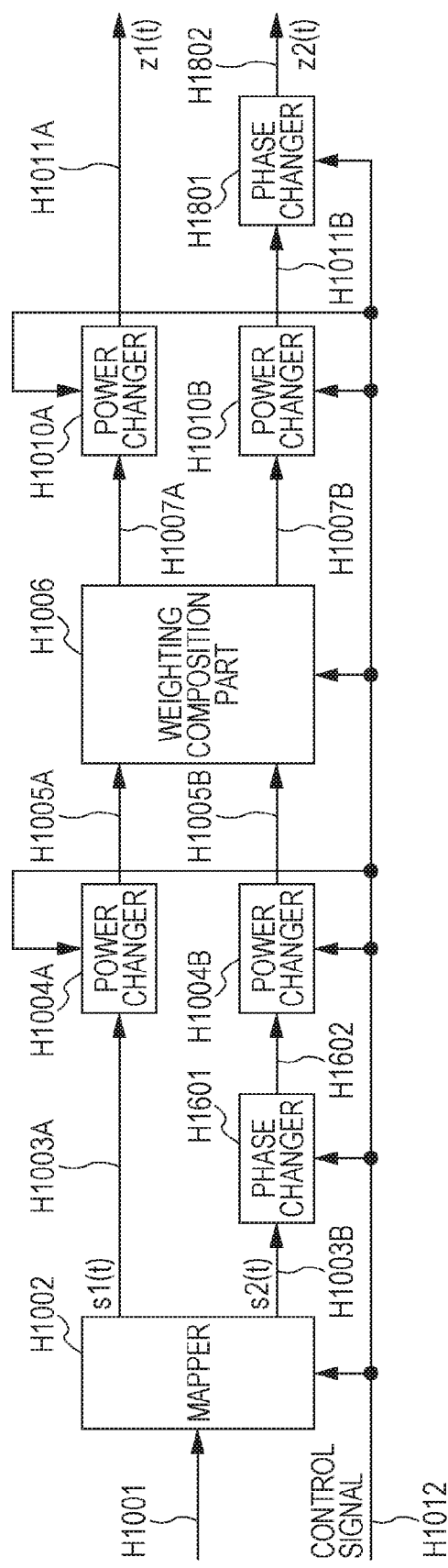
FIG. 20 is a view illustrating still another configuration example of the signal processing after the signal processing in FIG. 12 or 13.

In order to obtain (Equation 22), a configuration in which positions of phase changer H1008 and power changer H1010B in FIG. 18 are replaced with each other is illustrated in FIG. 20. The detailed description of the transmission device in FIG. 20 is omitted because the transmission device in FIG. 20 performs (Equation 22) similarly to the transmission device in FIG. 18. In FIG. 20, "phase changer H1801 performs the phase change on the input signal and outputs the post-phase-change signal" and "power changer H1010B performs the power change on the input signal and outputs the post-power-change signal".

(Equation 20), (Equation 21), and (Equation 22) are equivalent to (Equation 23).

[Mathematical formula 23]

$$\begin{pmatrix} z1(t) \\ z2(t) \end{pmatrix} = \begin{pmatrix} 1 & 0 \\ 0 & e^{j\theta(t)} \end{pmatrix} \begin{pmatrix} a & 0 \\ 0 & b \end{pmatrix} \begin{pmatrix} w_{11} & w_{12} \\ w_{21} & w_{22} \end{pmatrix} \begin{pmatrix} u & 0 \\ 0 & v \end{pmatrix} \begin{pmatrix} 1 & 0 \\ 0 & e^{j\lambda(t)} \end{pmatrix} \begin{pmatrix} s1(t) \\ s2(t) \end{pmatrix}$$

(Equation 23)

Figure 21:
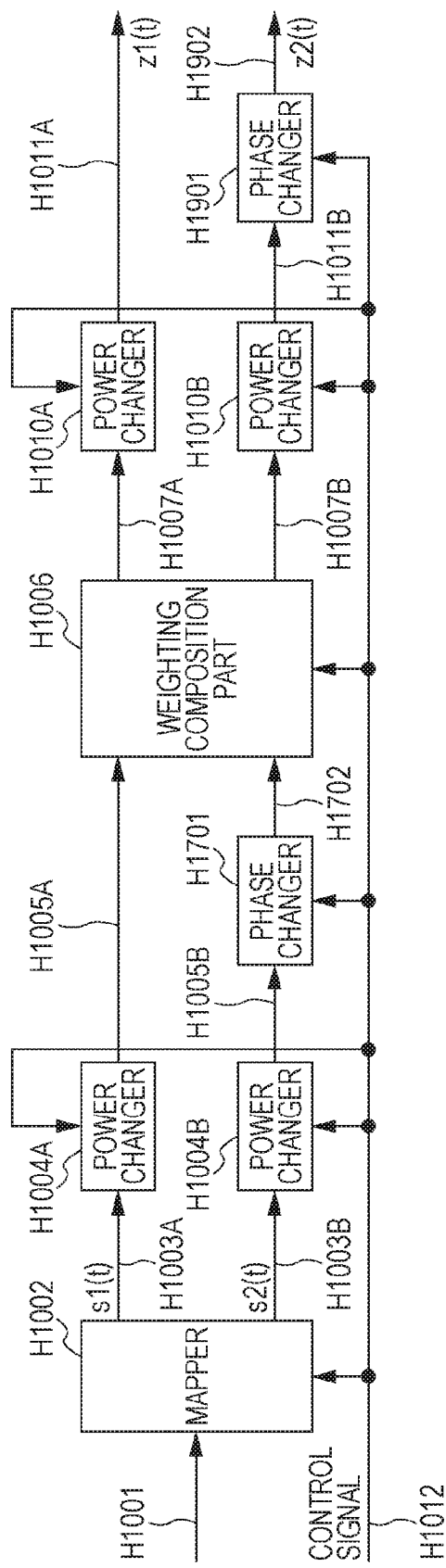
FIG. 21 is a view illustrating still another configuration example of the signal processing after the signal processing in FIG. 12 or 13.

In order to obtain (Equation 23), a configuration in which positions of phase changer H1008 and power changer H1010B in FIG. 19 are replaced with each other is illustrated in FIG. 21. The detailed description of the transmission device in FIG. 21 is omitted because the transmission device in FIG. 21 performs (Equation 23) similarly to the transmission device in FIG. 18. In FIG. 21, "phase changer H1901 performs the phase change on the input signal and outputs the post-phase-change signal" and "power changer H1010B performs the power change on the input signal and outputs the post-power-change signal".

$z1(t)$ and $z2(t)$ are transmitted from different antennas at the same clock time and the same frequency (common frequency).

Although $z1(t)$ and $z2(t)$ are the functions of time t, $z1(t)$ and $z2(t)$ may be the function of frequency f or the function of time t and frequency f (accordingly, the output may be expressed as $z1(f)$ and $z2(f)$ or $z1(t,f)$ and $z2(t,f)$). In this case, $z1(t)$ and $z2(t)$ are described as the function of time t.

Therefore, $z1(t)$, $z2(t)$, $z1'(t)$, $z2'(t)$, and $z2''(t)$ are also the function of time. However, $z1(t)$, $z2(t)$, $z1'(t)$, $z2'(t)$, and $z2''(t)$ may be the function of frequency f or the function of time t and frequency f.

In FIGS. 14 and 15, the detailed description is omitted because of the similar operation.

FIG. 16 illustrates a relationship between the transmission device and the reception device in FIGS. 18, 19, 20, and 21. The operation of the transmission device is described above. The operation of the reception device will be described below.

FIG. 16 illustrates transmission device H1401 and reception device H1402. In the case that r1 is a reception signal of antenna RX1 of the reception device H1402, that r2 is a reception signal of antenna RX2, and that h11, h12, h21, and h22 are a factor of radio wave propagation (channel fluctuation) between the antennas of the transmitter and receiver, the following equation holds.

[Mathematical formula 24]

$$\begin{pmatrix} r1(t) \\ r2(t) \end{pmatrix} = \begin{pmatrix} h_{11}(t) & h_{12}(t) \\ h_{21}(t) & h_{22}(t) \end{pmatrix} \begin{pmatrix} 1 & 0 \\ 0 & e^{j\theta(t)} \end{pmatrix} \begin{pmatrix} a & 0 \\ 0 & b \end{pmatrix}$$
$$\begin{pmatrix} w_{11} & w_{12} \\ w_{21} & w_{22} \end{pmatrix} \begin{pmatrix} 1 & 0 \\ 0 & e^{j\lambda(t)} \end{pmatrix} \begin{pmatrix} u & 0 \\ 0 & v \end{pmatrix} \begin{pmatrix} s1(t) \\ s2(t) \end{pmatrix} + \begin{pmatrix} n1(t) \\ n2(t) \end{pmatrix}$$

(Equation 24)

In the above equation, n1 and n2 are noises.

In (Equation 24), each variable is the function of time t. Alternatively, each variable may be the function of frequency f or the function of time t and frequency f (in this case, each variable is the function of time t).

Channel estimator H1403A in FIG. 16 estimates values of $h11(t)$ and $h12(t)$ in (Equation 24) using, for example, the pilot symbol in FIG. 15. Channel estimator H1403B in FIG. 16 estimates values of $h21(t)$ and $h22(t)$ in (Equation 24) using, for example, the pilot symbol in FIG. 15.

Signal processor H1404 in FIG. 16 obtains a logarithmic likelihood ratio of each bit of the data transmitted by the transmission device using the relationship of (Equation 24). Then, signal processor H1404 performs pieces of processing such as deinterleaving and error correction decoding to obtain reception information (see NPLs 5 and 6).

A way to switch the mapping method, pre-coding matrix, and phase change of signals s1 and s2 in FIGS. 18, 19, 20, and 21 will be described below.

First, a way to provide phase change value θ(t) in (Equation 19) will be described. In symbol number i (i is an integer of 0 or more), a value that can be taken by phase change value θ(i) is N kinds (N is an integer of 2 or more) of phase values. The N kinds of phase values are expressed by Phase[k](k is an integer of 0 to N−1 and 0 radian≤Phase[k] <2π radian). All the N kinds of phase values of Phase[k] are used in phase change value θ(i). <Condition #1> holds, which allows the reception device to obtain the high data reception quality.

Additionally, <Condition #2> may be satisfied (however, even if <Condition #2> is not satisfied, there is a possibility that the reception device obtains the high data reception quality).

In the case that i is an integer of 0 to G (G is an integer of N−1 or more), all the N kinds of phase values of Phase[k](k is an integer of 0 to N−1) are used in phase change value θ(i).

By way of example, phase change value θ(i)=Phase[i mod N] may be defined. mod is modulo, and therefore "i mod N" means a remainder when i is divided by N.

The mapping performed to generate signals s1 and s2 in FIGS. 18, 19, 20, and 21 will be described below.

(Modulation scheme used to generate signal $s1(t)$,modulation scheme used to generate signal $s2(t)$)=(16QAM, 16QAM) will be described below.

"16QAM mapping method #0", "16QAM mapping method #1", "16QAM mapping method #2", and "16QAM mapping method #3" are described above as the 16QAM mapping method.

At this point, in the transmission device, M kinds of 16QAM signal point arrangement methods belonging to one of "16QAM mapping method #0", "16QAM mapping method #1", "16QAM mapping method #2", and "16QAM mapping method #3" are prepared (M is an integer of 2 or more). At this point, mapper H1002 satisfies <Condition #3>.

<Condition #4> holds by expressing the M kinds of 16QAM mapping as "16QAM signal point arrangement $k" (k is an integer of 0 to M−1).

In the reception device, a possibility of regularly generating a small state of the minimum Euclid of each of 256 reception candidate signal points (the candidate signal points of 16×16=256 exist because the 16QAM signal is simultaneously received through two lines) in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The following matter holds for "g=h" in 16QAM signal point arrangement $g and 16QAM signal point arrangement $h.

{
$(I_{g,i}, Q_{g,i})$ (i is an integer of 0 to 15) represents coordinates of each of the 16 signal points in the in-phase I-orthogonal Q plane of "16QAM signal point arrangement $g", and $(I_{h,j}, Q_{h,j})$ (j is an integer of 0 to 15) represents coordinates of each of the 16 signal points in the in-phase I-orthogonal Q plane of "16QAM signal point arrangement $h". At this point,
{in the case that that k is an integer of 0 to 15, the case that $I_{g,k}=I_{h,k}$ and $Q_{g,k}=Q_{h,k}$ hold exists in all integers k.}
}

Similarly, for "g≠h", the following matter is satisfied.
{
$(I_{g,i}, Q_{g,i})$ (i is an integer of 0 to 15) represents coordinates of each of the 16 signal points in the in-phase I-orthogonal Q plane of "16QAM signal point arrangement $g", and $(I_{h,j}, Q_{h,j})$ (j is an integer of 0 to 15) represents coordinates of each of the 16 signal points in the in-phase I-orthogonal Q plane of "16QAM signal point arrangement $h". At this point,
{in the case that that k is an integer of 0 to 15, the case that $I_{g,k}=I_{h,k}$ and $Q_{g,k}=Q_{h,k}$ hold does not exist in integers k.}
}

At this point, the mapping set is defined.

The mapping set is defined as "(s1(t) 16QAM signal point arrangement $p_1$, s2(t) 16QAM signal point arrangement $p_2$)".

At this point, the following matter holds in the same mapping set.

"When the first mapping set is (s1(t) 16QAM signal point arrangement $p_1$, s2(t) 16QAM signal point arrangement $p_2$) while the second mapping set is (s1(t) 16QAM signal point arrangement $q_1$, s2(t) 16QAM signal point arrangement $q_2$), $p_1=q_1$ and $p_2=q_2$ hold in the case that the first mapping set is identical to the second mapping set."

The following matter holds in the different mapping set.

"When the first mapping set is (s1(t) 16QAM signal point arrangement $p_1$, s2(t) 16QAM signal point arrangement $p_2$) while the second mapping set is (s1(t) 16QAM signal point arrangement $q_1$, s2(t) 16QAM signal point arrangement $q_2$), $p_1 \neq q_1$ or $p_2 \neq q_2$ holds in the case that the first mapping set is different from the second mapping set."

At this point, the transmission device (the mapper in FIGS. 18, 19, 20, and 21) prepares L (L is an integer of 2 or more) kinds of mapping sets, and sets the L kinds of mapping sets to "mapping set *k" (k is an integer of 0 to L−1). At this point, the L kinds of mapping sets satisfy <Condition #5>.

<Condition #6> is provided. An example of <Condition #6> will be described below. Phase[0] and Phase[1] exist because N=2 kinds of phase values exist as the phase change value. L=3 kinds of mapping sets exist. Accordingly, "mapping set *0", "mapping set *1", and "mapping set *2" exist. At this point, FIG. 17 illustrates the state in which <Condition #6> is satisfied.

In FIG. 17, the horizontal axis indicates time number (slot number) i.

At this point, attention is paid to "mapping set *0". In time number 0, mapper H1002 in FIG. 18, 19, 20, or 21 performs the mapping using "mapping set *0", and phase changer H1008, H1801, or H1901 performs the phase change using Phase[0].

In time number 1, mapper H1002 in FIG. 18, 19, 20, or 21 performs the mapping using "mapping set *0", and phase changer H1008, H1801, or H1901 performs the phase change using Phase[1].

Accordingly, for "mapping set *0", the phase changer H1008, H1801, or H1901 in FIG. 18, 19, 20, or 21 uses all the N=2 kinds of phase values of Phase[k].

Attention is paid to "mapping set *1". In time number 2, the mapper in FIG. 18, 19, 20, or 21 performs the mapping using "mapping set *1", and phase changer H1008, H1801, or H1901 performs the phase change using Phase[0].

In time number 3, the mapper in FIG. 18, 19, 20, or 21 performs the mapping using "mapping set *1", and phase changer H1008, H1801, or H1901 performs the phase change using Phase[1].

Accordingly, for "mapping set *1", the phase changer H1008, H1801, or H1901 in FIG. 18, 19, 20, or 21 uses all the N=2 kinds of phase values of Phase[k].

Attention is paid to "mapping set *2". In time number 4, mapper H1002 in FIG. 18, 19, 20, or 21 performs the mapping using "mapping set 2", and phase changer H1008, H1801, or H1901 performs the phase change using Phase[0].

In time number 5, mapper H1002 in FIG. 18, 19, 20, or 21 performs the mapping using "mapping set *2", and phase changer H1008, H1801, or H1901 performs the phase change using Phase[1].

Accordingly, for "mapping set *2", the phase changer H1008, H1801, or H1901 in FIG. 18, 19, 20, or 21 uses all the N=2 kinds of phase values of Phase[k].

Therefore, FIG. 17 satisfies <Condition #6>. In the reception device, a possibility of regularly generating a small state of the minimum Euclid of each of 256 reception candidate signal points (the candidate signal points of 16×16=256 exist because the 16QAM signal is simultaneously received through two lines) in the in-phase I-orthogonal Q plane can be lowered by satisfying these conditions (for example, in the case that the direct wave is dominant in the radio wave propagation environment). Therefore, the reception device has a high possibility of obtaining the high data reception quality.

There is a possibility of being able to obtain the similar advantage even if <Condition #7> is satisfied instead of <Condition #6>.

(Modulation scheme used to generate signal s1(t),modulation scheme used to generate signal s2(t))=(64QAM, 64QAM) in the mapping of signals s1 and s2 in FIG. 18, 19, 20, or 21 will be described below.

"64QAM mapping method #0", "64QAM mapping method #1", "64QAM mapping method #2", and "64QAM mapping method #3" are described above as the 64QAM mapping method.

At this point, in the transmission device, M kinds of 64QAM signal point arrangement methods belonging to one of "64QAM mapping method #0", "64QAM mapping method #1", "64QAM mapping method #2", and "64QAM mapping method #3" are prepared (M is an integer of 2 or more). At this point, <Condition #8> is satisfied.

<Condition #9> holds by expressing the M kinds of 64QAM mapping as "64QAM signal point arrangement $k" (k is an integer of 0 to M−1).

Therefore, in the reception device, a possibility of regularly generating a small state of the minimum Euclid of each of 4096 reception candidate signal points (the candidate signal points of 64×64=4096 exist because the 64QAM signal is simultaneously received through two lines) in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The following matter holds for "g=h" in 64QAM signal point arrangement $g and 64QAM signal point arrangement $h.
{
$(I_{g,i}, Q_{g,i})$ (i is an integer of 0 to 63) represents coordinates of each of the 64 signal points in the in-phase I-orthogonal Q plane of "64QAM signal point arrangement $g", and $(I_{h,j}, Q_{h,j})$ (j is an integer of 0 to 63) represents coordinates of each of the 64 signal points in the in-phase I-orthogonal Q plane of "64QAM signal point arrangement $h". At this point,
{in the case that that k is an integer of 0 to 63, the case that $I_{g,k}=I_{h,k}$ and $Q_{g,k}=Q_{h,k}$ hold exists in all integers k.}
}

Similarly, for "g≠h", the following matter is satisfied.
{
$(I_{g,i}, Q_{g,i})$ (i is an integer of 0 to 63) represents coordinates of each of the 64 signal points in the in-phase I-orthogonal Q plane of "64QAM signal point arrangement $g", and $(I_{h,j}, Q_{h,j})$ (j is an integer of 0 to 63) represents coordinates of each of the 64 signal points in the in-phase I-orthogonal Q plane of "64QAM signal point arrangement $h". At this point,
{in the case that that k is an integer of 0 to 63, the case that $I_{g,k}=I_{h,k}$ and $Q_{g,k}=Q_{h,k}$ hold does not exist in integers k.}
}

At this point, the mapping set is defined.

The mapping set is defined as "(s1(t) 64QAM signal point arrangement $p_1$, s2(t) 64QAM signal point arrangement $p_2$)".

At this point, the following matter holds in the same mapping set.

"When the first mapping set is (s1(t) 64QAM signal point arrangement $p_1$, s2(t) 64QAM signal point arrangement $p_2$) while the second mapping set is (s1(t) 64QAM signal point arrangement $q_1$, s2(t) 64QAM signal point arrangement $q_2$), $p_1=q_1$ and $p_2=q_2$ hold in the case that the first mapping set is identical to the second mapping set."

The following matter holds in the different mapping set.

"When the first mapping set is (s1(t) 64QAM signal point arrangement $p_1$, s2(t) 64QAM signal point arrangement $p_2$) while the second mapping set is (s1(t) 64QAM signal point arrangement $q_1$, s2(t) 64QAM signal point arrangement $q_2$), $p_1 \neq q_1$ or $p_2 \neq q_2$ holds in the case that the first mapping set is different from the second mapping set."

At this point, the transmission device (the mapper in FIGS. 18, 19, 20, and 21) prepares L (L is an integer of 2 or more) kinds of mapping sets, and sets the L kinds of mapping sets to "mapping set *k" (k is an integer of 0 to L−1). At this point, the L kinds of mapping sets satisfy <Condition #10>.

<Condition #11> is provided. An example of <Condition #11> will be described below. Phase[0] and Phase[1] exist because N=2 kinds of phase values exist as the phase change value. L=3 kinds of mapping sets exist. Accordingly, "mapping set *0", "mapping set *1", and "mapping set *2" exist. At this point, FIG. 17 illustrates the state in which <Condition #11> is satisfied.

In FIG. 17, the horizontal axis indicates time number (slot number) i.

First, attention is paid to "mapping set *0". In time number 0, mapper H1002 in FIG. 18, 19, 20, or 21 performs the mapping using "mapping set *0", and phase changer H1008, H1801, or H1901 performs the phase change using Phase[0].

In time number 1, mapper H1002 in FIG. 18, 19, 20, or 21 performs the mapping using "mapping set *0", and phase changer H1008, H1801, or H1901 performs the phase change using Phase[1].

Accordingly, for "mapping set *0", the phase changer H1008, H1801, or H1901 in FIG. 18, 19, 20, or 21 uses all the N=2 kinds of phase values of Phase[k].

Attention is paid to "mapping set *1". In time number 2, mapper H1002 in FIG. 18, 19, 20, or 21 performs the mapping using "mapping set *1", and phase changer H1008, H1801, or H1901 performs the phase change using Phase[0].

In time number 3, mapper H1002 in FIG. 18, 19, 20, or 21 performs the mapping using "mapping set *1", and phase changer H1008, H1801, or H1901 performs the phase change using Phase[1].

Accordingly, for "mapping set *1", the phase changer H1008, H1801, or H1901 in FIG. 18, 19, 20, or 21 uses all the N=2 kinds of phase values of Phase[k].

Attention is paid to "mapping set *2". In time number 4, mapper H1002 in FIG. 18, 19, 20, or 21 performs the mapping using "mapping set *2", and phase changer H1008, H1801, or H1901 performs the phase change using Phase[0].

In time number 5, mapper H1002 in FIG. 18, 19, 20, or 21 performs the mapping using "mapping set *2", and phase changer H1008, H1801, or H1901 performs the phase change using Phase[1].

Accordingly, for "mapping set *2", the phase changer H1008, H1801, or H1901 in FIG. 18, 19, 20, or 21 uses all the N=2 kinds of phase values of Phase[k].

Therefore, FIG. 17 satisfies <Condition #11>. Therefore, in the reception device, a possibility of regularly generating a small state of the minimum Euclid of each of 4096 reception candidate signal points (the candidate signal points of 64×64=4096 exist because the 64QAM signal is simultaneously received through two lines) in the in-phase I-orthogonal Q plane can be lowered by satisfying these conditions (for example, in the case that the direct wave is dominant in the radio wave propagation environment). Therefore, the reception device has a high possibility of obtaining the high data reception quality.

There is a possibility of being able to obtain the similar advantage even if <Condition #12> is satisfied instead of <Condition #11>.

(Modulation scheme used to generate signal s1(t), modulation scheme used to generate signal s2(t))=(256QAM, 256QAM) in the mapping of signals s1 and s2 in FIG. 18, 19, 20, or 21 will be described below.

"256QAM mapping method #0", "256QAM mapping method #1", "256QAM mapping method #2", and "256QAM mapping method #3" are described above as the 256QAM mapping method.

At this point, in the transmission device, M kinds of 256QAM signal point arrangement methods belonging to one of "256QAM mapping method #0", "256QAM mapping method #1", "256QAM mapping method #2", and "256QAM mapping method #3" are prepared (M is an integer of 2 or more). At this point, the 256QAM mapping method satisfies <Condition #13>.

<Condition #14> holds by expressing the M kinds of 256QAM mapping as "256QAM signal point arrangement $k" (k is an integer of 0 to M−1).

Therefore, in the reception device, a possibility of regularly generating a small state of the minimum Euclid of each of 65536 reception candidate signal points (the candidate signal points of 256×256=65536 exist because the 256QAM signal is simultaneously received through two lines) in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The following matter holds for "g=h" in 256QAM signal point arrangement $g and 256QAM signal point arrangement $h.
{
$(I_{g,i}, Q_{g,i})$ (i is an integer of 0 to 255) represents coordinates of each of the 256 signal points in the in-phase I-orthogonal Q plane of "256QAM signal point arrangement $g", and $(I_{h,j}, Q_{h,j})$ (j is an integer of 0 to 255) represents coordinates of each of the 256 signal points in the in-phase I-orthogonal Q plane of "256QAM signal point arrangement $h". At this point,
{in the case that that k is an integer of 0 to 255, the case that $I_{g,k}=I_{h,k}$ and $Q_{g,k}=Q_{h,k}$ hold exists in all integers k.}
}

Similarly, for "g≠h", the following matter is satisfied.
{
$(I_{g,i}, Q_{g,i})$ (i is an integer of 0 to 255) represents coordinates of each of the 256 signal points in the in-phase I-orthogonal Q plane of "256QAM signal point arrangement $g", and $(I_{h,j}, Q_{h,j})$ (j is an integer of 0 to 255) represents coordinates of each of the 256 signal points in the in-phase I-orthogonal Q plane of "256QAM signal point arrangement $h". At this point,
{in the case that that k is an integer of 0 to 255, the case that $I_{g,k}=I_{h,k}$ and $Q_{g,k}=Q_{h,k}$ hold does not exist in integers k.}
}

At this point, the mapping set is defined.

The mapping set is defined as "(s1(t) 256QAM signal point arrangement $p_1$,s2(t) 256QAM signal point arrangement $p_2$)".

At this point, the following matter holds in the same mapping set.

"When the first mapping set is (s1(t) 256QAM signal point arrangement $p_1$,s2(t) 256QAM signal point arrangement $p_2$) while the second mapping set is (s1(t) 256QAM signal point arrangement $q_1$,s2(t) 256QAM signal point arrangement $q_2$), $p_1=q_1$ and $p_2=q_2$ hold in the case that the first mapping set is identical to the second mapping set."

The following matter holds in the different mapping set.

"When the first mapping set is (s1(t) 256QAM signal point arrangement $p_1$,s2(t) 256QAM signal point arrangement $p_2$) while the second mapping set is (s1(t) 256QAM signal point arrangement $q_1$,s2(t) 256QAM signal point arrangement $q_2$), $p_1 \neq q_1$ or $p_2 \neq q_2$ holds in the case that the first mapping set is different from the second mapping set."

At this point, the transmission device (the mapper in FIGS. 18, 19, 20, and 21) prepares L (L is an integer of 2 or more) kinds of mapping sets, and sets the L kinds of mapping sets to "mapping set *k" (k is an integer of 0 to L−1). At this point, the L kinds of mapping sets satisfy <Condition #15>.

<Condition #16> is provided. An example of <Condition #16> will be described below. Phase[0] and Phase[1] exist because N=2 kinds of phase values exist as the phase change value. L=3 kinds of mapping sets exist. Accordingly, "mapping set *0", "mapping set *1", and "mapping set *2" exist. At this point, FIG. 17 illustrates the state in which <Condition #16> is satisfied.

In FIG. 17, the horizontal axis indicates time number (slot number) i.

First, attention is paid to "mapping set *0". In time number 0, mapper H1002 in FIG. 18, 19, 20, or 21 performs the mapping using "mapping set *0", and phase changer H1008, H1801, or H1901 performs the phase change using Phase[0].

In time number 1, mapper H1002 in FIG. 18, 19, 20, or 21 performs the mapping using "mapping set *0", and phase changer H1008, H1801, or H1901 performs the phase change using Phase[1].

Accordingly, for "mapping set *0", the phase changer H1008, H1801, or H1901 in FIG. 18, 19, 20, or 21 uses all the N=2 kinds of phase values of Phase[k].

Attention is paid to "mapping set *1". In time number 2, mapper H1002 in FIG. 18, 19, 20, or 21 performs the mapping using "mapping set *1", and phase changer H1008, H1801, or H1901 performs the phase change using Phase[0].

In time number 3, mapper H1002 in FIG. 18, 19, 20, or 21 performs the mapping using "mapping set *1", and phase changer H1008, H1801, or H1901 performs the phase change using Phase[1].

Accordingly, for "mapping set *1", the phase changer H1008, H1801, or H1901 in FIG. 18, 19, 20, or 21 uses all the N=2 kinds of phase values of Phase[k].

Attention is paid to "mapping set *2". In time number 4, mapper H1002 in FIG. 18, 19, 20, or 21 performs the mapping using "mapping set *2", and phase changer H1008, H1801, or H1901 performs the phase change using Phase[0].

In time number 5, mapper H1002 in FIG. 18, 19, 20, or 21 performs the mapping using "mapping set *2", and phase changer H1008, H1801, or H1901 performs the phase change using Phase[1].

Accordingly, for "mapping set *2", the phase changer H1008, H1801, or H1901 in FIG. 18, 19, 20, or 21 uses all the N=2 kinds of phase values of Phase[k].

Therefore, FIG. 17 satisfies <Condition #16>. Therefore, in the reception device, a possibility of regularly generating a small state of the minimum Euclid of each of 65536 reception candidate signal points (the candidate signal points of 256×256=65536 exist because the 256QAM signal is simultaneously received through two lines) in the in-phase I-orthogonal Q plane can be lowered by satisfying these conditions (for example, in the case that the direct wave is dominant in the radio wave propagation environment). Therefore, the reception device has a high possibility of obtaining the high data reception quality.

There is a possibility of being able to obtain the similar advantage even if <Condition #17> is satisfied instead of <Condition #16>.

Phase change value λ(t) (see Equation 16) used by phase changers H1601 and H1701 in FIGS. 18, 19, 20, and 21 may regularly be changed similarly to, for example, phase change value θ(t). Although λ(t) is dealt with as the function of time t (or "the function of frequency f" or "the function of time t and frequency f"), λ may be a fixed value.

Pre-coding matrix W of (Equation 10) and (Equation 17) in the exemplary embodiment may be a fixed pre-coding matrix, or may be changed by time t (or "frequency f" or "time t and frequency f"). An example of pre-coding matrix W will be described below.

[Mathematical formula 24]

$$W = \begin{pmatrix} \beta \times e^{j0} & \beta \times \alpha \times e^{j0} \\ \beta \times \alpha \times e^{j0} & \beta \times e^{j\pi} \end{pmatrix} \quad \text{(Equation 25)}$$

or

[Mathematical formula 25]

$$W = \frac{1}{\sqrt{\alpha^2+1}} \begin{pmatrix} e^{j0} & \alpha \times e^{j0} \\ \alpha \times e^{j0} & e^{j\pi} \end{pmatrix} \quad \text{(Equation 26)}$$

or

[Mathematical formula 27]

$$W = \begin{pmatrix} \beta \times e^{j0} & \beta \times \alpha \times e^{j\pi} \\ \beta \times \alpha \times e^{j0} & \beta \times e^{j0} \end{pmatrix} \quad \text{(Equation 27)}$$

or

[Mathematical formula 28]

$$W = \frac{1}{\sqrt{\alpha^2+1}} \begin{pmatrix} e^{j0} & \alpha \times e^{j\pi} \\ \alpha \times e^{j0} & e^{j0} \end{pmatrix} \quad \text{(Equation 28)}$$

or

[Mathematical formula 29]

$$W = \begin{pmatrix} \beta \times \alpha \times e^{j0} & \beta \times e^{j\pi} \\ \beta \times e^{j0} & \beta \times \alpha \times e^{j0} \end{pmatrix} \quad \text{(Equation 29)}$$

or

[Mathematical formula 30]

$$W = \frac{1}{\sqrt{\alpha^2+1}} \begin{pmatrix} \alpha \times e^{j0} & e^{j\pi} \\ e^{j0} & \alpha \times e^{j0} \end{pmatrix} \quad \text{(Equation 30)}$$

or

[Mathematical formula 31]

$$W = \begin{pmatrix} \beta \times \alpha \times e^{j0} & \beta \times e^{j0} \\ \beta \times e^{j0} & \beta \times \alpha \times e^{j\pi} \end{pmatrix} \quad \text{(Equation 31)}$$

or

[Mathematical formula 32]

$$W = \frac{1}{\sqrt{\alpha^2+1}} \begin{pmatrix} \alpha \times e^{j0} & e^{j0} \\ e^{j0} & \alpha \times e^{j\pi} \end{pmatrix} \quad \text{(Equation 32)}$$

In (Equation 25), (Equation 26), (Equation 27), (Equation 28), (Equation 29), (Equation 30), (Equation 31), and (Equation 32), variable α may be a real number or an imaginary number, and variable β may be a real number or an imaginary number. Note that variable α is not 0 (zero) and variable β is not 0 (zero).

or

[Mathematical formula 33]

$$W = \begin{pmatrix} \beta \times \cos x & \beta \times \sin x \\ \beta \times \sin x & -\beta \times \cos x \end{pmatrix} \quad \text{(Equation 33)}$$

or

[Mathematical formula 34]

$$W = \begin{pmatrix} \cos x & \sin x \\ \sin x & -\cos x \end{pmatrix} \quad \text{(Equation 34)}$$

or

[Mathematical formula 35]

$$W = \begin{pmatrix} \beta \times \cos x & -\beta \times \sin x \\ \beta \times \sin x & \beta \times \cos x \end{pmatrix} \quad \text{(Equation 35)}$$

or

[Mathematical formula 36]

$$W = \begin{pmatrix} \cos x & -\sin x \\ \sin x & \cos x \end{pmatrix} \quad \text{(Equation 36)}$$

or

[Mathematical formula 37]

$$W = \begin{pmatrix} \beta \times \sin x & -\beta \times \cos x \\ \beta \times \cos x & \beta \times \sin x \end{pmatrix} \quad \text{(Equation 37)}$$

or

[Mathematical formula 38]

$$W = \begin{pmatrix} \sin x & -\cos x \\ \cos x & \sin x \end{pmatrix} \quad \text{(Equation 38)}$$

or

[Mathematical formula 39]

$$W = \begin{pmatrix} \beta \times \sin x & \beta \times \cos x \\ \beta \times \cos x & -\beta \times \sin x \end{pmatrix} \quad \text{(Equation 39)}$$

or

[Mathematical formula 40]

$$W = \begin{pmatrix} \sin x & \cos x \\ \cos x & -\sin x \end{pmatrix} \quad \text{(Equation 40)}$$

In (Equation 33), (Equation 34), (Equation 35), (Equation 36), (Equation 37), (Equation 38), (Equation 39), and (Equation 40), angle x is a real number (unit is "radian" or "degree"). In (Equation 33), (Equation 35), (Equation 37), and (Equation 39), variable β may be a real number or an imaginary number. Note that variable β is not 0 (zero).
or

[Mathematical formula 41]

$$W = \begin{pmatrix} \beta \times e^{jX_{11}} & \beta \times \alpha \times e^{j(X_{11}+Y)} \\ \beta \times \alpha \times e^{jX_{21}} & \beta \times e^{j(X_{21}+Y+\pi)} \end{pmatrix} \quad \text{(Equation 41)}$$

or

[Mathematical formula 42]

$$W = \frac{1}{\sqrt{\alpha^2+1}} \begin{pmatrix} e^{jX_{11}} & \alpha \times e^{j(X_{11}+Y)} \\ \alpha \times e^{jX_{21}} & e^{j(X_{21}+Y+\pi)} \end{pmatrix} \quad \text{(Equation 42)}$$

or

[Mathematical formula 43]

$$W = \begin{pmatrix} \beta \times \alpha \times e^{jX_{21}} & \beta \times e^{j(X_{21}+Y+\pi)} \\ \beta \times e^{jX_{11}} & \beta \times \alpha \times e^{j(X_{11}+Y)} \end{pmatrix} \quad \text{(Equation 43)}$$

or

[Mathematical formula 44]

$$W = \frac{1}{\sqrt{\alpha^2+1}} \begin{pmatrix} \alpha \times e^{jX_{21}} & e^{j(X_{21}+Y+\pi)} \\ e^{jX_{11}} & \alpha \times e^{j(X_{11}+Y)} \end{pmatrix} \quad \text{(Equation 44)}$$

In (Equation 41), (Equation 42), (Equation 43), and (Equation 44), angles $X_{11}$ and $X_{21}$ are a real number (unit is "radian" or "degree") (fixed value), angle Y is a fixed value (real number), and variable α may be a real number or an imaginary number. In (Equation 41) and (Equation 43), variable β may be a real number or an imaginary number. Note that variable α is not 0 (zero) and variable β is not 0 (zero).
or

[Mathematical formula 45]

$$W(i) = \begin{pmatrix} \beta \times e^{jX_{11}(i)} & \beta \times \alpha \times e^{j(X_{11}(i)+\lambda)} \\ \beta \times \alpha \times e^{jX_{21}(i)} & \beta \times e^{j(X_{21}(i)+\lambda+\pi)} \end{pmatrix} \quad \text{(Equation 45)}$$

or

[Mathematical formula 46]

$$W(i) = \frac{1}{\sqrt{\alpha^2+1}} \begin{pmatrix} e^{jX_{11}(i)} & \alpha \times e^{j(X_{11}(i)+Y)} \\ \alpha \times e^{jX_{21}(i)} & e^{j(X_{21}(i)+Y+\pi)} \end{pmatrix} \quad \text{(Equation 46)}$$

or

[Mathematical formula 47]

$$W(i) = \begin{pmatrix} \beta \times \alpha \times e^{jX_{21}(i)} & \beta \times e^{j(X_{21}(i)+Y+\pi)} \\ \beta \times e^{jX_{11}(i)} & \beta \times \alpha \times e^{j(X_{11}(i)+Y)} \end{pmatrix} \quad \text{(Equation 47)}$$

or

[Mathematical formula 48]

$$W(i) = \frac{1}{\sqrt{\alpha^2+1}} \begin{pmatrix} \alpha \times e^{j\theta_{21}(i)} & e^{j(\theta_{21}(i)+Y+\pi)} \\ e^{j\theta_{11}(i)} & \alpha \times e^{j(\theta_{11}(i)+Y)} \end{pmatrix} \quad \text{(Equation 48)}$$

In (Equation 45), (Equation 46), (Equation 47), and (Equation 48), angles $X_{11}(i)$ and $X_{21}(i)$ are a real number (unit is "radian" or "degree"), angles $X_{11}(i)$ and $X_{21}(i)$ are the function of variable i ("time", "frequency", or "time and frequency"), angle Y is a fixed value (real number), and variable α may be a real number or an imaginary number. In (Equation 45) and (Equation 47), variable β may be a real number or an imaginary number. Note that variable α is not 0 (zero) and variable β is not 0 (zero).
or

[Mathematical formula 49]

$$W = \begin{pmatrix} p & 0 \\ 0 & q \end{pmatrix} \quad \text{(Equation 49)}$$

or

[Mathematical formula 50]

$$W = \begin{pmatrix} 0 & p \\ q & 0 \end{pmatrix} \quad \text{(Equation 50)}$$

In (Equation 49) and (Equation 50), variables p and q may be a real number (fixed value) or an imaginary number (fixed value). Note that variable p is not 0 (zero) and variable q is not 0 (zero).

[Mathematical formula 51]

$$W(i) = \begin{pmatrix} p(i) & 0 \\ 0 & q(i) \end{pmatrix} \quad \text{(Equation 51)}$$

or

[Mathematical formula 52]

$$W(i) = \begin{pmatrix} 0 & p(i) \\ q(i) & 0 \end{pmatrix} \quad \text{(Equation 52)}$$

In (Equation 51) and (Equation 52), functions p(i) and q(i) may be a real number or an imaginary number, and is the function of variable i ("time", "frequency", or "time and frequency"). Note that function p(i) is not 0 (zero) and function q(i) is not 0 (zero).

The exemplary embodiment can also be performed even if a pre-coding matrix except for the above pre-coding matrix is used. At this point, pre-coding matrix W is a full rank.

The exemplary embodiment can be performed in the case that the following condition is satisfied for the mapping.

(Modulation scheme used to generate s1(t), modulation scheme used to generate s2(t))=(modulation scheme involving 16 signal points in I-Q plane (4-bit transmission per symbol), modulation scheme involving 16 signal points in I-Q plane (4-bit transmission per symbol)) in the mapping of s1 and mapping of s2 in FIGS. 12 and 13 will be described below.

M (M is an integer of 2 or more) kinds of methods for arranging the signal point of the modulation scheme involving the 16 signal points in the I-Q plane (4-bit transmission per symbol) are prepared in the transmission device. At this point, the following condition is satisfied in the transmission device.

<Condition #18>
One of <18-1>, <18-2>, <18-3>, and <18-4> is satisfied.
<18-1>
In s1(i), all the M kinds of mapping methods are adopted.
<18-2>
In s2(i), all the M kinds of mapping methods are adopted.

<18-3>

All the M kinds of mapping methods are adopted in s1($i$), and all the M kinds of mapping methods are also adopted in s2($i$).

<18-4>

In the case that the mapping method adopted in s1($i$) and the mapping method adopted in s2($i$) are combined, all the M kinds of mapping methods are adopted.

The M kinds of mapping methods for the modulation scheme involving the 16 signal points in the I-Q plane (4-bit transmission per symbol) are expressed as "signal point arrangement $k of modulation scheme involving 16 signal points" (k is an integer of 0 to M−1), whereby the following condition holds.

<Condition #19>

In the case that x is an integer of 0 to M−1, that y is an integer of 0 to M−1, and that x≠y holds, the following matter holds in all integers x and y.

{
($I_{x,i}, Q_{x,i}$) (i is an integer of 0 to 15) represents coordinates of each of the 16 signal points in the in-phase I-orthogonal Q plane of "signal point arrangement $x of modulation scheme involving 16 signal points", and that ($I_{y,j}, Q_{y,j}$) (j is an integer of 0 to 15) represents coordinates of each of the 16 signal points in the in-phase I-orthogonal Q plane of "signal point arrangement $y of modulation scheme involving 16 signal points". At this point, {in the case that j is an integer of 0 to 15, i satisfying $I_{x,i} \neq I_{y,j}$ exists in all integers j} or {in the case that j is an integer of 0 to 15, i satisfying $Q_{x,i} \neq Q_{y,j}$ exists in all integers j.}
}

Therefore, in the reception device, a possibility of regularly generating a small state of the minimum Euclid of each of 256 reception candidate signal points in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The following matter holds in the case that "g=h" holds in signal point arrangement $g of the modulation scheme involving the 16 signal points and signal point arrangement $h of the modulation scheme involving the 16 signal points.

{
($I_{g,i}, Q_{g,i}$) (i is an integer of 0 to 15) represents coordinates of each of the 16 signal points in the in-phase I-orthogonal Q plane of "signal point arrangement $g of modulation scheme involving 16 signal points", and that ($I_{h,j}, Q_{h,j}$) (j is an integer of 0 to 15) represents coordinates of each of the 16 signal points in the in-phase I-orthogonal Q plane of "signal point arrangement $h of modulation scheme involving 16 signal points". At this point, {in the case that that k is an integer of 0 to 15, the case that $I_{g,k}=I_{h,k}$ and $Q_{g,k}=Q_{h,k}$ hold exists in all integers k.}
}

Similarly, for "g≠h", the following matter is satisfied.

{
($I_{g,i}, Q_{g,i}$) (i is an integer of 0 to 15) represents coordinates of each of the 16 signal points in the in-phase I-orthogonal Q plane of "signal point arrangement $g of modulation scheme involving 16 signal points", and that ($I_{h,j}, Q_{h,j}$) (j is an integer of 0 to 15) represents coordinates of each of the 16 signal points in the in-phase I-orthogonal Q plane of "signal point arrangement $h of modulation scheme involving 16 signal points".

At this point,
{in the case that that k is an integer of 0 to 15, the case that $I_{g,k}=I_{h,k}$ and $Q_{g,k}=Q_{h,k}$ hold does not exist in integers k.}
}

At this point, the mapping set is defined.

The mapping set is defined as "(signal point arrangement $p_1$ of modulation scheme involving 16 s1($t$) signal points, signal point arrangement $p_2$ of modulation scheme involving 16 s2($t$) signal points)".

At this point, the following matter holds in the same mapping set.

"When the first mapping set is (signal point arrangement $p_1$ of modulation scheme involving 16 s1($t$) signal points, signal point arrangement $p_2$ of modulation scheme involving 16 s2($t$) signal points) while the second mapping set is (signal point arrangement $q_1$ of modulation scheme involving 16 s1($t$) signal points, signal point arrangement $q_2$ of modulation scheme involving 16 s2($t$) signal points), $p_1=q_1$ and $p_2=q_2$ hold in the case that the first mapping set is identical to the second mapping set."

The following matter holds in the different mapping set.

"When the first mapping set is (signal point arrangement $p_1$ of modulation scheme involving 16 s1($t$) signal points, signal point arrangement $p_2$ of modulation scheme involving 16 s2($t$) signal points) while the second mapping set is (signal point arrangement $q_1$ of modulation scheme involving 16 s1($t$) signal points, signal point arrangement $q_2$ of modulation scheme involving 16 s2($t$) signal points), $p_1 \neq q_1$ and $p_2 \neq q_2$ hold in the case that the first mapping set is different from the second mapping set."

At this point, the transmission device (the mapper in FIGS. 12 and 13) prepares L (L is an integer of 2 or more) kinds of mapping sets, and sets the L kinds of mapping sets to "mapping set *k" (k is an integer of 0 to L−1). At this point, the L kinds of mapping sets satisfy the following condition.

<Condition #20>

In the case that x is an integer of 0 to L−1, that y is an integer of 0 to L−1, and that x≠y holds, "mapping set *x" differs from "mapping set *y" in all integers x and y.

The following condition is provided.

<Condition #21>

In the case that x is an integer of 0 to L−1, the following matter is satisfied in all integers x.

{The phase changer (subsequent to the weighting composition part) in FIG. 12 or 13 (or FIG. 18, 19, 20, or 21) performs the phase change on the signal generated using signals s1 and s2 generated using "mapping set *x". At this point, all the N kinds of phase values of Phase[k] are used as phase change value θ.}

An example of <Condition #21> will be described below. Phase[0] and Phase[1] exist because N=2 kinds of phase values exist as the phase change value. "Mapping set *0", "mapping set *1", and "mapping set *2" exist because L=3 kinds of mapping sets exist. FIG. 17 illustrates the state in which <Condition #21> is satisfied.

In FIG. 17, the horizontal axis indicates time number (slot number) i.

First, attention is paid to "mapping set *0". In time number 0, the mapper in FIG. 12 or 13 performs the mapping using "mapping set *0", and the phase changer performs the phase change using Phase[0].

In time number 1, the mapper in FIG. 12 or 13 performs the mapping using "mapping set *0", and the phase changer performs the phase change using Phase[1].

Accordingly, for "mapping set *0", the phase changer in FIG. 12 or 13 uses all the N=2 kinds of phase values of Phase[k].

Attention is paid to "mapping set *1". In time number 2, the mapper in FIG. 12 or 13 performs the mapping using "mapping set *1", and the phase changer performs the phase change using Phase[0].

In time number 3, the mapper in FIG. 12 or 13 performs the mapping using "mapping set *0", and the phase changer performs the phase change using Phase[1].

Accordingly, for "mapping set *1", the phase changer in FIG. 12 or 13 uses all the N=2 kinds of phase values of Phase[k].

Attention is paid to "mapping set *2". In time number 4, the mapper in FIG. 12 or 13 performs the mapping using "mapping set *2", and the phase changer performs the phase change using Phase[0].

In time number 5, the mapper in FIG. 12 or 13 performs the mapping using "mapping set *2", and the phase changer performs the phase change using Phase[1].

Accordingly, for "mapping set *2", the phase changer in FIG. 12 or 13 uses all the N=2 kinds of phase values of Phase[k].

Therefore, FIG. 17 satisfies <Condition #21>. Therefore, in the reception device, a possibility of regularly generating a small state of the minimum Euclid of each of 256 reception candidate signal points in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The reception device can obtain the similar advantage even if the following condition is satisfied instead of <Condition #21>.

<Condition #22>

In the case that x is an integer of 0 to L−1, x satisfying the following matter exists.

{The phase changer (subsequent to the weighting composition part) in FIG. 12 or 13 (or FIG. 18, 19, 20, or 21) performs the phase change on the signal generated using signals s1 and s2 generated using "mapping set *x". At this point, all the N kinds of phase values of Phase[k] are used as phase change value θ.}

(Modulation scheme used to generate s1($t$),modulation scheme used to generate s2($t$))=(modulation scheme involving 64 signal points in I-Q plane (6-bit transmission per symbol),modulation scheme involving 64 signal points in I-Q plane (6-bit transmission per symbol)) in the mapping performed to generate s1 and s2 in FIGS. 12 and 13 will be described below.

M (M is an integer of 2 or more) kinds of methods for arranging the signal point of the modulation scheme involving the 64 signal points in the I-Q plane (6-bit transmission per symbol) are prepared in the transmission device. At this point, the following condition is satisfied in the transmission device.

<Condition #23>

One of <23-1>, <23-2>, <23-3>, and <23-4> is satisfied.

<23-1>

In s1($i$), all the M kinds of signal point arrangement methods are adopted.

<23-2>

In s2($i$), all the M kinds of signal point arrangement methods are adopted.

<23-3>

All the M kinds of signal point arrangement methods are adopted in s1($i$), and all the M kinds of signal point arrangement methods are also adopted in s2($i$).

<23-4>

In the case that signal point arrangement method adopted in s1($i$) and the signal point arrangement method adopted in s2($i$) are combined, all the M kinds of signal point arrangement methods are adopted.

The M kinds of mapping methods for the modulation scheme involving the 64 signal points in the I-Q plane (6-bit transmission per symbol) are expressed as "signal point arrangement $k of modulation scheme involving 64 signal points" (k is an integer of 0 to M−1), whereby the following condition holds.

<Condition #24>

In the case that x is an integer of 0 to M−1, that y is an integer of 0 to M−1, and that x≠y holds, the following matter holds in all integers x and y.

{

($I_{x,i}$,$Q_{x,i}$) (i is an integer of 0 to 63) represents coordinates of each of the 64 signal points in the in-phase I-orthogonal Q plane of "signal point arrangement $x of modulation scheme involving 64 signal points", and that ($I_{y,j}$,$Q_{y,j}$) (j is an integer of 0 to 63) represents coordinates of each of the 64 signal points in the in-phase I-orthogonal Q plane of "signal point arrangement $y of modulation scheme involving 64 signal points".

At this point,

{in the case that j is an integer of 0 to 63, i satisfying $I_{x,i} \neq I_{y,j}$ exists in all integers j} or {in the case that j is an integer of 0 to 63, i satisfying $Q_{x,i} \neq Q_{y,j}$ exists in all integers j.}

}

Therefore, in the reception device, a possibility of regularly generating a small state of the minimum Euclid of each of 4096 reception candidate signal points in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The following matter holds in the case that "g=h" holds in signal point arrangement $g of the modulation scheme involving the 64 signal points and signal point arrangement $h of the modulation scheme involving the 64 signal points.

{

($I_{g,i}$,$Q_{g,i}$) (i is an integer of 0 to 63) represents coordinates of each of the 64 signal points in the in-phase I-orthogonal Q plane of "signal point arrangement $g of modulation scheme involving 64 signal points", and that ($I_{h,j}$,$Q_{h,j}$) (j is an integer of 0 to 63) represents coordinates of each of the 64 signal points in the in-phase I-orthogonal Q plane of "signal point arrangement $h of modulation scheme involving 64 signal points". At this point, {in the case that that k is an integer of 0 to 63, the case that $I_{g,k}=I_{h,k}$ and $Q_{g,k}=Q_{h,k}$ hold exists in all integers k.}

}

Similarly, for "g≠h", the following matter is satisfied.

{

($I_{g,i}$,$Q_{g,i}$) (i is an integer of 0 to 63) represents coordinates of each of the 64 signal points in the in-phase I-orthogonal Q plane of "signal point arrangement $g of modulation scheme involving 64 signal points", and that ($I_{h,j}$,$Q_{h,j}$) (j is an integer of 0 to 63) represents coordinates of each of the 64 signal points in the in-phase I-orthogonal Q plane of "signal point arrangement $h of modulation scheme involving 64 signal points". At this point, {in the case that that k is an integer of 0 to 63, the case that $I_{g,k}=I_{h,k}$ and $Q_{g,k}=Q_{h,k}$ hold does not exist in integers k.}
}

At this point, the mapping set is defined.

The mapping set is defined as "(signal point arrangement $\$p_1$ of modulation scheme involving 64 s1(t) signal points, signal point arrangement $\$p_2$ of modulation scheme involving 64 s2(t) signal points)".

At this point, the following matter holds in the same mapping set.

"When the first mapping set is (signal point arrangement $\$p_1$ of modulation scheme involving 64 s1(t) signal points, signal point arrangement $\$p_2$ of modulation scheme involving 64 s2(t) signal points) while the second mapping set is (signal point arrangement $\$q_1$ of modulation scheme involving 64 s1(t) signal points, signal point arrangement $\$q_2$ of modulation scheme involving 64 s2(t) signal points), $p_1=q_1$ and $p_2=q_2$ hold in the case that the first mapping set is identical to the second mapping set."

The following matter holds in the different mapping set.

"When the first mapping set is (signal point arrangement $\$p_1$ of modulation scheme involving 64 s1(t) signal points, signal point arrangement $\$p_2$ of modulation scheme involving 64 s2(t) signal points) while the second mapping set is (signal point arrangement $\$q_1$ of modulation scheme involving 64 s1(t) signal points, signal point arrangement $\$q_2$ of modulation scheme involving 64 s2(t) signal points), $p_1 \neq q_1$ and $p_2 \neq q_2$ hold in the case that the first mapping set is different from the second mapping set."

At this point, the transmission device (the mapper in FIGS. 12 and 13) prepares L (L is an integer of 2 or more) kinds of mapping sets, and sets the L kinds of mapping sets to "mapping set *k" (k is an integer of 0 to L−1). At this point, the L kinds of mapping sets satisfy the following condition.

<Condition #25>

In the case that x is an integer of 0 to L−1, that y is an integer of 0 to L−1, and that x≠y holds, "mapping set *x" differs from "mapping set *y" in all integers x and y.

The following condition is provided.

<Condition #26>

In the case that x is an integer of 0 to L−1, the following matter is satisfied in all integers x.

{The phase changer (subsequent to the weighting composition part) in FIG. 12 or 13 (or FIG. 18, 19, 20, or 21) performs the phase change on the signal generated using signals s1 and s2 generated using "mapping set *x". At this point, all the N kinds of phase values of Phase[k] are used as phase change value θ.}

An example of <Condition #26> will be described below. Phase[0] and Phase[1] exist because N=2 kinds of phase values exist as the phase change value. "Mapping set *0", "mapping set *1", and "mapping set *2" exist because L=3 kinds of mapping sets exist. FIG. 17 illustrates the state in which <Condition #26> is satisfied.

In FIG. 17, the horizontal axis indicates time number (slot number) i.

First, attention is paid to "mapping set *0". In time number 0, the mapper in FIG. 12 or 13 performs the mapping using "mapping set *0", and the phase changer performs the phase change using Phase[0].

In time number 1, the mapper in FIG. 12 or 13 performs the mapping using "mapping set *0", and the phase changer performs the phase change using Phase[1].

Accordingly, for "mapping set *0", the phase changer in FIG. 12 or 13 uses all the N=2 kinds of phase values of Phase[k].

Attention is paid to "mapping set *1". In time number 2, the mapper in FIG. 12 or 13 performs the mapping using "mapping set 1", and the phase changer performs the phase change using Phase[0].

In time number 3, the mapper in FIG. 12 or 13 performs the mapping using "mapping set *1", and the phase changer performs the phase change using Phase[1].

Accordingly, for "mapping set *1", the phase changer in FIG. 12 or 13 uses all the N=2 kinds of phase values of Phase[k].

Attention is paid to "mapping set *2". In time number 4, the mapper in FIG. 12 or 13 performs the mapping using "mapping set *2", and the phase changer performs the phase change using Phase[0].

In time number 5, the mapper in FIG. 12 or 13 performs the mapping using "mapping set *2", and the phase changer performs the phase change using Phase[1].

Accordingly, for "mapping set *2", the phase changer in FIG. 12 or 13 uses all the N=2 kinds of phase values of Phase[k].

Therefore, FIG. 17 satisfies <Condition #26>. Therefore, in the reception device, a possibility of regularly generating a small state of the minimum Euclid of each of 4096 reception candidate signal points in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The reception device can obtain the similar advantage even if the following condition is satisfied instead of <Condition #26>.

<Condition #27>

In the case that x is an integer of 0 to L−1, the following matter is satisfied in all integers x.

{The phase changer (subsequent to the weighting composition part) in FIG. 12 or 13 (or FIG. 18, 19, 20, or 21) performs the phase change on the signal generated using signals s1 and s2 generated using "mapping set *x". At this point, all the N kinds of phase values of Phase[k] are used as phase change value θ.}

(Modulation scheme involving 256 signal points in I-Q plane (8-bit transmission per symbol), modulation scheme involving 256 signal points in I-Q plane (8-bit transmission per symbol)) in the mapping performed to generate s1 and s2 in FIGS. 12 and 13 will be described below.

M (M is an integer of 2 or more) kinds of methods for arranging the signal point of the modulation scheme involving the 256 signal points in the I-Q plane (8-bit transmission per symbol) are prepared in the transmission device. At this point, the following condition is satisfied in the transmission device.

<Condition #28>

In the transmission device, one of <28-1>, <28-2>, <28-3>, and <28-4> is satisfied.

<28-1>

In s1(i), all the M kinds of signal point arrangement methods are adopted.

<28-2>

In s2(i), all the M kinds of signal point arrangement methods are adopted.

<28-3>

All the M kinds of signal point arrangement methods are adopted in s1(i), and all the M kinds of signal point arrangement methods are also adopted in s2(i).

<28-4>

In the case that signal point arrangement method adopted in s1($i$) and the signal point arrangement method adopted in s2($i$) are combined, all the M kinds of signal point arrangement methods are adopted.

The M kinds of mapping methods for the modulation scheme involving the 256 signal points in the I-Q plane (8-bit transmission per symbol) are expressed as "signal point arrangement $k of modulation scheme involving 256 signal points" (k is an integer of 0 to M−1), whereby the following condition holds.

<Condition #29>

In the case that x is an integer of 0 to M−1, that y is an integer of 0 to M−1, and that x≠y holds, the following matter holds in all integers x and y.

{

($I_{x,i}, Q_{x,i}$) (i is an integer of 0 to 255) represents coordinates of each of the 256 signal points in the in-phase I-orthogonal Q plane of "signal point arrangement $x of modulation scheme involving 256 signal points", and that ($I_{y,j}, Q_{y,j}$) (j is an integer of 0 to 255) represents coordinates of each of the 256 signal points in the in-phase I-orthogonal Q plane of "signal point arrangement $y of modulation scheme involving 256 signal points". At this point, {in the case that j is an integer of 0 to 255, i satisfying $I_{x,i} \neq I_{y,j}$ exists in all integers j} or {in the case that j is an integer of 0 to 255, i satisfying $Q_{x,i} \neq Q_{y,j}$ exists in all integers j.}

}

Therefore, in the reception device, a possibility of regularly generating a small state of the minimum Euclid of each of 65536 reception candidate signal points in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The following matter holds in the case that "g=h" holds in signal point arrangement $g of the modulation scheme involving the 256 signal points and signal point arrangement $h of the modulation scheme involving the 256 signal points.

{

($I_{g,i}, Q_{g,i}$) (i is an integer of 0 to 255) represents coordinates of each of the 256 signal points in the in-phase I-orthogonal Q plane of "signal point arrangement $g of modulation scheme involving 256 signal points", and that ($I_{h,j}, Q_{h,j}$) (j is an integer of 0 to 255) represents coordinates of each of the 256 signal points in the in-phase I-orthogonal Q plane of "signal point arrangement $h of modulation scheme involving 256 signal points". At this point, {in the case that that k is an integer of 0 to 255, the case that $I_{g,k}=I_{h,k}$ and $Q_{g,k}=Q_{h,k}$ hold exists in all integers k.}

}

Similarly, for "g≠h", the following matter is satisfied.

{

($I_{g,i}, Q_{g,i}$) (i is an integer of 0 to 255) represents coordinates of each of the 256 signal points in the in-phase I-orthogonal Q plane of "signal point arrangement $g of modulation scheme involving 256 signal points", and that ($I_{h,j}, Q_{h,j}$) (j is an integer of 0 to 255) represents coordinates of each of the 256 signal points in the in-phase I-orthogonal Q plane of "signal point arrangement $h of modulation scheme involving 256 signal points". At this point, {in the case that that k is an integer of 0 to 255, the case that $I_{g,k}=I_{h,k}$ and $Q_{g,k}=Q_{h,k}$ hold does not exist in integers k.}

}

At this point, the mapping set is defined.

The mapping set is defined as "(signal point arrangement $p_1$ of modulation scheme involving 256 s1($t$) signal points, signal point arrangement $p_2$ of modulation scheme involving 256 s2($t$) signal points)".

At this point, the following matter holds in the same mapping set.

"When the first mapping set is (signal point arrangement $p_1$ of modulation scheme involving 256 s1($t$) signal points, signal point arrangement $p_2$ of modulation scheme involving 256 s2($t$) signal points) while the second mapping set is (signal point arrangement $q_1$ of modulation scheme involving 256 s1($t$) signal points, signal point arrangement $q_2$ of modulation scheme involving 256 s2($t$) signal points), $p_1=q_1$ and $p_2=q_2$ hold in the case that the first mapping set is identical to the second mapping set."

The following matter holds in the different mapping set.

"When the first mapping set is (signal point arrangement $p_1$ of modulation scheme involving 256 s1($t$) signal points, signal point arrangement $p_2$ of modulation scheme involving 256 s2($t$) signal points) while the second mapping set is (signal point arrangement $q_1$ of modulation scheme involving 256 s1($t$) signal points, signal point arrangement $q_2$ of modulation scheme involving 256 s2($t$) signal points), $p_1 \neq q_1$ and $p_2 \neq q_2$ hold in the case that the first mapping set is different from the second mapping set."

At this point, the transmission device (the mapper in FIGS. 12 and 13) prepares L (L is an integer of 2 or more) kinds of mapping sets, and sets the L kinds of mapping sets to "mapping set *k" (k is an integer of 0 to L−1). At this point, the L kinds of mapping sets satisfy the following condition.

<Condition #30>

In the case that x is an integer of 0 to L−1, that y is an integer of 0 to L−1, and that x≠y holds, "mapping set *x" differs from "mapping set *y" in all integers x and y.

The following condition is provided.

<Condition #31>

In the case that x is an integer of 0 to L−1, the following matter is satisfied in all integers x.

{The phase changer (subsequent to the weighting composition part) in FIG. 12 or 13 (or FIG. 18, 19, 20, or 21) performs the phase change on the signal generated using signals s1 and s2 generated using "mapping set *x". At this point, all the N kinds of phase values of Phase[k] are used as phase change value θ.}

An example of <Condition #31> will be described below. Phase[0] and Phase[1] exist because N=2 kinds of phase values exist as the phase change value. "Mapping set *0", "mapping set *1", and "mapping set *2" exist because L=3 kinds of mapping sets exist. At this point, FIG. 17 illustrates the state in which <Condition #31> is satisfied.

In FIG. 17, the horizontal axis indicates time number (slot number) i.

First, attention is paid to "mapping set *0". In time number 0, the mapper in FIG. 12 or 13 performs the mapping using "mapping set *0", and the phase changer performs the phase change using Phase[0].

In time number 1, the mapper in FIG. 12 or 13 performs the mapping using "mapping set *0", and the phase changer performs the phase change using Phase[1].

Accordingly, for "mapping set *0", the phase changer in FIG. 12 or 13 uses all the N=2 kinds of phase values of Phase[k].

Attention is paid to "mapping set *1". In time number 2, the mapper in FIG. 12 or 13 performs the mapping using "mapping set *1", and the phase changer performs the phase change using Phase[0].

In time number 3, the mapper in FIG. 12 or 13 performs the mapping using "mapping set *0", and the phase changer performs the phase change using Phase[1].

Accordingly, for "mapping set *1", the phase changer in FIG. 12 or 13 uses all the N=2 kinds of phase values of Phase[k].

Attention is paid to "mapping set *2". In time number 4, the mapper in FIG. 12 or 13 performs the mapping using "mapping set *2", and the phase changer performs the phase change using Phase[0].

In time number 5, the mapper in FIG. 12 or 13 performs the mapping using "mapping set *2", and the phase changer performs the phase change using Phase[1].

Accordingly, for "mapping set *2", the phase changer in FIG. 12 or 13 uses all the N=2 kinds of phase values of Phase[k].

Therefore, FIG. 17 satisfies <Condition #31>. Therefore, in the reception device, a possibility of regularly generating a small state of the minimum Euclid of each of 65536 reception candidate signal points in the in-phase I-orthogonal Q plane can be lowered by satisfying these conditions (for example, in the case that the direct wave is dominant in the radio wave propagation environment). Therefore, the reception device has a high possibility of obtaining the high data reception quality.

The reception device has a possibility of obtaining the similar advantage even if the following condition is satisfied instead of <Condition #31>.

<Condition #32>

In the case that x is an integer of 0 to L−1, the following matter is satisfied in all integers x.

{The phase changer (subsequent to the weighting composition part) in FIG. 12 or 13 (or FIG. 18, 19, 20, or 21) performs the phase change on the signal generated using signals s1 and s2 generated using "mapping set *x". All the N kinds of phase values of Phase[k] are used as phase change value θ.}

In the exemplary embodiment, the OFDM scheme is applied by way of example. Alternatively, other multi-carrier schemes and single-carrier scheme can also be applied. An OFDM scheme (NPL 7) in which a wavelet transform is used and a spread spectrum communication scheme can also be applied.

(Supplement)

The above exemplary embodiment may be performed while a plurality of contents are combined therewith.

The exemplary embodiment and other contents are illustrated only by way of example. The exemplary embodiment and other contents can be achieved with a similar configuration even with, for example, different "modulation scheme, error correction coding scheme (such as error correction code, code length, and coding rate to be used), and control information" from the illustrated "modulation scheme, error correction coding scheme (such as error correction code, code length, and coding rate to be used), control information".

The exemplary embodiment and other contents can be achieved with a modulation scheme other than the modulation scheme illustrated herein. For example, APSK (Amplitude Phase Shift Keying) (such as 16APSK, 64APSK, 128APSK, 256APSK, 1024APSK, and 4096APSK), PAM (Pulse Amplitude Modulation) (such as 4PAM, 8PAM, 16PAM, 64PAM, 128PAM, 256PAM, 1024PAM, and 4096PAM), PSK (Phase Shift Keying) (such as BPSK, QPSK, 8PSK, 16PSK, 64PSK, 128PSK, 256PSK, 1024PSK, and 4096PSK), and QAM (Quadrature Amplitude Modulation) (such as 4QAM, 8QAM, 16QAM, 64QAM, 128QAM, 256QAM, 1024QAM, and 4096QAM) may be applied, or uniform mapping and non-uniform mapping may be applied in each modulation scheme.

The method for arranging 2, 4, 8, 16, 64, 128, 256, or 1024 signal points in the I-Q plane (a modulation scheme involving 2, 4, 8, 16, 64, 128, 256, or 1024 signal points) is not limited to the methods for arranging signal points according to the modulation scheme of the exemplary embodiment. Accordingly, the function of outputting the in-phase component and the orthogonal component based on the plurality of bits is the function of the mapper, and the function of subsequently performing the pre-coding and the phase change is one effective function of the present disclosure.

In the case that "∀" and "∃" exist in the specification, "∀" designates a universal quantifier, and "∃" designates an existential quantifier.

In the case that a complex plane exists in the specification, for example, a unit of phase such as an argument is called "radian".

The use of the complex plane can display polar coordinates of the complex number in a polar form. If a complex number z=a+jb (a and b are integers and j is an imaginary unit) corresponds to a point (a,b) on the complex plane and the point (a,b) is expressed as [r,θ] by the polar coordinate, (Equation 53) holds, where a=r×cos θ and b=r×sin θ hold (r is an absolute value of z (r=|z|) and phase change value θ is an argument). z=a+jb is expressed by $re^{j\theta}$.

[Mathematical formula 53]

$$r=\sqrt{a^2+b^2} \quad \text{(Equation 53)}$$

In the exemplary embodiment, the pre-coding weight and phase are change on the time axis. However, as described above, the exemplary embodiment can also be achieved even if the multi-carrier transmission scheme such as the OFDM transmission is used. For example, when the pre-coding switching method is changed according to the number of transmission signals, the reception device can recognize the method for switching the pre-coding weight and phase by obtaining information about the number of transmission signals transmitted by the transmission device.

In the exemplary embodiment, the terminal reception device and the antenna may separately be configured. For example, the reception device includes an interface which receives through a cable the signal that is received by the antenna or the signal that is received by the antenna and subjected to frequency conversion, and the reception device performs the subsequent processing.

The data or information obtained by the reception device is converted into a picture and a sound, and the picture is displayed on a monitor while the sound is output from a speaker. The data or information obtained by the reception device may be subjected to signal processing relating to the picture and sound (or does not need to be subjected to signal processing), and output from an RCA terminal (video terminal and audio terminal), a USB (Universal Serial Bus), HDMI (registered trademark) (High-Definition Multimedia Interface), and digital terminal, which are included in the reception device.

In the exemplary embodiment, examples of equipment including the transmission device include communication or broadcasting equipment such as a broadcasting station, a base station, an access point, a terminal, and a mobile phone. In this case, examples of equipment including the reception device include communication equipment such as a television set, a radio set, a terminal, a personal computer, a mobile phone, an access point, and a base station. The transmission device and reception device of the present disclosure may be equipment having a communication function, and the equipment may be connectable through a certain interface to a device, such as the television set, the radio set, the personal computer, and the mobile phone, which executes an application.

In the exemplary embodiment, the symbol except for the data symbol, for example, a pilot symbol (such as a preamble, a unique word, a postamble, and a reference symbol) and a symbol for control information may flexibly be arranged in the frame. Although the symbol is referred to as the pilot symbol or the symbol for control information, the symbol may flexibly be named, and the function itself is important.

For example, in the transmitter and the receiver, the pilot symbol only needs to be a known symbol that is modulated using the PSK modulation (alternatively, the receiver may synchronize with the transmitter to recognize the symbol transmitted by the transmitter), and the receiver performs frequency synchronization, time synchronization, channel estimation (estimation of CSI (Channel State Information)) (of each modulated signal), and signal detection using the pilot symbol.

The symbol for control information is used to transmit information that needs to be transmitted to a communication partner (such as the modulation scheme used in the communication, the error correction coding scheme, and the coding rate of the error correction coding scheme, and setting information in a high-level layer) in order to conduct the communication except for the data (of the application).

The present disclosure is not limited to the exemplary embodiment, but various changes can be made. For example, the exemplary embodiment is described on the assumption that the exemplary embodiment is implemented by a communication device. Alternatively, the communication method can be implemented by software.

The pre-coding switching method is described above in the method for transmitting the two modulated signals from the two antennas. Alternatively, the pre-coding weight (matrix) can also be changed as the pre-coding switching method in a method for performing the pre-coding on four post-mapping signals to generate four modulated signals and transmitting the four modulated signals from four antennas, namely, a method for performing the pre-coding on N post-mapping signals to generate N modulated signals and transmitting the N modulated signals from N antennas.

Although the terms such as "pre-coding" and "pre-coding weight" are used herein, the name does not matter, but the present disclosure discloses the signal processing.

The different pieces of data or the identical data may be transmitted by streams $s1(t)$ and $s2(t)$.

For both the transmit antenna of the transmission device and the receive antenna of the reception device, one antenna illustrated in the drawings may be constructed with a plurality of antennas.

It is necessary that the transmission device and the reception device be notified of the transmission method (an MIMO, an SISO, a spatio-temporal block code, and an interleaving scheme), the modulation scheme, and the error correction coding scheme as a parameter. However, the notifications of the transmission method, the modulation scheme, and the error correction coding scheme are occasionally omitted in the exemplary embodiment. The parameter exists in the frame transmitted by the transmission device, and the reception device changes the operation by obtaining the parameter.

The exemplary embodiment of the present disclosure includes the following modes.

A transmission method according to a first disclosure includes: mapping processing of generating a plurality of first modulated signals s1 and a plurality of second modulated signals s2 using a first mapping scheme, the plurality of second modulated signals s2 being equal to the plurality of first modulated signals s1, and generating a plurality of third modulated signals s3 and a plurality of fourth modulated signals s4 using a second mapping scheme, the plurality of fourth modulated signals s4 being equal to the plurality of third modulated signals s3, each of the first mapping scheme and the second mapping scheme involving 16 signal points, the first mapping scheme and the second mapping scheme being different from each other in a signal point arrangement; phase change processing of performing a phase change on the plurality of second modulated signals s2 using all N kinds of phases, and performing the phase change on the plurality of fourth modulated signals s4 using all the N kinds of phases, the N being an integer of 2 or more; and transmission processing of transmitting sequentially the plurality of first modulated signals s1 and the plurality of third modulated signals s3 using a first antenna, transmitting each of the plurality of second modulated signals s2 subjected to the phase change using a second antenna at a same frequency and a same time as a frequency and a time of a corresponding one of the plurality of first modulated signals s1, and transmitting each of the plurality of fourth modulated signals s4 subjected to the phase change using the second antenna at a same frequency and a same time as a frequency and a time of a corresponding modulated signal of the plurality of third modulated signals s3.

A transmission device according to a second disclosure includes: mapping circuitry which, in operation, generates a plurality of first modulated signals s1 and a plurality of second modulated signals s2 using a first mapping scheme, the plurality of first modulated signals s1 being equal to the plurality of second modulated signals s2, and generates a plurality of third modulated signals s3 and a plurality of fourth modulated signals s4 using a second mapping scheme, the plurality of third modulated signals s3 being equal to the plurality of fourth modulated signals s4, each of the first mapping scheme and the second mapping scheme involving 16 signal points, the first mapping scheme and the second mapping scheme being different from each other in a signal point arrangement; phase change circuitry which, in operation, performs a phase change on the plurality of second modulated signals s2 using all N kinds of phases, and performs the phase change on the plurality of fourth modulated signals s4 using all the N kinds of phases, the N being an integer of 2 or more; and transmission circuitry which, in operation, transmits sequentially the plurality of first modulated signals s1 and the plurality of third modulated signals s3 using a first antenna, transmits each of the plurality of second modulated signals s2 subjected to the phase change using the second antenna at a same frequency and a same time as a frequency and a time of a corresponding modulated signal of the plurality of first modulated signals s1, and transmits each of the plurality of fourth modulated signals s4 subjected to the phase change using the second antenna at a same frequency and a same time as a frequency and a time of a corresponding modulated signal of the plurality of third modulated signals s3.

A reception method according to a third disclosure includes: reception processing of acquiring reception signals, the reception signals being signals obtained by sequentially receiving a plurality of first modulated signals s1, a plurality of third modulated signals s3, a plurality of second modulated signals s2, and a plurality of fourth modulated signals s4, the plurality of first modulated signals s1 and the plurality of third modulated signals s3 being sequentially transmitted from a first antenna, the plurality of second modulated signals s2 and the plurality of fourth modulated signals s4 being sequentially transmitted from a second antenna, each of the plurality of second modulated signals s2 being transmitted at a same frequency and a same time as a frequency and a time of a corresponding modulated signal of the plurality of first modulated signals s1, each of the plurality of fourth modulated signals s4 being transmitted at a same frequency and a same time as a frequency and a time of a corresponding modulated signal of the plurality of third modulated signals s3, the plurality of second modulated signals s2 being modulated signals subjected to a phase change using all N kinds of phases before the transmission, the N being an integer of 2 or more, the plurality of fourth modulated signals s4 being modulated signals subjected to the phase change using all the N kinds of phases before the transmission, the plurality of first modulated signals s1 and the plurality of second modulated signals s2 being generated using a first mapping scheme, the plurality of first modulated signals s1 being equal to the plurality of second modulated signals s2, the plurality of pre-phase-change third modulated signals s3 and the plurality of pre-phase-change fourth modulated signals s4 being generated using a second mapping scheme, the plurality of pre-phase-change third modulated signals s3 being equal to the plurality of pre-phase-change fourth modulated signals s4, each of the first mapping scheme and the second mapping scheme involving 16 signal points, the first mapping scheme and the second mapping scheme being different from each other in a signal point arrangement; and demodulation processing of demodulating the reception signals using a first de-mapping scheme corresponding to the first mapping scheme and a second de-mapping scheme corresponding to the second mapping scheme.

A reception device according to a fourth disclosure includes: reception circuitry which, in operation, acquires reception signals, the reception signals being signals obtained by sequentially receiving a plurality of first modulated signals s1, a plurality of third modulated signals s3, a plurality of second modulated signals s2, and a plurality of fourth modulated signals s4, the plurality of first modulated signals s1 and the plurality of third modulated signals s3 being sequentially transmitted from a first antenna, the plurality of second modulated signals s2 and the plurality of fourth modulated signals s4 being sequentially transmitted from a second antenna, each of the plurality of second modulated signals s2 being transmitted at a same frequency and a same time as a frequency and a time of a corresponding modulated signal of the plurality of first modulated signals s1, each of the plurality of fourth modulated signals s4 being transmitted at a same frequency and a same time as a frequency and a time of a corresponding modulated signal of the plurality of third modulated signals s3, the plurality of second modulated signals s2 being modulated signals subjected to a phase change using all N kinds of phases before the transmission, the N being an integer of 2 or more, the plurality of fourth modulated signals s4 being modulated signals subjected to a phase change using all the N kinds of phases before the transmission, the plurality of first modulated signals s1 and the plurality of second modulated signals s2 being generated using a first mapping scheme, the plurality of first modulated signals s1 being equal to the plurality of second modulated signals s2, the plurality of pre-phase-change third modulated signals s3 and the plurality of pre-phase-change fourth modulated signals s4 being generated using a second mapping scheme, the plurality of pre-phase-change third modulated signals s3 being equal to the plurality of pre-phase-change fourth modulated signals s4, each of the first mapping scheme and the second mapping scheme involving 16 signal points, the first mapping scheme and the second mapping scheme being different from each other in a signal point arrangement; and demodulation circuitry which, in operation, demodulates the reception signals using a first de-mapping scheme corresponding to the first mapping scheme and a second de-mapping scheme corresponding to the second mapping scheme.

For example, a program executing the communication method may previously be stored in a ROM (Read Only Memory), and executed by a CPU (Central Processor Unit).

The program for executing the communication method may be stored in a computer-readable storage medium, the program stored in the storage medium may be recorded in a RAM (Random Access Memory), and a computer may be operated according to the program.

Each configuration of the exemplary embodiment may typically be implemented as an LSI (Large Scale Integration) that is of an integrated circuit including an input terminal and an output terminal. Each configuration of the exemplary embodiment may individually be integrated into one chip, or all or some of the configurations of the exemplary embodiment may be integrated into one chip.

Although the term LSI is used, sometimes the terms of an IC (Integrated Circuit), a system LSI, a super LSI, and an ultra LSI are used. A circuit integration technique is not limited to the LSI, but the circuit integration technique may be implemented by a dedicated circuit or a general-purpose processor. A programmable FPGA (Field Programmable Gate Array) or a reconfigurable processor that can reconfigure the connection or setting of circuit cell in the LSI may be used after production of the LSI.

When a circuit integration technology that replacing the LSI emerges with the progress of a semiconductor technology or a derivative technology, the functional blocks may be integrated using the technology. A biotechnology might be applied.

The present disclosure can widely be applied to a radio communication system that transmits the different modulated signals from the plurality of antennas. The present disclosure can be applied to the case that MIMO transmission is performed in a wired communication system (such as a PLC (Power Line Communication) system, an optical communication system, and a DSL (Digital Subscriber Line) system) having a plurality of transmission places.

What is claimed is:

1. A transmission method comprising:
mapping processing of
generating a plurality of first modulated signals s1 and a plurality of second modulated signals s2 using a first mapping scheme, the plurality of second modulated signals s2 being equal to the plurality of first modulated signals s1, and
generating a plurality of third modulated signals s3 and a plurality of fourth modulated signals s4 using a second mapping scheme, the plurality of fourth modulated signals s4 being equal to the plurality of third modulated signals s3, each of the first mapping scheme and the second mapping scheme involving 16 signal points, the first mapping scheme and the second mapping scheme being different from each other in a signal point arrangement;

phase change processing of performing a phase change on the plurality of second modulated signals s2 using all N kinds of phases, and performing the phase change on the plurality of fourth modulated signals s4 using all the N kinds of phases, the N being an integer of 2 or more; and transmission processing of transmitting sequentially the plurality of first modulated signals s1 and the plurality of third modulated signals s3 using a first antenna, transmitting each of the plurality of second modulated signals s2 subjected to the phase change using a second antenna at a same frequency and a same time as a frequency and a time of a corresponding one of the plurality of first modulated signals s1, and transmitting each of the plurality of fourth modulated signals s4 subjected to the phase change using the second antenna at a same frequency and a same time as a frequency and a time of a corresponding modulated signal of the plurality of third modulated signals s3.

2. A transmission device comprising:

mapping circuitry which, in operation, generates a plurality of first modulated signals s1 and a plurality of second modulated signals s2 using a first mapping scheme, the plurality of first modulated signals s1 being equal to the plurality of second modulated signals s2, and generates a plurality of third modulated signals s3 and a plurality of fourth modulated signals s4 using a second mapping scheme, the plurality of third modulated signals s3 being equal to the plurality of fourth modulated signals s4, each of the first mapping scheme and the second mapping scheme involving 16 signal points, the first mapping scheme and the second mapping scheme being different from each other in a signal point arrangement;

phase change circuitry which, in operation, performs a phase change on the plurality of second modulated signals s2 using all N kinds of phases, and performs the phase change on the plurality of fourth modulated signals s4 using all the N kinds of phases, the N being an integer of 2 or more; and transmission circuitry which, in operation, transmits sequentially the plurality of first modulated signals s1 and the plurality of third modulated signals s3 using a first antenna, transmits each of the plurality of second modulated signals s2 subjected to the phase change using the second antenna at a same frequency and a same time as a frequency and a time of a corresponding modulated signal of the plurality of first modulated signals s1, and transmits each of the plurality of fourth modulated signals s4 subjected to the phase change using the second antenna at a same frequency and a same time as a frequency and a time of a corresponding modulated signal of the plurality of third modulated signals s3.

3. A reception method comprising:

reception processing of acquiring reception signals, the reception signals being signals obtained by sequentially receiving a plurality of first modulated signals s1, a plurality of third modulated signals s3, a plurality of second modulated signals s2, and a plurality of fourth modulated signals s4, the plurality of first modulated signals s1 and the plurality of third modulated signals s3 being sequentially transmitted from a first antenna, the plurality of second modulated signals s2 and the plurality of fourth modulated signals s4 being sequentially transmitted from a second antenna, each of the plurality of second modulated signals s2 being transmitted at a same frequency and a same time as a frequency and a time of a corresponding modulated signal of the plurality of first modulated signals s1, each of the plurality of fourth modulated signals s4 being transmitted at a same frequency and a same time as a frequency and a time of a corresponding modulated signal of the plurality of third modulated signals s3, the plurality of second modulated signals s2 being modulated signals subjected to a phase change using all N kinds of phases before the transmission, the N being an integer of 2 or more, the plurality of fourth modulated signals s4 being modulated signals subjected to the phase change using all the N kinds of phases before the transmission, the plurality of first modulated signals s1 and the plurality of second modulated signals s2 being generated using a first mapping scheme, the plurality of first modulated signals s1 being equal to the plurality of second modulated signals s2, the plurality of pre-phase-change third modulated signals s3 and the plurality of pre-phase-change fourth modulated signals s4 being generated using a second mapping scheme, the plurality of pre-phase-change third modulated signals s3 being equal to the plurality of pre-phase-change fourth modulated signals s4, each of the first mapping scheme and the second mapping scheme involving 16 signal points, the first mapping scheme and the second mapping scheme being different from each other in a signal point arrangement; and demodulation processing of demodulating the reception signals using a first de-mapping scheme corresponding to the first mapping scheme and a second de-mapping scheme corresponding to the second mapping scheme.

4. A reception device comprising:

reception circuitry which, in operation, acquires reception signals, the reception signals being signals obtained by sequentially receiving a plurality of first modulated signals s1, a plurality of third modulated signals s3, a plurality of second modulated signals s2, and a plurality of fourth modulated signals s4, the plurality of first modulated signals s1 and the plurality of third modulated signals s3 being sequentially transmitted from a first antenna, the plurality of second modulated signals s2 and the plurality of fourth modulated signals s4 being sequentially transmitted from a second antenna, each of the plurality of second modulated signals s2 being transmitted at a same frequency and a same time as a frequency and a time of a corresponding modulated signal of the plurality of first modulated signals s1, each of the plurality of fourth modulated signals s4 being transmitted at a same frequency and a same time as a frequency and a time of a corresponding modulated signal of the plurality of third modulated signals s3, the plurality of second modulated signals s2 being modulated signals subjected to a phase change using all N kinds of phases before the transmission, the N being an integer of 2 or more, the plurality of fourth modulated signals s4 being modulated signals subjected to a phase change using all the N kinds of phases before the transmission, the plurality of first modulated signals s1 and the plurality of second modulated signals s2 being generated using a first mapping scheme, the plurality of first modulated signals s1 being equal to the plurality of second modulated signals s2, the plurality of pre-phase-change third modulated signals s3 and the plurality of pre-phase-change fourth modulated signals s4 being generated using a second mapping scheme, the plurality of pre-phase-change third modulated signals s3 being equal to the plurality of pre-phase-change fourth modulated signals s4, each of the first mapping scheme and the second mapping scheme involving 16 signal points, the first mapping scheme and the second mapping scheme being different from each other in a signal point arrangement; and demodulation circuitry which, in operation, demodulates the reception signals using a first de-mapping scheme corresponding to the first mapping scheme and a second de-mapping scheme corresponding to the second mapping scheme.

\* \* \* \* \*